(12) United States Patent
Barton

(10) Patent No.: US 10,949,739 B1
(45) Date of Patent: Mar. 16, 2021

(54) METHOD AND APPARATUS FOR SHARED CROSS-STREAM EVENT DETECTION

(71) Applicant: NPARBOR, INC., Camas, WA (US)

(72) Inventor: David Carl Barton, Camas, WA (US)

(73) Assignee: NPARBOR, INC., Camas, WA (US)

( * ) Notice: Subject to any disclaimer, the term of this patent is extended or adjusted under 35 U.S.C. 154(b) by 0 days.

(21) Appl. No.: 17/099,764

(22) Filed: Nov. 16, 2020

Related U.S. Application Data

(63) Continuation of application No. PCT/US2020/035547, filed on Jun. 1, 2020.

(60) Provisional application No. 62/856,142, filed on Jun. 2, 2019.

(51) Int. Cl.
| | |
|---|---|
| *G06N 3/063* | (2006.01) |
| *H04L 12/26* | (2006.01) |
| *H04L 29/06* | (2006.01) |
| *G06N 3/04* | (2006.01) |
| *G06N 3/08* | (2006.01) |

(52) U.S. Cl.
CPC ............ *G06N 3/063* (2013.01); *H04L 43/087* (2013.01); *H04L 43/16* (2013.01); *H04L 65/60* (2013.01); *G06N 3/049* (2013.01); *G06N 3/088* (2013.01)

(58) Field of Classification Search
CPC ........ G06N 3/063; G06N 3/088; G06N 3/049; H04L 43/087; H04L 43/16; H04L 65/60
See application file for complete search history.

(56) References Cited

U.S. PATENT DOCUMENTS

| | | |
|---|---|---|
| 7,430,546 B1 | 9/2008 | Suri |
| 8,346,692 B2 | 1/2013 | Rouat et al. |
| 9,798,751 B2 | 10/2017 | Birdwell et al. |
| 9,858,304 B2 | 1/2018 | Marcus et al. |

(Continued)

FOREIGN PATENT DOCUMENTS

JP 2001-053684 A 2/2001

OTHER PUBLICATIONS

USPTO as PCT ISA: International Search Report and Written Opinion for International App. No. PCT/US2002/035547 dated Sep. 4, 2020 (y/m/d). 11 pgs.

(Continued)

*Primary Examiner* — Kyung H Shin
(74) *Attorney, Agent, or Firm* — Kaplan IP Law, PLLC; Jonathan T. Kaplan

(57) ABSTRACT

Identifying shared events across spiking-neural-network data streams with significant stochastic content. The data streams are first subject to cross correlation. If two data streams are completely uncorrelated, the rate of occurrence, of cross-stream spike pairs, is an approximately uniform "r_ind" across all Time Between Events (TBE's). Any shared events create a gradient, where r_ind increases to a rate "r_shr," for any TBE's≤a Time Of Discernment (TOD). A search for the actual TOD (TOD_a) can be accomplished with a conjectured TOD (TOD_c). TOD_c is tested against an exponential decay with its rate set to a conjectured r_ind (r_ind_c). When r_ind_c=actual r_ind, equal ranges (or regions) of values, of exponential decay, represent equal probabilities. Values of TOD_c and r_ind_c are generated (at respective learning rates), until a combination is found where probabilistically equal regions receive statistically equal numbers of cross-stream events. It is then known TOD_a≤TOD_c.

28 Claims, 37 Drawing Sheets

(56) References Cited

U.S. PATENT DOCUMENTS

| | | | |
|---|---|---|---|
| 10,878,313 B2 * | 12/2020 | Augustine | G06N 3/063 |
| 10,885,425 B2 * | 1/2021 | Imam | G06N 3/063 |
| 2004/0196183 A1 | 10/2004 | Roh | |
| 2014/0052679 A1 | 2/2014 | Sinyavskiy et al. | |
| 2015/0262054 A1 | 9/2015 | Cary et al. | |
| 2016/0224886 A1 | 8/2016 | Akopyan et al. | |
| 2018/0174026 A1 | 6/2018 | Davies | |
| 2019/0311244 A1 * | 10/2019 | Oh | G06N 3/063 |

OTHER PUBLICATIONS

Tchumatchenko et al. "Spike correlations—what can they tell about synchrony?." In: Front. Neurosc., May 11, 2011. 17 pgs.

Lee et al. "Training Deep Spiking Neural Networks Using Backpropagation." In: Front. Neurosci., Nov. 8, 2016. 24 pgs.

USPTO as PCT ISA: International Search Report and Written Opinion for International App. No. PCT/US2002/022869 dated Jun. 15, 2020 (y/m/d). 9 pgs.

Wall et al. "A Comparison of Sound Localisation Techniques using Cross-Correlation and Spiking Neural Networks for Mobile Robotics." The IEEE 2011 International Joint Conference on Neural Networks, San Jose, CA. Jul. 2011. [retrieved May 18, 2020 from https://repository.uel.ac.uk/item/860q8] 7 pgs, numbered 1981-1987.

* cited by examiner

Multi-stream Cross Correlator

Cross Correlator Unit (CCU) Functional Block Diagram

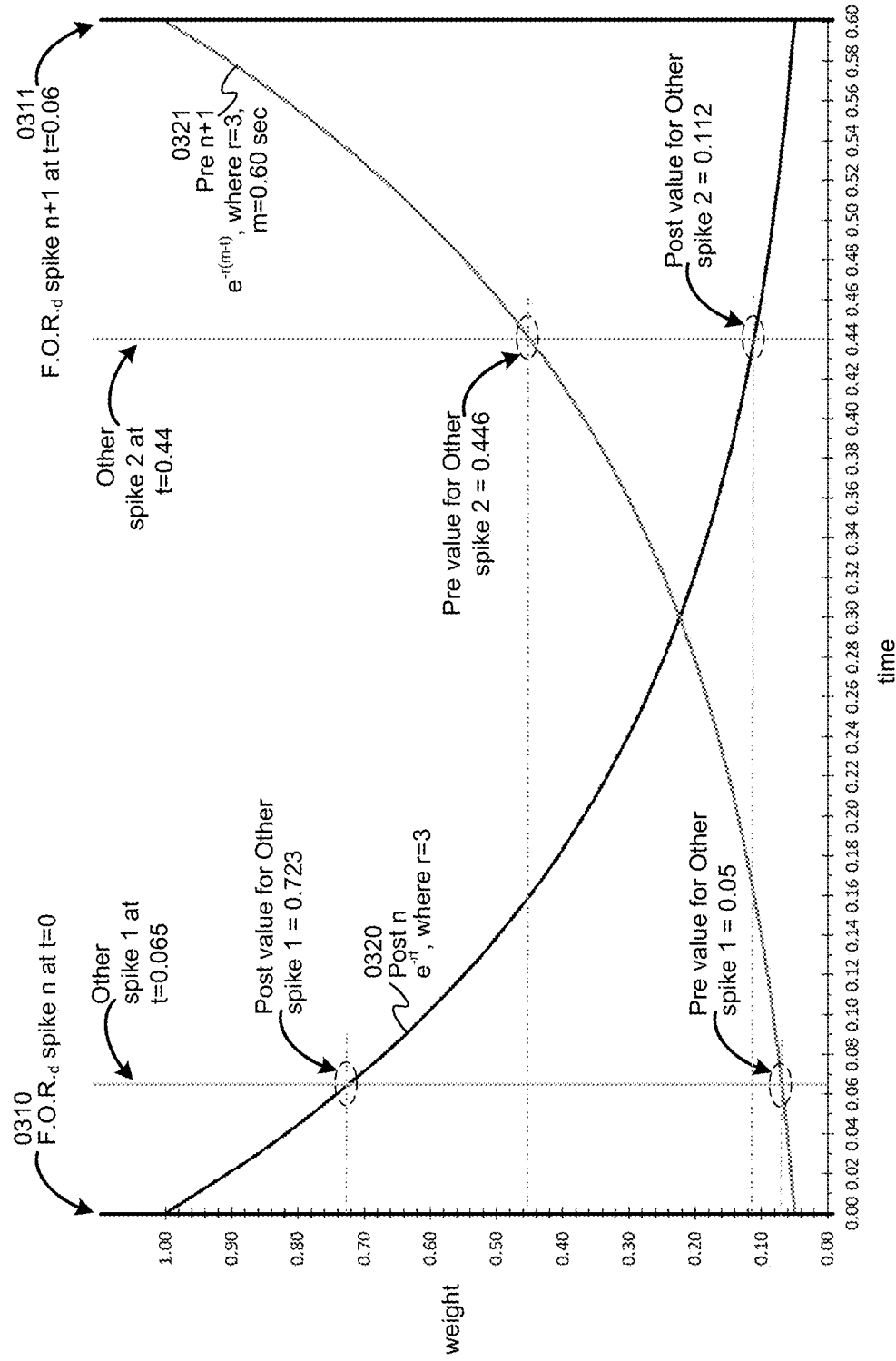

FIGURE 04

```
1   Learn_Delay_PC
2   # Operates each time a spike is received by Learn Delay, whether it is an F.O.R.d from Learn
3   # Delay's companion Produce Delay, or received at Learn Delay's Other input.
4
5       R = Rate of decay, for exponential decrease of Post curve, or increase of Pre curve.
6       IS_MINE = true if current spike is from Learn Delay's companion Produce Delay, and
7       false otherwise.
8       T = time of current spike, that caused the present execution of Learn Delay to begin.
9       TLO = Time of last Other spike.
10      TLF = Time of last F.O.R.d spike from Learn Delay's companion Produce Delay.
11      preAcc = Accumulates a unit value for each Other spike, with each unit value subjected
12      to exponential decay, in accordance with the time between the occurrence of the unit
13      value's Other spike and the next following F.O.R.d spike.
14      postAcc = Accumulates the current value of the Post curve, at each time an Other spike
15      occurs.
16      D = Delay value, for execution by Produce Delay, that is being learned.
17      D_LR = Learning rate for delay.
18      # D_LR is the unit of adjustment to Produce Delay, with all such adjustments, either
19      # greater or smaller, accumulated by D. Should be small enough to satisfy precision
20      # requirements, and large enough to satisfy time-to-correlation requirements.
21
22      preAcc *= exp(R * (T - TLO))
23      # Further decay any unit values accumulated through previous executions of below.
24
25      If not IS_MINE:  # Current spike is an Other:
26              preAcc += 1
27              # Accumulate unit value, which will be decayed according to above, until the next
28              # F.O.R.d spike is received.
29
30              postAcc += exp(R * (T - TLF))
31              # Accumulate current value of the Post, as it has decayed since last F.O.R.d.
32              TLO = T
33              # Prepare for next Other spike.
34      else:  # Current spike is an F.O.R.d:
35              if preAcc != postAcc:
36              # Perfect balance means any adjustment to D would be incorrect. Usually means
37              # no spikes arrived from other connections and both accumulators are zero.
38                      D += -D_LR if preAcc > postAcc else D_LR
39                      # Adjust delay shorter or longer, based on balance.
40                      D = keep_in_bounds(D)
41                      # Ensure D stays within acceptable limits for maximum and minimum.
42              preAcc = postAcc = 0
43              # Reset accumulators to start next F.O.R.d frame of reference.
44              TLF = T
45              # Update last time this Learn Delay received an F.O.R.d spike.
```

Learn Delay – Read Accumulators & Control

Learn Delay – postAcc

Learn Delay – preAcc

Cross Correlator Unit (CCU) Functional Block Diagram

Produce Delay

Produce Delay

Cross Correlator Unit (CCU) Functional Block Diagram

Learn Rate All

Learn Rate All

Learn Rate All

Learn Rate All

Learn Rate All

Learn Delay – postAcc

Learn Delay – preAcc

Produce Delay

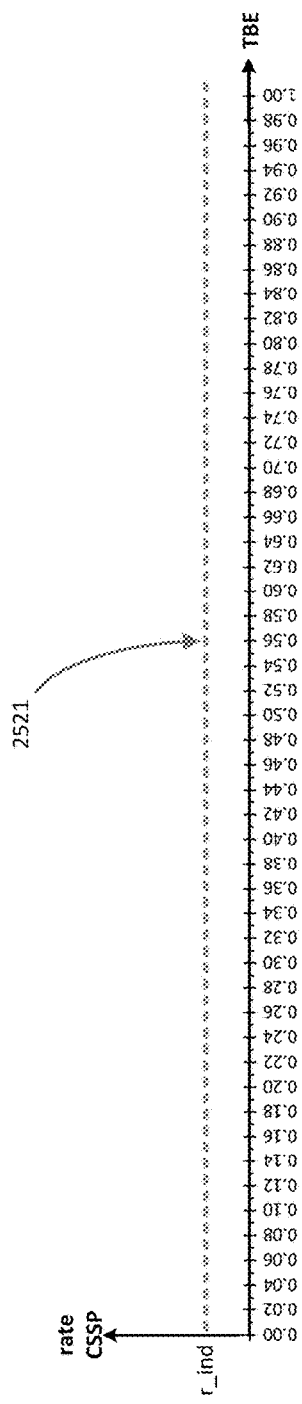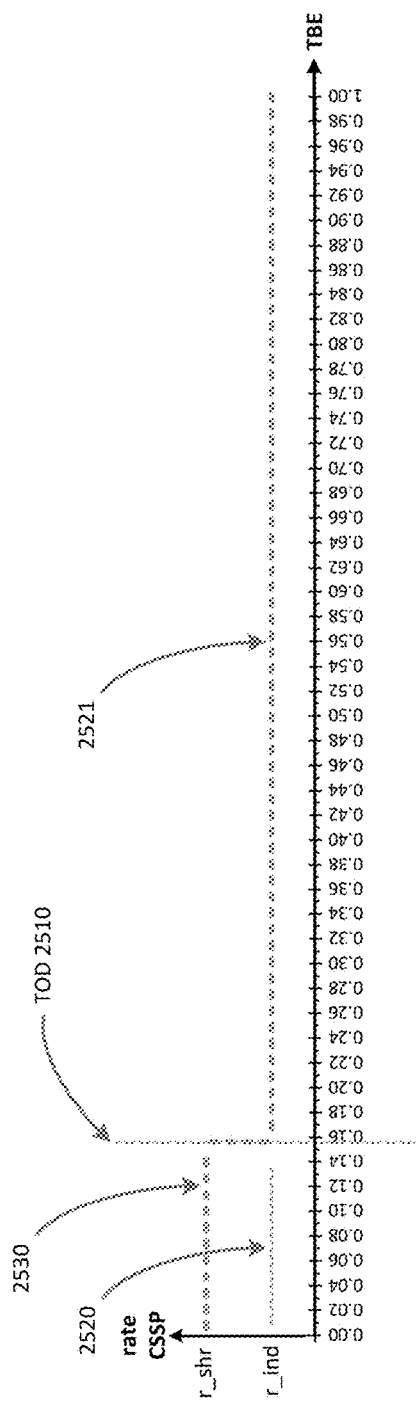
FIGURE 25A
event rate vs. increasing TBE
FIGURE 25B

FIGURE 28A

```
1   Learn_TOD_H2H1
2   # Pseudo-Code (PC) that operates at the arrival time of an event in either stream. One stream is assigned the role of
3   # "Me" (or "Mine"), and the other stream has the "Other" role.
4
5   # Global variables, available when either stream spikes:
6   t = Time of current event's arrival and notification.
7   TH_LR = Learning rate constant for adjustment of the threshold th_c that, when projected to time axis by exponential
8   decay, defines TOD_c. A smaller value produces less jitter but slower convergence to a correct value. An example
9   reasonable value is: 1e-5 (i.e., 1 x 10⁻⁵).
10  R_LR = Learning rate constant for adjustment of rate r_ind_c. A smaller value produces less jitter but slower
11  convergence to a correct value. An example reasonable value is 1e-3.
12  lastEventWasShared = The last event arrival, regardless of stream origin, was already identified as part of a shared
13  CS spike pair. Initialize False.
14
15  # Internal variables, with values local to each stream's Learn_TOD_H2H1:
16  isMine = The current event, for this instance of Learn_TOD_H2H1, is applied to the Me stream.
17  tOtherStream = Time a last event, from the Other stream, arrived. Initialize to 0.
18  prevEventMine = Event immediately previous to current event originated from Me stream. Initialize False.
19  r_ind_c = Conjectured rate of arrival of CS event-pairs, where each is currently judged to consist of independently
20  occurring events.
21  th_c = A conjectured threshold that, in conjunction with an exponential decay of rate r_ind_c, establishes a current
22  conjectured maximum Time Of Discernment (TOD_c) and still have a CS spike pair qualify as shared spikes.
23  fTh = a forward threshold, later in time than th_c.
24  TBE_P = Determined from decaying a unit value at rate r_ind_c, over the Time Beween the Events (TBE) of a CS
25  spike pair. Given that a first spike has just occurred, TBE_P is the probability of occurrence of a second spike, to
26  complete a random CS spike pair, at time TBE or any time later.
27
28  If not isMine:
29  # Event that just occurred is applied to Other input of this Learn TOD Unit. Following variables track arrival time of
30  # Other events, for later use when a Me event occurs.
31         tOtherStream = t
32         # update, to current time t, what will become arrival time of a last event of Other stream
33         prevEventMine = False
34         # Used to identify, in next invocation of this Learn TOD Unit, that prior event was applied to Other input.
35
36  elif not prevEventMine:
37  # Now know have new CS spike pair, of current event applied to Me input, and just-prior event applied to Other input.
38         TBE = t - tOtherStream
39         TBE_P = system.exp(r_ind_c, TBE)
40         # Simulates a unit value, decayed over TBE. Unit value decays according to a conjectured (or estimated)
41         # rate, r_ind_c, of independent CS event pairs. See below, for determination of r_ind_c.
42
43         prevEventMine = True
44         # Used to identify, in next invocation, that prior event was applied to Me input.
```

FIGURE 28B

```
1   If not lastEventWasShared:
2   # A spike is part of only one shared pair, so ensure last event of either stream not already shared.
3
4           th_c += TH_LR/10
5           # While always executed, only a predominant effect when TOD_c ≥ TOD_a.
6           # Acts to increase threshold, and therefore decrease TOD_c, but at a relatively slow rate.
7
8           If TBE_P ≥ th_c:
9           # TBE ≤ TOD_c
10                  system.signalSharedEvent()
11                  # Signal outside world that current event of Me stream, and last event of Other stream,
12                  # sufficiently close temporally to be regarded as shared spikes.
13
14                  lastEventWasShared = True
15                  # don't allow current event to again be part of a pair of shared spikes
16
17          else:
18          # TBE > TOD_c: treat TBE as a proxy for TOD_a. Use towards adjusting TOD_c and r_ind_c
19
20                  lastEventWasShared = False
21                  # permit current event to possibly be part of a shared pair of spikes with next event.
22
23                  fTh = th_c/2
24                  # Used to divide time range, from TOD_c out to infinity, into two regions of equal probability.
25                  # Projected on time axis, fTh represents the MEA time of the time range TOD_c out to
26                  # infinity. More specifically, there is an earlier half H2, and a later half H1:
27                  #    H2: TOD_c < TOD_a ≤ MEA
28                  #    H1: MEA < TOD_a ≤ ∞
29
30                  If TBE_P ≥ fTh:
31                  # Indicates TOD_a in H2
32                          th_c -= TH_LR
33                          # Increase lower bound of H2, with objective of TOD_c approaching TOD_a.
34                          r_ind_c -= R_LR
35                          # Increase r_ind_c, to make H1 more likely in future.
36
37                  else:
38                  # Indicates: TOD_a in H1
39                          th_c += TH_LR
40                          # decrease lower bound of H2, with objective of keeping TOD_c balanced,
41                          # if TOD_c ≥ TOD_a.
42                          r_ind_c += R_LR
43                          # decrease r_ind_c, to make H2 more likely in future.
44
45                  system.clamp(th_c, 0, 1)
46                  # keep th_c within acceptable range
47
48      else:
49          lastEventWasShared = False
50          # current event will not be shared with last event, so get current event ready for potential sharing on
51          # next spike.
```

Shared Event Detector

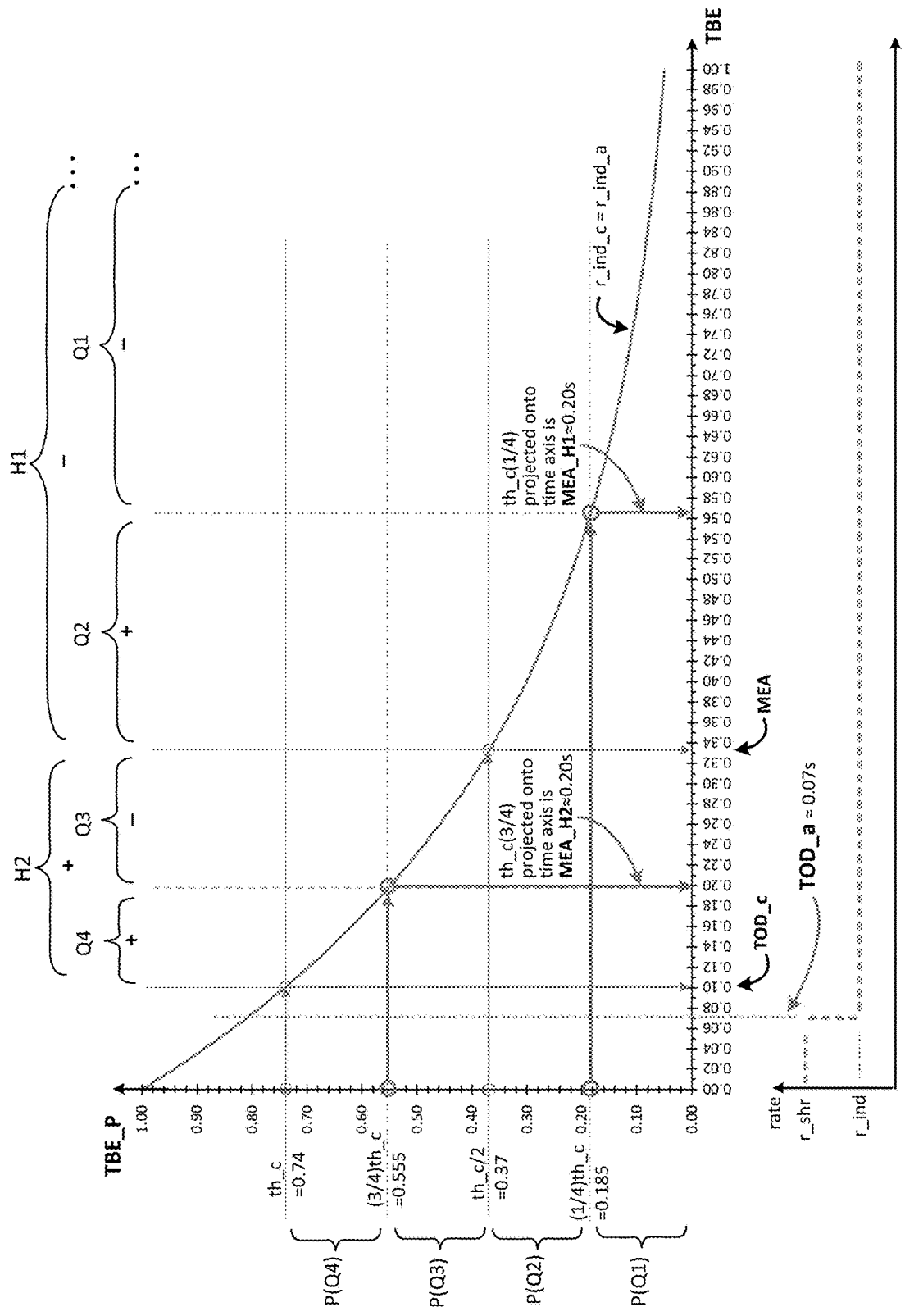

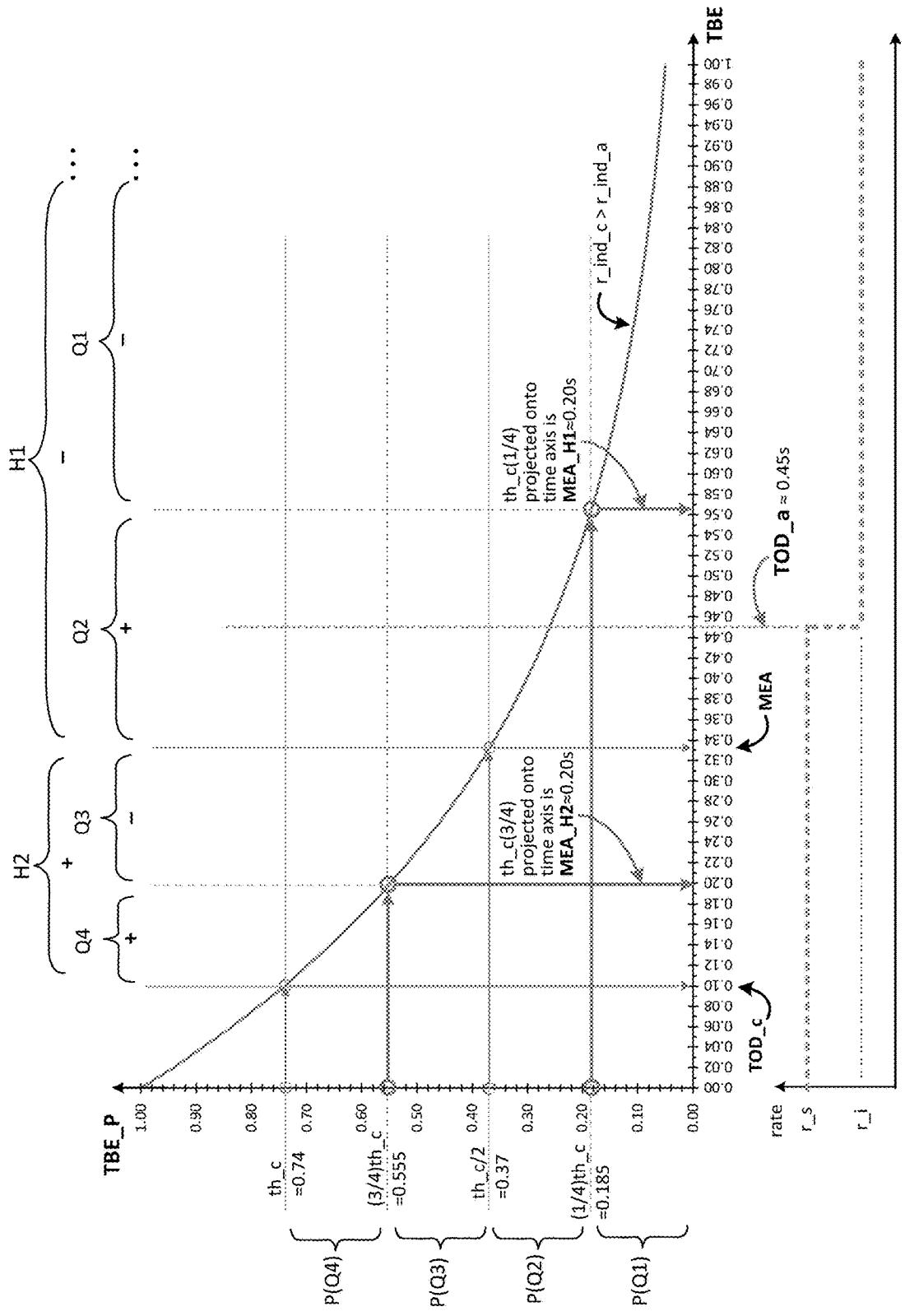

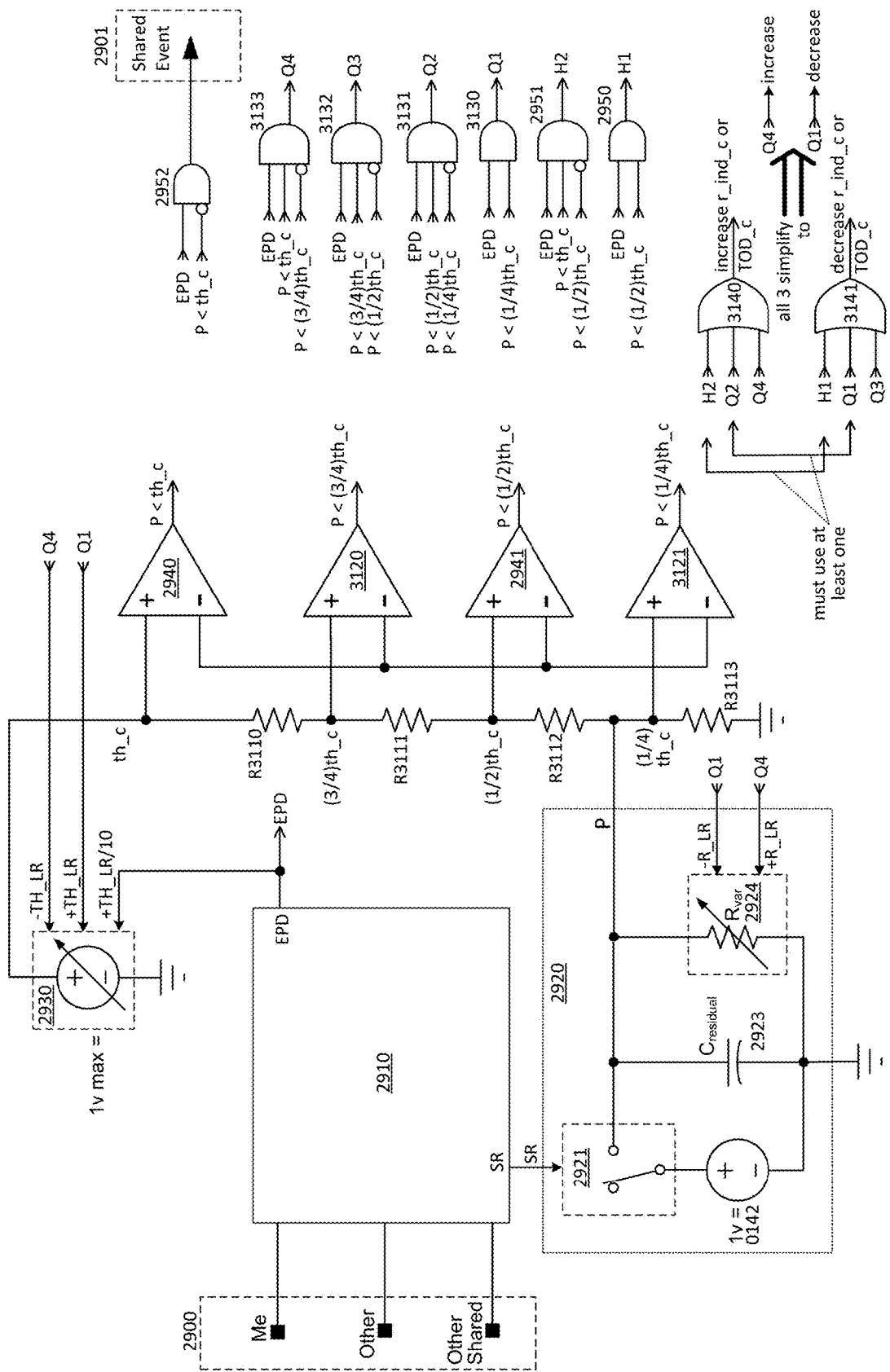

FIGURE 32A

```
1   Learn_TOD_MSMS
2   # Pseudo-Code (PC) that same as Learn_TOD_H2H1, except adds quarters, to achieve Multi-Scale, Multi-Sample
3   # operation.
4
5   # Global variables, available when either stream spikes:
6   t = Time of current event's arrival and notification.
7   TH_LR = Learning rate constant for adjustment of the threshold th_c that, when projected to time axis by exponential
8       decay, defines TOD_c. A smaller value produces less jitter but slower convergence to a correct value. An example
9       reasonable value is: 1e-5 (i.e., 1 x 10⁻⁵).
10  R_LR = Learning rate constant for adjustment of rate r_ind_c. A smaller value produces less jitter but slower
11      convergence to a correct value. An example reasonable value is 1e-3.
12  lastEventWasShared = The last event arrival, regardless of stream origin, was already identified as part of a shared
13      CS spike pair. Initialize False.
14
15  # Internal variables, with values local to each stream's Learn_TOD_H2H1:
16  isMine = The current event, for this instance of Learn_TOD_H2H1, is applied to the Me stream.
17  tOtherStream = Time a last event, from the Other stream, arrived. Initialize to 0.
18  prevEventMine = Event immediately previous to current event originated from Me stream. Initialize False.
19  r_ind_c = Conjectured rate of arrival of CS event-pairs, where each is currently judged to consist of independently
20      occurring events.
21  th_c = A conjectured threshold that, in conjunction with an exponential decay of rate r_ind_c, establishes a current
22      conjectured maximum Time Of Discernment (TOD_c) and still have a CS spike pair qualify as shared spikes.
23  fTh = a forward threshold, later in time than th_c.
24  TBE_P = Determined from decaying a unit value at rate r_ind_c, over the Time Beween the Events (TBE) of a CS
25      spike pair. Given that a first spike has just occurred, TBE_P is the probability of occurrence of a second spike, to
26      complete a random CS spike pair, at time TBE or any time later.
27
28  If not isMine:
29  # Event that just occurred is applied to Other input of this Learn TOD Unit. Following variables track arrival time of
30  # Other events, for later use when a Me event occurs.
31          tOtherStream = t
32          # update, to current time t, what will become arrival time of a last event of Other stream
33          prevEventMine = False
34          # Used to identify, in next invocation of this Learn TOD Unit, that prior event was applied to Other input.
35
36  elif not prevEventMine:
37  # Now know have new CS spike pair, of current event applied to Me input, and just-prior event applied to Other input.
38          TBE = t - tOtherStream
39          TBE_P = system.exp(r_ind_c, TBE)
40          # Simulates a unit value, decayed over TBE. Unit value decays according to a conjectured (or estimated)
41          # rate, r_ind_c, of independent CS event pairs. See below, for determination of r_ind_c.
42
43          prevEventMine = True
44          # Used to identify, in next invocation, that prior event was applied to Me input.
```

FIGURE 32B

```
1    if not lastEventWasShared:
2    # A spike is part of only one shared pair, so ensure last event of either stream not already shared.
3
4            th_c += TH_LR/10
5            # While always executed, only a predominant effect when TOD_c ≥ TOD_a.
6            # Acts to increase threshold, and therefore decrease TOD_c, but at a relatively slow rate.
7
8            if TBE_P ≥ th_c:
9            # TBE ≤ TOD_c
10                   system.signalSharedEvent()
11                   # Signal outside world that current event of Me stream, and last event of Other stream,
12                   # sufficiently close temporally to be regarded as shared spikes.
13
14                   lastEventWasShared = True
15                   # don't allow current event to again be part of a pair of shared spikes
16
17           else:
18           # TBE > TOD_c: treat TBE as a proxy for TOD_a. Use towards adjusting TOD_c and r_ind_c
19
20                   lastEventWasShared = False
21                   # permit current event to possibly be part of a shared pair of spikes with next event.
22
23                   fTh = th_c/2
24                   # Used to divide time range, from TOD_c out to infinity, into two regions of equal probability.
25
26                   if TBE_P ≥ fTh:
27                   # Indicates TOD_a in H2: TOD_c < TOD_a ≤ MEA
28                           th_c -= TH_LR
29                           # Increase lower bound of H2, with objective of TOD_c approaching TOD_a.
30                           r_ind_c -= R_LR
31                           # Increase r_ind_c, to make H1 more likely in future.
32                           # END OF LOGIC FOR H2
33
34                           th3_4 = th_c(3/4)
35                           # Used to divide H2 into Q4 and Q3 where logic Q4=H2 and logic Q3=H1
36                           if TBE_P ≥ th3_4:
37                           # Indicates TOD_a in Q4: TOD_c < TOD_a ≤ MEA_H2
38                                   th_c -= TH_LR
39                                   r_ind_c -= R_LR
40                           else:
41                           # Indicates TOD_a in Q3: MEA_H2 < TOD_a ≤ MEA
42                                   th_c += TH_LR
43                                   r_ind_c += R_LR
44                           # END OF LOGIC FOR Q4/Q3
```

FIGURE 32C

```
1          else:
2          # Indicates: TOD_a in H1; MEA < TOD_a ≤ ∞
3                  th_c += TH_LR
4                  # decrease lower bound of H2, with objective of keeping TOD_c balanced,
5                  # if TOD_c ≥ TOD_a.
6                  r_ind_c += R_LR
7                  # decrease r_ind_c, to make H2 more likely in future.
8                  # END OF LOGIC FOR H2
9
10                 th1_4 = th_c(1/4)
11                 # Used to divide H2 into Q2 and Q1 where logic Q2=H2 and logic Q1=H1
12                 if TBE_P ≥ th1_4:
13                 # Indicates TOD_a in Q2: MEA < TOD_a ≤ MEA_H1
14                         th_c -= TH_LR
15                         r_ind_c -= R_LR
16                 else:
17                         # Indicates TOD_a in Q1: MEA_H1 < TOD_a ≤ ∞
18                         th_c += TH_LR
19                         r_ind_c += R_LR
20                 # END OF LOGIC FOR Q2/Q1
21
22         system.clamp(th_c, 0, 1)
23         # keep th_c within acceptable range
24
25     else:
26         lastEventWasShared = False
27         # current event will not be shared with last event, so get current event ready for potential sharing on
28         # next spike.
```

METHOD AND APPARATUS FOR SHARED CROSS-STREAM EVENT DETECTION

This application is a continuation of the following International Application, to which benefit is claimed:

"Method and Apparatus for Shared Cross-Stream Event Detection," with an International Filing Date of 2020 Jun. 1 (y/m/d), having inventor David Carl Barton and International App. No. PCT/US2020/035547.

International App. No. PCT/US2020/035547 claims priority to, and benefit of, the following U.S. Provisional Patent Application:

"Method and Apparatus for Shared Cross-Stream Event Detection," filed 2019 Jun. 2 (y/m/d), having inventor David Carl Barton and App. No. 62/856,142.

This application also herein incorporates by reference, in its entirety, International App. No. PCT/US2020/035547 and U.S. Provisional Patent Application No. 62/856,142.

International App. No. PCT/US2020/035547 incorporates by reference, in its entirety, U.S. Provisional Patent Application No. 62/856,142.

This application herein incorporates by reference, in its entirety, the following:

U.S. Provisional Patent Application, "Method and Apparatus for Cross Correlation," filed 2019 Mar. 17 (y/m/d), having inventor David Carl Barton and App. No. 62/819,590; and PCT International Application, "Method and Apparatus for Cross Correlation," filed 2020 Mar. 15 (y/m/d), having inventor David Carl Barton and App. No. PCT/US2020/022869.

TECHNICAL FIELD

The present invention relates generally to the detection of shared events occurring across multiple data streams, and, more particularly, to shared event detection across data streams with significant stochastic content.

BACKGROUND ART

The importance of achieving synchronization (or cross-correlation), between signal (or data) streams, is well understood in many areas of technology, including (but not limited to) signal processing, and computer networking. For example, in signal processing, cross-correlation is often used to find the relative delay between signal streams in a variety of applications. After two signal streams have been subjected to cross correlation, it can be useful to have a metric of the extent of their synchronization.

Accordingly, there exists a need for better metrics of correlation between signal streams.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 3 depicts a functional implementation of Learn Delay, using each pair of spikes, present at its F.O.R.$_d$ input, as a frame of reference for analyzing any spikes occurring at Learn Delay's Other input.

FIG. 4 depicts an example pseudo-coded implementation of Learn Delay, based on the Python programming language.

FIG. 25A is intended to illustrate the behavior of a CS spike pair stream with only stochastic content.

FIG. 25B is intended to illustrate, for a temporal separation of TOD or less, the additional rate of the shared spikes (if shared spikes are present) that are added to r_ind.

FIGS. 30A-B correspond to, respectively, FIGS. 27A-B, except FIGS. 30A-B depict an example of dividing the post-TOD_c time range into quarters as well as halves.

FIG. 31 presents an example electrical circuit-level implementation, of the multi-scale (quarters and halves) and multi-sample (Q4/Q3 and Q2/Q1) approach of FIGS. 30A-B.

FIGS. 32A-C present an example Multi-Scale, Multi-Sample pseudo-code implementation, for each of the Learn TOD Units of FIG. 20.

MODE(S) FOR CARRYING OUT THE INVENTION

Reference will now be made in detail to various embodiments of the invention, examples of which are illustrated in the accompanying drawings. Wherever possible, the same reference numbers will be used throughout the drawings to refer to the same or like parts.

Please refer to Section 7 ("Glossary of Selected Terms") for the definition of selected terms used below.

Table of Contents to Detailed Description

1 Overview
2 Example Embodiment
3 Partitioned Embodiments
  3.1 Overview
  3.2 Genericized
  3.3 Electrical Circuit Implementation
4 Pseudo-Code Implementation
5 Multi-Scale, Multi-Sample
  5.1 Overview
  5.2 Example Embodiment
  5.3 Example Electrical Implementation
  5.4 Pseudo-Code Implementation
6 Further Variations
7 Glossary of Selected Terms
8 Computing Equipment
9 Appendix

1 OVERVIEW

This patent is based directly upon the following U.S. Provisional Application:

"Method and Apparatus for Shared Cross-Stream Event Detection," filed 2019 Jun. 2 (y/m/d), having inventor David Carl Barton and App. No. 62/856,142 (hereinafter the '142 application).

The '142 application itself builds upon the following U.S. Provisional Application:

"Method and Apparatus for Cross Correlation," filed 2019 Mar. 17 (y/m/d), having inventor David Carl Barton and App. No. 62/819,590 (hereinafter the '590 Application).

The '590 application is included in its entirety as an Appendix in the '142 application. Essentially the entirety of the '590 application is also included herein as an Appendix. As stated above, the entirety of the '590 application is incorporated by reference herein.

The '590 application presents methods and apparatus for cross correlation, between data streams with significant stochastic content (such as can occur with spiking neural networks).

Since the '590 application includes Figures numbered 1-19, FIGS. 1-19 of the present patent are addressed in the Appendix included herein (i.e., Section 9).

Figure 20:
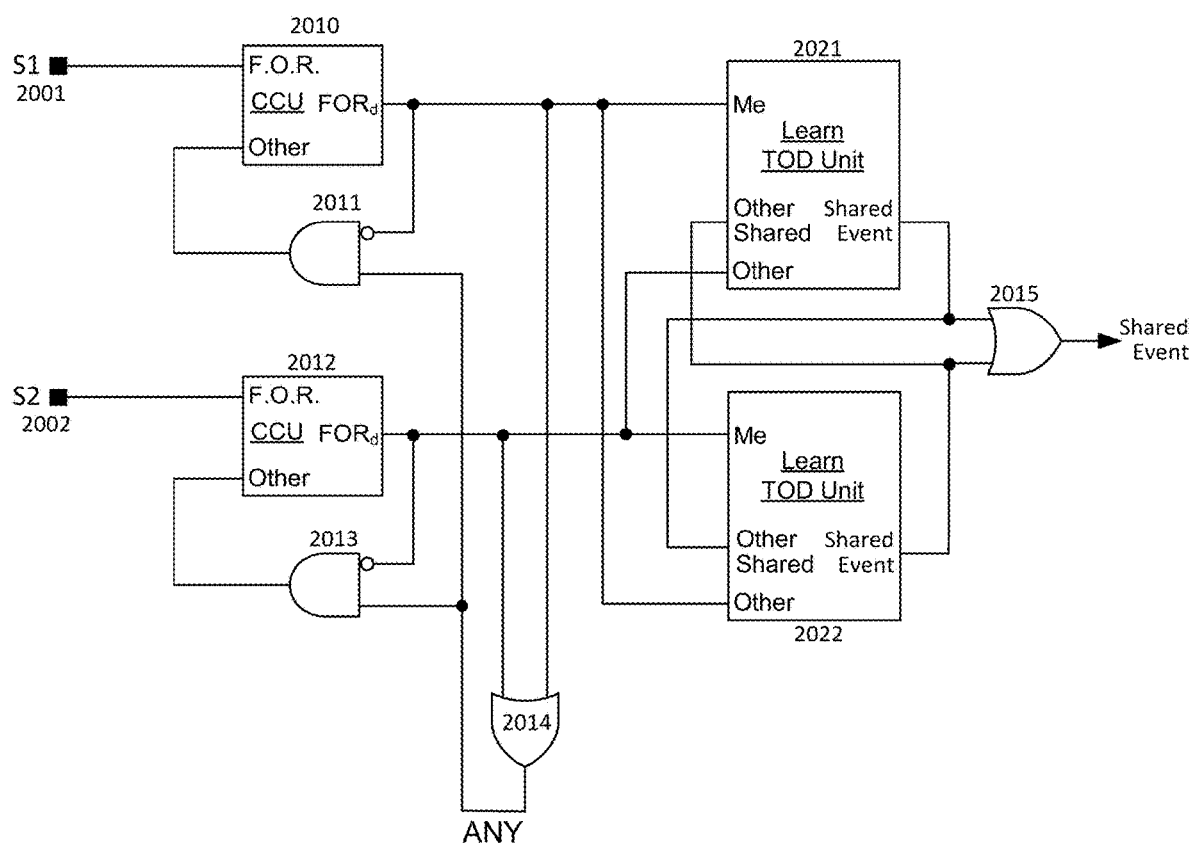
FIG. 20 depicts a block diagram by which to use Learn TOD Units with the outputs of Cross Correlation Units (or CCUs).

The numbering of the Figures of the '142 application, and the discussion of shared cross-stream event detection of the present patent, begin at FIG. 20.

The description presented herein focuses on the application of the present invention to spiking neural networks. However, as explained in the Glossary below, the term "spike" as used herein can refer to a much broader range of signal discontinuities. To emphasize the broad scope of the term "spike," at various points herein we may substitute it with the term "event" or "manifestation."

Figure 21:
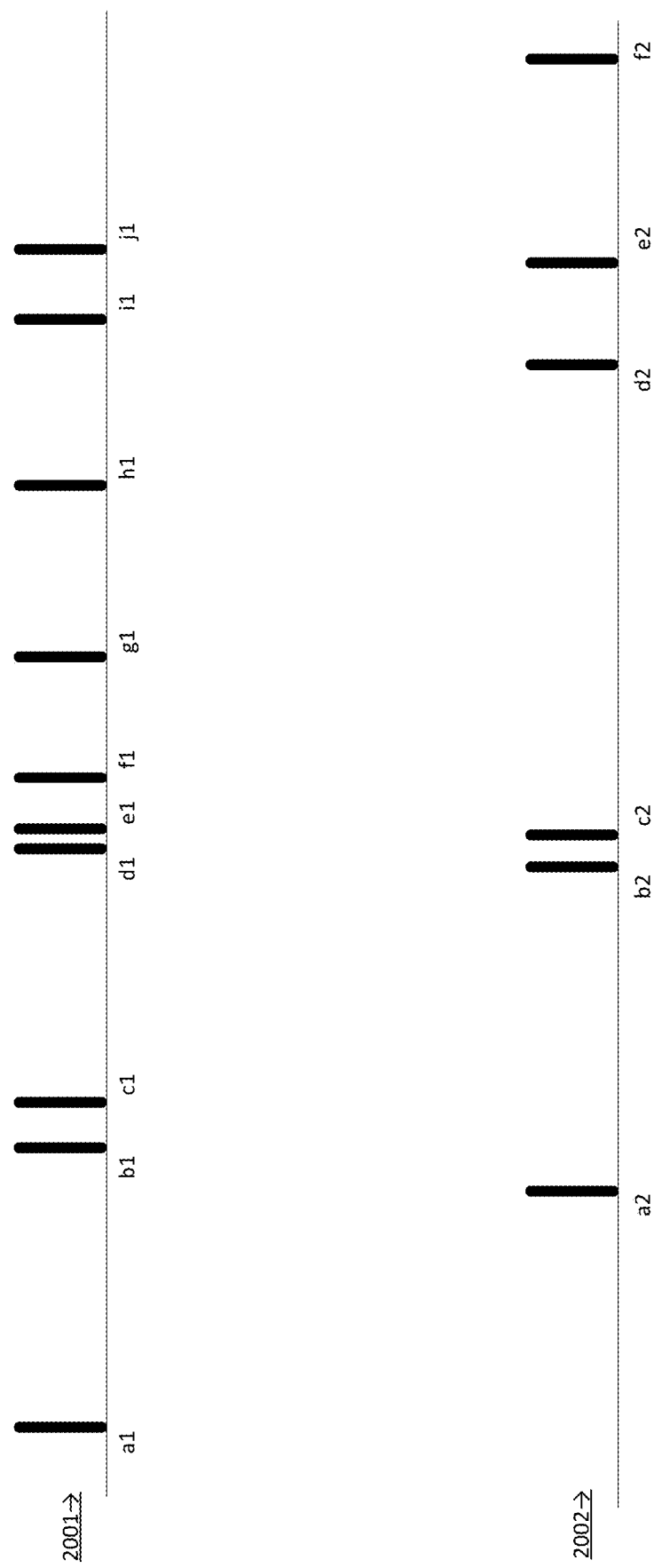
FIG. 21 presents fragments of two spike streams, as they might appear after being correlated.

FIG. 21 presents fragments of two spike streams 2001 and 2002, as they might appear after being correlated with the invention of the '590 application. As such, the spikes of streams 2001 and 2002 can be expected to be randomly distributed (or can be said to have mostly random content), with the exception of certain spike pairs, across the two streams, that have been determined correlated. The randomness occurs both with respect to each spike stream itself, when considered individually, and also when examining spikes across two or more streams.

As can be seen, for purposes of discussion, each spike of stream 2001 has been assigned a label from a1 to j1, and each spike of stream 2002 has been assigned a label from a2 to f2.

Figure 22:
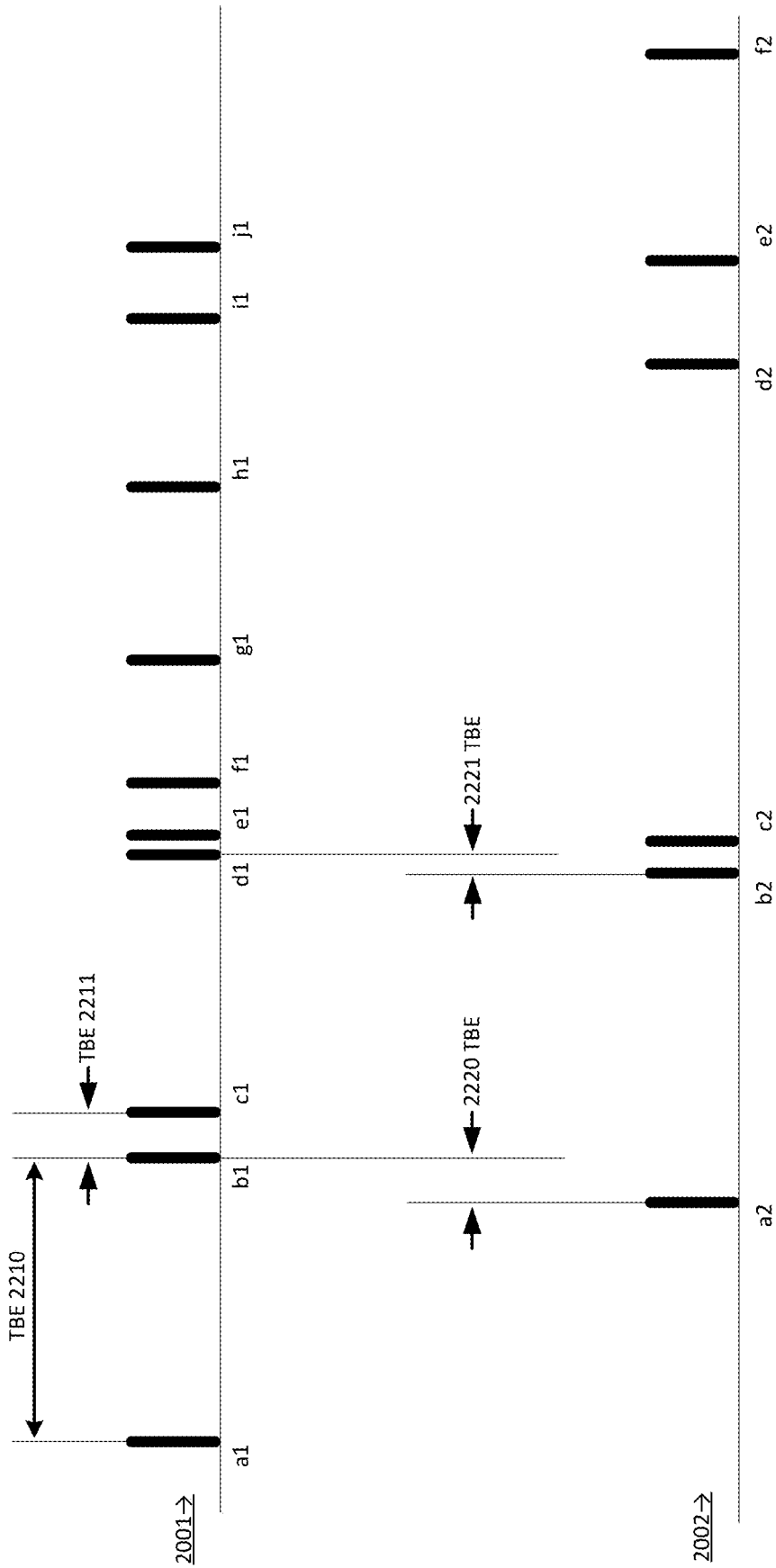
FIG. 22 depicts the same spike streams of FIG. 21, except examples of two types random, inter-spike, delay are highlighted.

FIG. 22 depicts the same spike streams of FIG. 21, except examples of two types random, inter-spike, delay are highlighted.

FIG. 22 highlights two Intra-Stream (IS) spike pairs, within a stream 2001:
  IS spike pair comprised of spikes a1 and b1, and
  IS spike pair comprised of spikes b1 and c1.

FIG. 22 also highlights two Cross-Stream (CS) spike pairs, for streams 2001 and 2002:
  CS spike pair comprised of spikes a2 and b1, and
  CS spike pair of spikes b2 and d1.

The temporal spacing between two successive spikes, where the spikes occur in same or separate streams, can be referred to as the Time Between the Events (TBE) of a spike pair. (In the '590 application, the TBE of an IS spike pair is referred to as an Inter-Spike Gap or ISG.) In this patent, we will be mostly discussing the TBE of a CS spike pair. A CS Spike Pair can also be referred to herein as a CSSP, and an IS Spike Pair can also be referred to herein as an ISSP. Successive CSSP's, as produced by a selection of two spike streams, can be referred to as a CS spike pair stream (or CSSP stream).

FIG. 22 highlights the following two TBE's of IS spike pairs:
  TBE 2210, of spikes a1 and b1, and
  TBE 2211, of spikes b1 and c1.

FIG. 22 also highlights the following two TBE's of CSSP's:
  TBE 2220 between spikes a2 and b1, and
  TBE 2221 between spikes b2 and d1.

Unless otherwise limited, the temporal extent of a TBE can be essentially any value, from arbitrarily close to 0 to arbitrarily close to infinity.

As discussed above, within each stream of ISSP's or CSSP's, the temporal spacing can be expected to be random, except for those CS spike pairs for which a correlation has been found. The random distribution of an ISSP or CSSP stream is often a Poisson distribution. While random, each stream of ISSP's or CSSP's can be expected to have a relatively constant average temporal spacing. This average temporal spacing can also be expressed as an average rate of spike pair occurrence, or r_avg.

As was mentioned, in addition to stochastic content, a stream of CSSP's can have non-random content, and the present invention is directed to the detection of non-random CSSP's. When a non-random CSSP occurs, the spikes of which it is formed can be expected to have a fixed temporal relationship (subject to the limitations present in any realistic signaling system, such as jitter).

While having a fixed temporal relationship, such spikes (for reasons beyond jitter, and inherent to the operation of systems such as spiking neural networks) can generally be expected to occur at different times. In addition, it may be the case that one or both spikes, that are part of a non-random CSSP, will not reliably manifest themselves in their respective spike streams (although when they occur, such spikes are expected to have a fixed temporal relationship to each other). Because a non-random CS spike pair represents multiple spikes sharing in the manifesting of some underlying event, we may refer to it as a "shared" CS spike pair. A manifesting spike, of a shared CS spike pair, can be referred to as a "shared" CS spike (or simply as a shared spike).

In contrast to shared CS spike pairs, random CS spike pairs represent spike pairs where the occurrence of one spike is independent of the occurrence of another. We may therefore refer to the spikes of a random CS spike pair as an "independent" CS spike (or simply as an independent spike). The average rate of occurrence of these independent spikes can be expressed as r_ind (rather than r_avg).

After application of the correlation invention of the '590 application, one can expect shared CS spike pairs to have a temporal separation (or TBE) close to zero. The present invention seeks to determine a maximal temporal distance, referred to herein as a "Time Of Discernment" (or TOD). A CS spike pair with a TBE equal to or less than TOD is classified as comprised of shared spikes, while a CS spike pair with a TBE greater than TOD is regarded as independent.

The determination of a TOD is based upon an understanding of how independent and shared spikes interact, once correlation is found. This will be explicated with the assistance of FIGS. 25A-25B. FIGS. 25A-25B each presents a type of graph that depicts, for a particular CS spike pair stream, the relationship between rate (vertical axis) and temporal separation (horizontal axis, labeled "TBE"). The particular numbers, of the TBE axis, are for purposes of example only.

FIG. 25A is intended to illustrate the behavior of a CS spike pair stream with only stochastic content. It depicts the fact that, across all temporal separations, CSSP's can be expected to exhibit an approximately uniform average rate of occurrence, that is r_ind (as discussed above).

In contrast, FIG. 25B is intended to illustrate, for a temporal separation of TOD 2510 or less, however, the additional rate of the shared spikes (if shared spikes are present) that are added to r_ind. We shall refer to this combination rate, labeled 2530 in FIG. 25B, as the shared rate or r_shr. Therefore, a TOD such as 2510 can be determined by finding a temporal separation with the following characteristics:

For all greater TBE's the rate of CSSP's is lower (e.g., drops to r_ind 2521 in FIG. 25B); and For all equal to or smaller than temporal separations (with respect to TOD), the rate of TBE's is higher (e.g., increases to r_shr 2530).

FIG. 25B also depicts the fact that, even within the range of temporal separations ≤TOD, there is still the background random rate of CSSP occurrence (indicated as 2520 in FIG. 25B). This background rate is added to the rate of the shared CSSP's, resulting in the combined level of r_shr. The background rate of r_ind indicates that a certain number of false positives can be expected.

Figure 23:
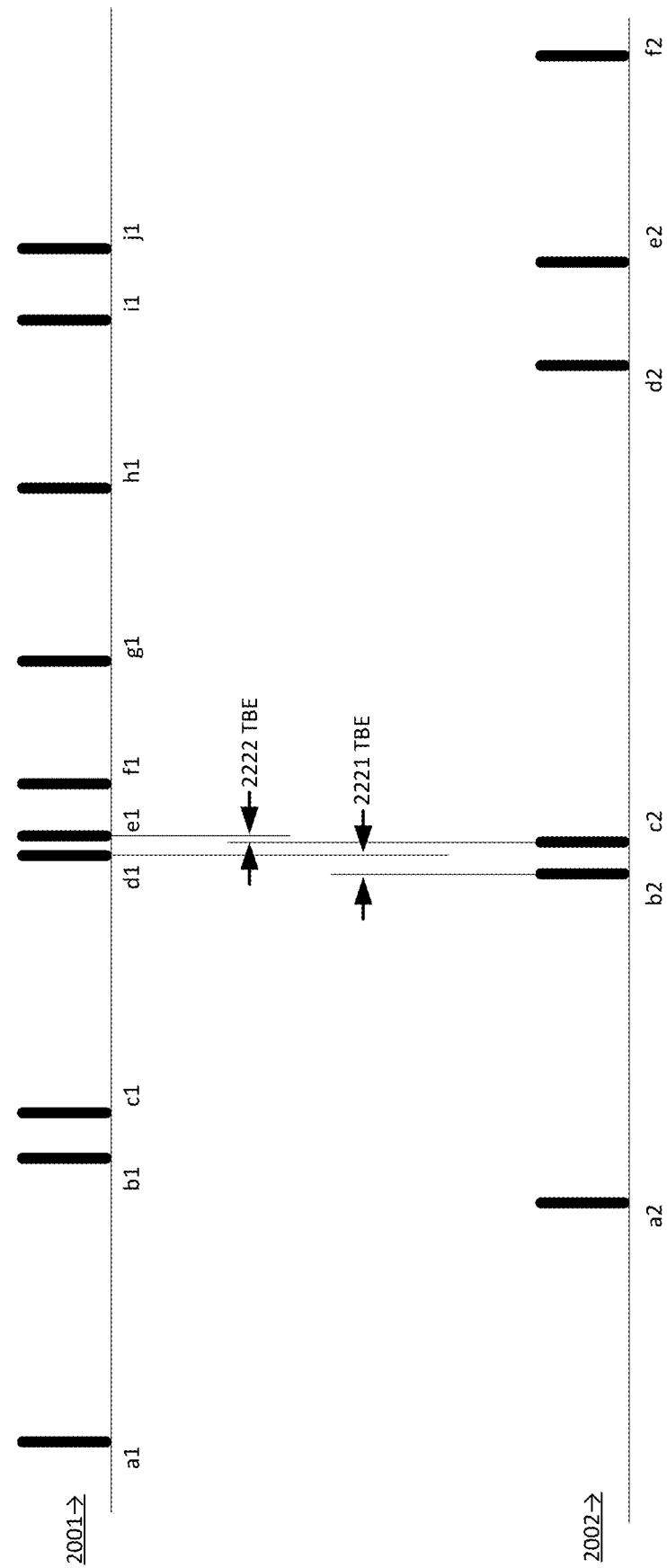
FIG. 23 illustrates only two CSSP TBE's for purposes of emphasizing the central problem of the present invention: determining the "Time Of Discernment" or TOD.

FIG. 23 illustrates only two CSSP TBE's for purposes of emphasizing the central problem of the present invention: determining the "Time Of Discernment" or TOD. For purposes of example, we shall regard TBE 2221 as >TOD, and therefore spikes b2 and d1 as not shared. TBE 2222 shall be regarded as sufficiently small such that c2 and e1 are regarded as shared spikes.

2 EXAMPLE EMBODIMENT

In order to present example embodiments, it will be useful to introduce additional nomenclature. In particular, it is useful to distinguish between two types of TOD's:

TOD_a: The actual TBE temporal separation, after which the rate of CSSP's drops from r_shr to r_ind.

TOD_c: For an embodiment seeking to determine TOD_a, TOD_c represents the currently conjectured value.

Although embodiments of the present invention cannot directly detect TOD_a, they can detect a gradient, separating TOD_c from TOD_a, and thereby search for progressively more accurate estimates of TOD_a.

Similarly, it is useful to distinguish between two types of r_ind:

r_ind_a: The actual rate of CSSP's, for temporal separations greater than TOD_a.

r_ind_c: For an embodiment seeking to determine r_ind_a, r_ind_c represents the currently conjectured value, based on CSSP's>TOD_c.

Once again, although embodiments of the present invention cannot directly detect r_ind_a, they can detect a gradient, separating r_ind_c from r_ind_a, and thereby search for values of r_ind_c representing more accurate estimates.

Figure 27:
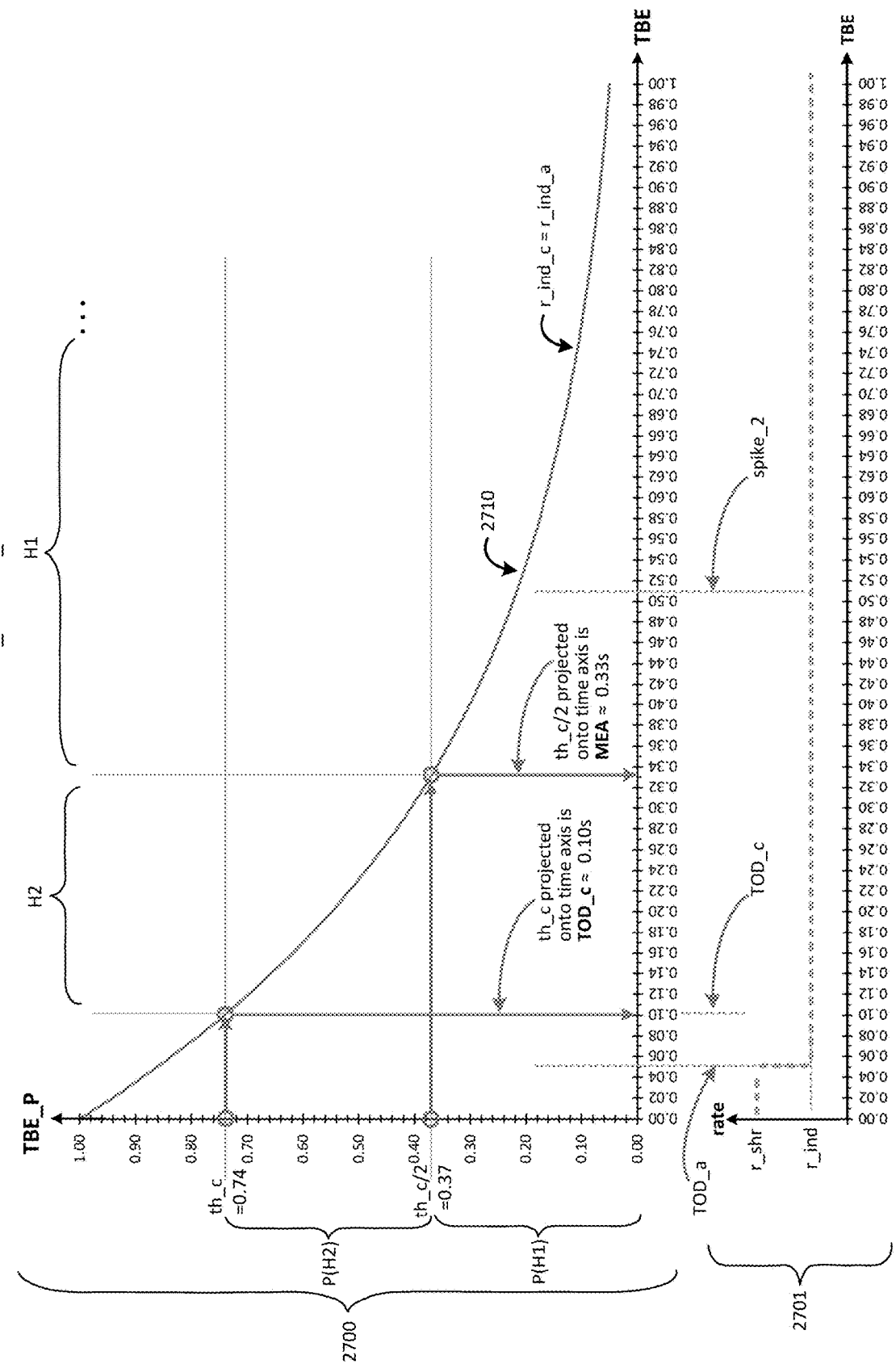
FIGS. 27A-B present a functional view of implementations using TOD_c and r_ind_c.

FIGS. 27A-B present a functional view of implementations using TOD_c and r_ind_c. Specifically, each of FIGS. 27A-B depicts one of two key modes of operation:

FIG. 27A: Depicts situation where TOD_a≤TOD_c, which we shall refer to as a "first mode" or a "mode one." For the example shown, TOD_a is pictured at 0.05 s and TOD_c is at 0.10 s.

FIG. 27B: Depicts situation where TOD_a>TOD_c, which we shall refer to as a "second mode" or a "mode two." For the example shown, TOD_a is pictured at 0.51 s and TOD_c is at 0.10 s.

As can be seen, FIG. 27A consists of the following two main subparts:

Graph 2700: Depicts an exponential decay curve 2710, of the form $e^{-rt}$. The horizontal axis represents a temporal distance (i.e., the TBE) between the first and second spikes of a CSSP. Assume the exponential's rate of decay ("r") is equal to the actual average rate (r_ind_a) of the independent (or randomly spaced) CSSP's. Then, each value along the vertical TBE_P axis represents the following probability. Specifically, if a first spike of an independent CSSP has just occurred, for each time along the horizontal TBE axis, its value of TBE_P represents the probability of occurrence of the second spike, either at time TBE or any time later. Thus, for example, for a first spike at TBE time 0s, the probability of the second spike occurring at 0s, or any time later, is 1 or 100% (according to the TBE_P axis).

Graph 2701: Depicts essentially the same type of graph discussed previously for FIG. 25B, except the TOD_a of FIG. 27A is shown at 0.05 s.

Graph 2700 is also based on the use of two threshold detectors:
- A first threshold detector set to a threshold th_c, where th_c, when projected onto the time axis (i.e., projected onto the TBE axis), by exponential decay 2710, identifies TOD_c. Therefore, this threshold detector identifies the time range of TOD_c to infinity. In FIG. 27A, the example values are th_c=0.74, and the corresponding TOD_c=0.10 s.
- A second threshold detector is set to th_c/2. In FIG. 27A, for purposes of example, th_c/2=0.37. The second threshold detector, when projected onto the time axis, determines the Median Expected Arrival (MEA) time, for the time range TOD_c out to infinity. In the example of FIG. 27A, MEA time is at 0.33 s. Therefore, th_c/2 can be used, as follows, to divide the TOD_c to infinity time range into halves:
  - An earlier half, called H2, where: TOD_c<H2≤MEA. For FIG. 27A, the example range is: 0.10 s<H2≤0.33 s.
  - A later half, called H1, where: MEA<H1≤∞. For FIG. 27A, the example range is: 0.33 s<H2≤∞s.

While the example of halves is being used, for a first introduction of division of the TOD_c to infinity time range, other units of division (such as dividing the range into quarters) can be used. Therefore, we may also refer to each unit of division as a "Region." FIG. 27A shows the use of two Regions, where each is one half of the time range.

The division into halves can be used to converge r_ind_c to r_ind_a as follows:
- For each independent CS spike pair, the second spike (call it spike_2) is regarded as a negative proxy for r_ind_a.
- Whichever half spike_2 happens to be within, adjust r_ind_c such that, in the future, there is an increased likelihood for spikes to occur within the opposite half. For example, FIG. 27A depicts an example spike_2 within H1 at 0.51 s. Therefore, incrementally lower r_ind_c (according to a desired learning rate), since this would tend to shift spikes, in the future, towards H2. In general, the rules for r_ind_c adjustment are as follows:
  - If a second spike, of a CS spike pair, occurs within H1: incrementally lower r_ind_c, such that subsequent spikes will have a greater tendency to occur within H2.
  - If a second spike, of a CS spike pair, occurs within H2: incrementally increase r_ind_c, such that subsequent spikes will have a greater tendency to occur within H1.
- Ignoring the effect of TOD_a for the moment (i.e., assuming the time range, over which r_ind_a is being sought, really does have a uniform rate r_ind_a), it can be appreciated how, statistically, this approach will yield a convergence of r_ind_c towards r_ind_a:
  - if, over time, H1 receives more second spikes, of CS spike pairs, than H2, then it is known that r_ind_c is too high (i.e., it is known that r_ind_c>r_ind_a) by some unknown amount. Therefore, the search-space gradient is indicating that r_ind_a is somewhere below r_ind_c, and r_ind_c should be reduced in order to reduce the difference.
  - if, over time, H2 receives more second spikes, of CS spike pairs, than H1, then it is known that r_ind_c is too low (i.e., it is known that r_ind_c<r_ind_a) by some unknown amount. Therefore, the search-space gradient is indicating that r_ind_a is somewhere above r_ind_c, and r_ind_c should be increased in order to reduce the difference.

The incremental amount, by which r_ind_c is lowered or raised, determines the learning rate, and we shall refer to this amount as R_LR.

Following these rules, if the optimization process happens to begin with r_ind_c lower than r_ind_a, more spikes will occur in H2 than H1, causing a net increase of r_ind_c. Increasing r_ind_c will reduce the time axis projection of th_c (i.e., it will cause TOD_c to be reduced). For purposes of explanation, it will be assumed that the reduction of TOD_c is not sufficient to cause it to exit mode one (i.e., does not cause TOD_c to equal, or be less than, TOD_a). For r_ind_c beginning higher than r_ind_a, adjustments of r_ind_c (i.e., its reduction) cannot cause an exit of mode one (because it increases of the amount by which TOD_c exceeds TOD_a).

Therefore, for this first mode of operation, without additional mechanism (and an additional mechanism will be discussed below), a state of equilibrium can be reached with just r_ind_c equaling r_ind_a, and TOD_a being less than TOD_c. In that situation, an equal number of spikes still occurs in H2 and H1, meaning a net dynamic equilibrium.

FIG. 27B depicts the second major mode of operation, where TOD_a is greater than TOD_c. Like FIG. 27A, FIG. 27B consists of an upper and lower subgraph. The upper subgraph of FIG. 27B is the same as that of FIG. 27A (hence they are both labeled 2700). The lower subgraph of FIG. 27B (labeled 2702) only differs from lower subgraph of FIG. 27A (labeled 2701) by TOD_a exceeding TOD_c.

In the mode two situation, it can be observed that because r_shr always extends into the H2 region by at least some amount (by assumption of TOD_a>TOD_c), and r_shr will always extend a lesser amount (if at all) into region H1, the net rate of spike occurrence for H2 will always be higher than the net rate of spike occurrence for H1. This observation can be used as follows, to adjust TOD_c towards TOD_a:
- If a second spike, of a CS spike pair, occurs within H2: assume it is the result of TOD_a extending at least some unknown amount past TOD_c. Act to reduce the imbalanced rate (between H2 and H1) by incrementally increasing TOD_c towards TOD_a (by incrementally decreasing th_c). While this assumption is not necessarily correct when dealing with individual spike pairs, statistically, over large numbers of spike pairs, there will necessarily be more second spikes in H2 than H1 (so long as TOD_a extends at least some amount past TOD_c).
- If a second spike, of a CS spike pair, occurs within H1: assume it is the result of a balanced rate, between H2 and H1, and therefore incrementally decrease TOD_c (by incrementally increasing th_c). While such decreases will act to slow the approach of TOD_c towards TOD_a (if TOD_c is actually less than TOD_a), they are necessary for when a TOD-learning device eventually achieves the first mode of operation (i.e., achieves TOD_c being equal to, or greater than, TOD_a). In that first mode, once r_ind_c equals r_ind_a, not only will the changes to r_ind_c balance, but the changes to TOD_c will also balance, giving TOD_c a net dynamic equilibrium.

The incremental amount, by which TOD_c is lowered or raised (through adjustment of th_c), determines the learning rate, and we shall refer to this amount as TH_LR.

It should be noted that in mode two, the greater tendency of spikes to occur in H2 than H1 will also cause r_ind_c to increase (since increases are necessary if the TOD-learning device is actually in mode one, and the device is assumed to not know whether it is actually in mode one or two). As mentioned above, such rate increases tend to reduce TOD_c, and therefore act to counteract the incremental increases of TOD_c.

However, eventually, r_ind_c will be raised to a sufficiently high rate, such that each incremental increase of rate (by R_LR) will reduce TOD_c less than the increases of TOD_c (caused by reduction of th_c in units TH_LR). Further, as TOD_c approaches TOD_a, the rate increases will occur with lesser frequency (since the average rate across H2 decreases towards the average rate across H1). Eventually, TOD_c will equal or exceed TOD_a, resulting in the first mode of operation, where equal numbers of spikes (on average) occur in H2 or H1. Thus, in the first mode of operation, the incremental changes to th_c balance and have no effect on the position of TOD_c.

As already mentioned above, in connection with FIG. 27A, under conditions of equilibrium in the first mode, it can be appreciated that, without further mechanism, TOD_c can remain greater than, and not necessarily equal to, TOD_a. This issue can be addressed by adding an additional mechanism for reducing TOD_c. In particular, upon each detection of a spike pair, independent of whether it is in half H2 or H1, th_c can always be increased by a small incremental amount. To prevent the constant (or Region-independent) increase of th_c from having significant influence on the accuracy of the result (the result being a value of TOD_c that is an accurate estimate of TOD_a), the value utilized can be a small fraction of TH_LR. For example, a value of TH_LR/10 or less can be used.

3 PARTITIONED EMBODIMENTS

3.1 Overview

Figure 1:
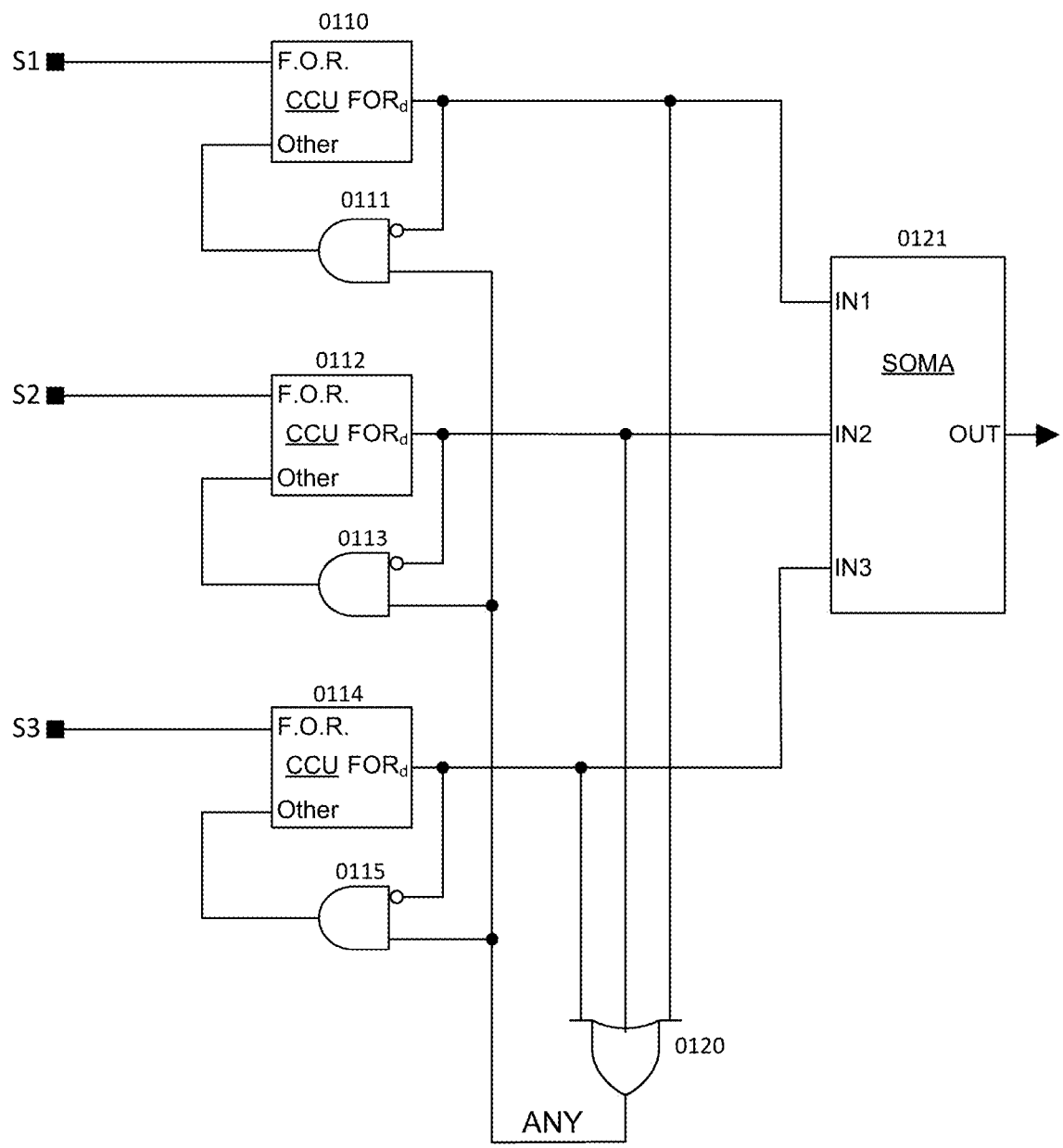
FIG. 1 depicts an example application scenario, of a multi-stream cross correlator, in the area of spiking neural networks.

FIG. 20 corresponds to FIG. 1 of the '590 application. The main difference being that "soma" 0121 of FIG. 1 is replaced with Learn TOD Units 2021 and 2022. Each Learn TOD Unit has identical internal structure, with the only difference being their connection to spike streams 2001 and 2002. Each Learn TOD Unit is designed to learn TOD from CS spike pairs where the first spike, of each pair considered, appears at the "Other" input, and the second spike appears at the "Me" input. As can be seen, this causes Learn TOD Units 2021 and 2022 to operate as follows:

Learn TOD Unit 2021 learns TOD from CS spike pairs where the first spike is from stream 2002 (through CCU 2012), and the second spike is from stream 2001 (through CCU 2010).

Learn TOD Unit 2022 learns TOD from CS spike pairs where the first spike is from stream 2001 (through CCU 2010), and the second spike is from stream 2002 (through CCU 2012).

Thus, in combination, Learn TOD Units 2021 and 2022 can recognize either direction of cross-stream spike pairs, occurring across streams 2001 and 2002, with the output of one Learn TOD Unit or the other driving the "Shared Event" output of OR gate 2015.

Figure 24:
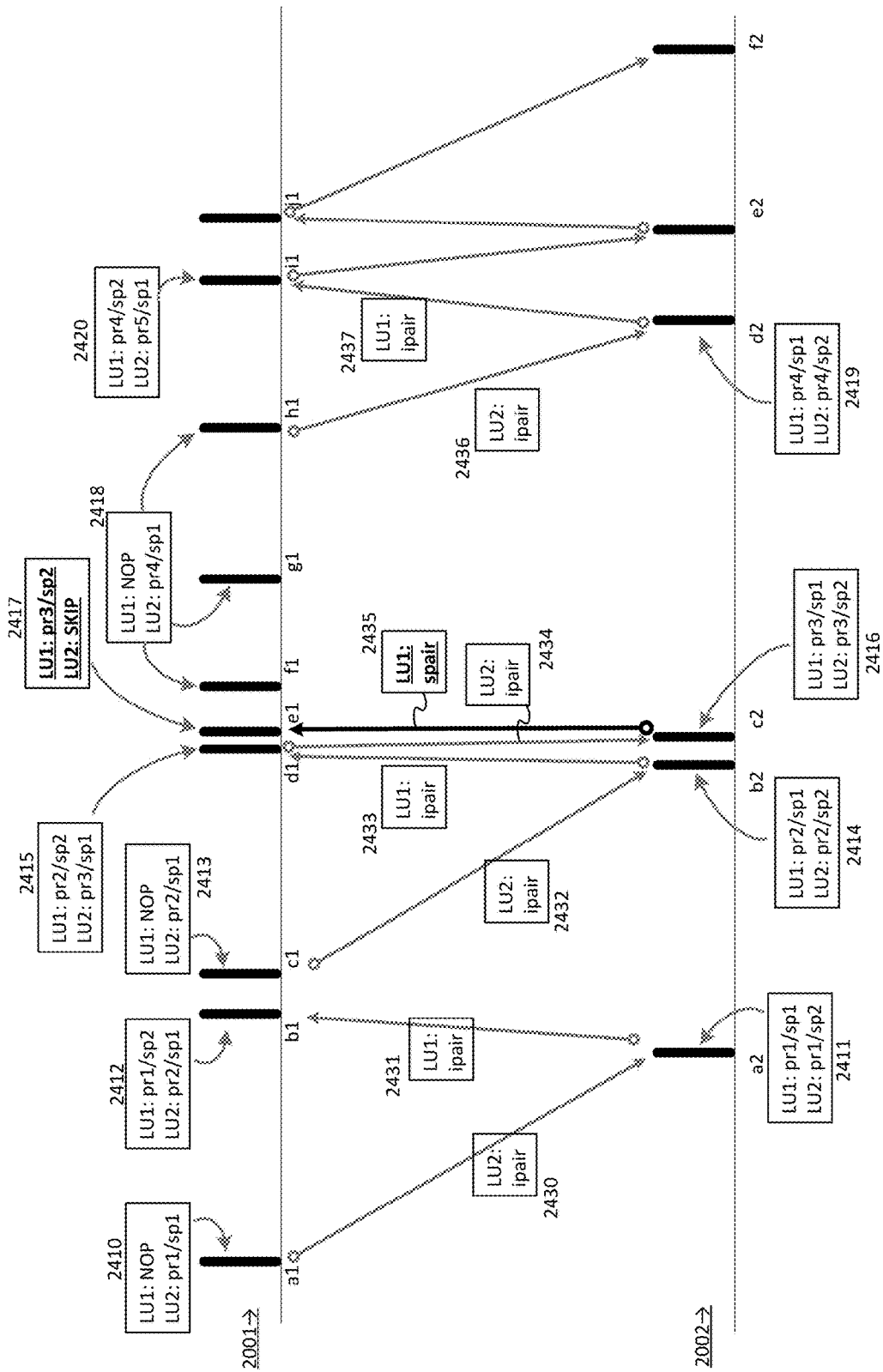
FIG. 24 depicts a simulation, that shows how two instances of the Learn TOD Unit implementation of FIG. 26, if incorporated into the design of FIG. 20, could execute upon spike streams.
Figure 26:
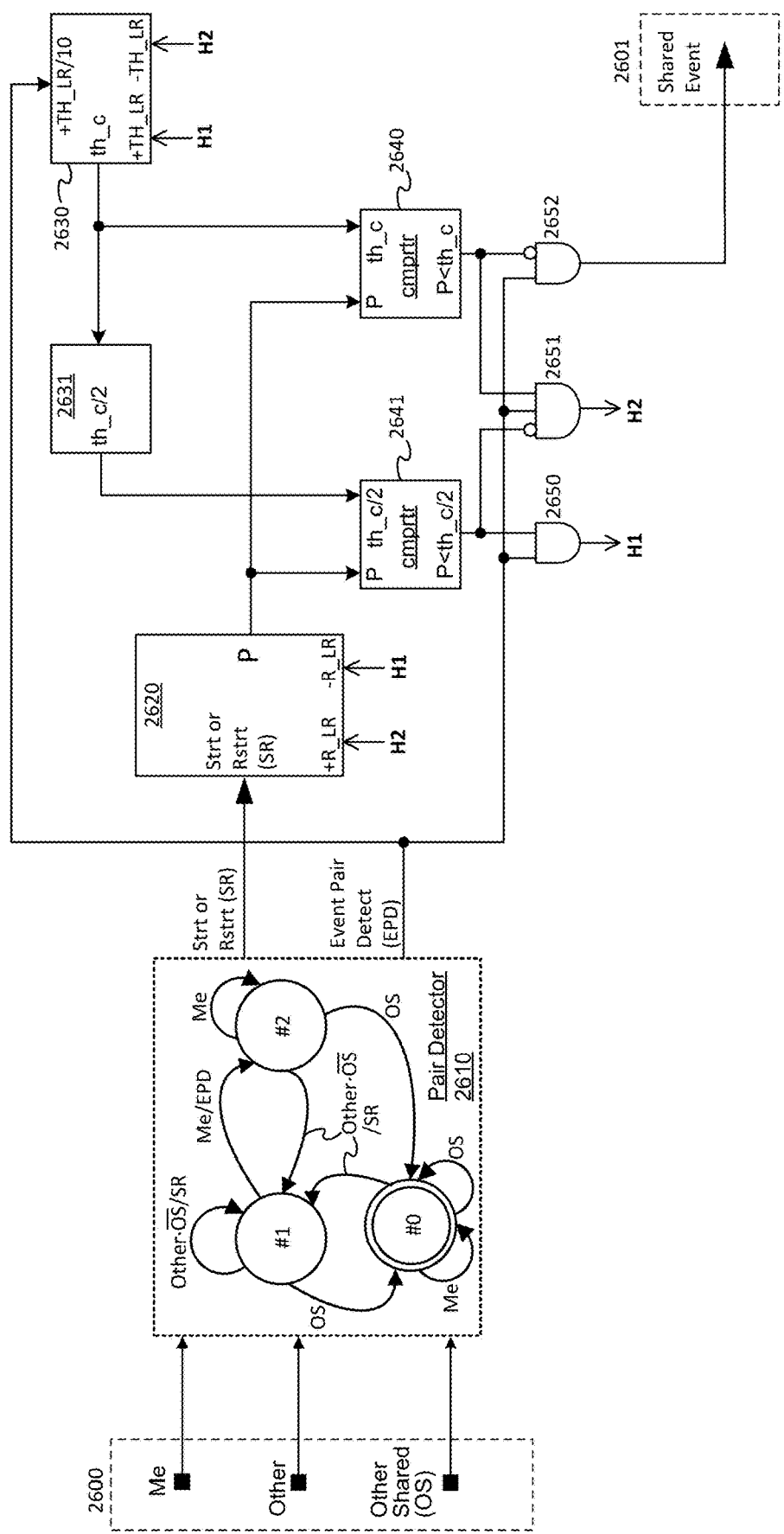
FIG. 26 presents an example partitioning, of an implementation for each of the Learn TOD Units of FIG. 20, particularly suitable for hardware.

In terms of learning to recognize CS spike pairs, the operation of the two Learn TOD Units can be understood with reference to FIGS. 24 and 26.

3.2 Genericized

FIG. 26 presents an example partitioning, of an implementation for each of Learn TOD Units 2021 and 2022, particularly suitable for hardware. While partitioned for a hardware-centric implementation, FIG. 26 is also relatively genericized, with respect to the particular technology implementation chosen.

As can be seen, for each Learn TOD Unit, its "Me," "Other," and "Other Shared" inputs are directed to a state machine 2610, called a "Pair Detector."

The purpose of Pair Detector 2610 is to detect each occurrence of a pair of successive spikes, where (among other potential requirements) the first spike occurs at the Other input, and the immediately successive spike occurs at the Me input. Upon a power-up signal or reset, Pair Detector 2610 can be designed to begin in state #0.

The directed edge from state #0 to state #1, of Pair Detector 2610, indicates that when a spike is received at the Other input, it transitions to state #1 while outputting a pulse at its "Start or Restart" (SR) output. The SR pulse triggers an exponential decay block 2620. Decay block 2620 generates an exponentially decaying value at its "P" (or "Probability") output. As discussed above, with respect to FIGS. 27A-27B, the exponential decay (if its rate of r_ind_c is a good approximation of r_ind_a) represents a probability value, that begins at 1 and decays towards 0. If exponential decay block 2620 is already undergoing an exponential decay, when another SR trigger pulse arrives, the decay process is restarted (at 1). In accordance with one example approach to implementation, the value at the "P" output can be represented by a voltage.

As the decay process proceeds, the value of "P" is evaluated by comparators 2640 and 2641, through the use of reference standards, respectively, 2630 and 2631. Specifically, reference standard 2630 provides a signal (typically a voltage) representative of th_c, while 2631 outputs a division of th_c by two. Comparator 2640 asserts its output line when P drops below th_c. Thus, in terms of time, comparator 2640 only asserts its output after TOD_c has elapsed. Similarly, comparator 2641 asserts its output line when P drops below th_c/2. Thus, in terms of time, comparator 2641 only asserts its output after the MEA time (of the time domain TOD_c to infinity) has elapsed.

If a spike is received at the "Me" input, while already in state #1, Pair Detector 2610 transitions from state #1 to state #2. This transition to state #2 causes state machine 2610 to output a pulse at its Event Pair Detect (EPD) output. EPD is applied to AND gates 2650-2652, that decode the output of the comparators:

As can be seen, AND gate 2652 asserts its output (which becomes the Shared Event output of a Learn TOD Unit) when P has not, as of the time of EPD, dropped below th_c.

AND gate 2651 identifies whether P is within H2 (of FIGS. 27A-B) by determining that P is below th_c but is not below th_c/2.

AND gate 2650 identifies whether P is within H1 by determining that P is below th_c/2.

If the transition from state #1 to state #2 causes a first Learn TOD Unit to assert its Shared Event output, (in accordance with FIG. 20) that output will appear as an "Other Shared" (OS) input at a second Learn TOD Unit. The assertion of the OS input forces Pair Detector 2610, of the second Learn TOD Unit, to state #0 (if it is not already in state #0). Returning to state #0 guarantees that the same spike, causing the first Learn TOD Unit to recognize a shared CS spike pair, cannot serve, at the second Learn TOD Unit, as the first spike of another spike pair.

As discussed previously, with respect to FIGS. 27A-B, the conjectured rate of independent CS spike pairs (r_ind_c) is made to approach the actual rate of such spike pairs (r_ind_a) through adjustments to rate based upon whether the second spike, of a CS spike pair, is within Region H2 or H1. The learn rate for such adjustments has been described by the variable R_LR. As can be seen in FIG. 26, exponential decay unit 2620 is shown as having two rate-adjustment inputs: one labeled +R_LR (where a pulse at this input increases the rate of decay by R_LR), and the other −R_LR (where a pulse decreases the rate of decay by R_LR). As can be seen, a spike determined as within H2 (by AND 2651) causes a pulse at the +R_LR input, while a spike determined as within H1 (by AND 2650) causes a pulse at input −R_LR.

Similarly, FIGS. 27A-B have been discussed with respect to adjusting th_a (or, respectively, TOD_c towards TOD_a) based upon whether the second spike, of a CS spike pair, is within Region H2 or H1. The learn rate for such adjustments has been described by the variable TH_LR. As can be seen in FIG. 26, reference standard 2630 is shown as having two level-adjusting inputs: one labeled +TH_LR (where a pulse at this input decreases TOD_c by increasing th_c), and the other −TH_LR (where a pulse at this input increases TOD_c by decreasing th_c). As can be seen, a spike determined as within H1 causes a pulse at the +TH_LR input, while a spike determined as within H2 causes a pulse at input −TH_LR. Adjusting the output of 2630 automatically causes an adjustment at the output of 2631, since 2631 acts to divide by two the current signal output of 2630.

FIG. 24 depicts a simulation, that shows how two instances of the Learn TOD Unit implementation of FIG. 26, if incorporated into the design of FIG. 20, could execute upon spike streams 2001 and 2002. The simulation is for spikes a1-i1 of stream 2001, and spikes a2-d2 of stream 2002. Over the course of these spikes, a total of eight CS spike pairs are identified, with all pairs being independent, except for the pair of spikes c2 and e1 (also expressible as (c2, e1)). Because this independent spike pair ends at stream 2001 (i.e., its second element is in stream 2001), it is recognized by Learn TOD Unit 2021.

To reduce graphical space, FIG. 24 uses the following abbreviations:

Learn TOD Unit 2021 is "LU" and Learn TOD Unit 2022 is "LU2."

"pr" and "sp" are, respectively, "pair" (meaning pair of spikes) and "spike." Therefore, for example, "pr1" means the first pair of spikes recognized in a stream of spike pairs, and "sp1" means a first spike, of a pair, has been recognized.

"ipair" means an independent cross-stream pair is recognized, and "spair" means a shared cross-stream pair has been found.

NOP means "No Operation" is performed as a result of a spike.

SKIP means a spike is skipped from consideration, for whether it is part of a spike pair.

Spike-by-spike simulation of the operation of LU1 and LU2 (both assumed to start in state #0) can be described as follows:

a1 (see also notation box 2410):
  LU1: Applied to its Me input, executes a NOP, with state machine 2610 simply circling back to state #0.
  LU2: Applied to Other input, causes its state machine 2610 to transition from state #0 to state #1, while asserting the "SR" or "Start or Restart" signal. Therefore, LU2 has recognized a first spike of a potentially first spike pair to be recognized. The assertion of SR starts a timing operation.

a2 (see also notation box 2411):
  LU1: Applied to Other input, causes its state machine 2610 to transition from state #0 to state #1, while asserting the "SR" or "Start or Restart" signal. Therefore, LU1 has recognized a first spike of a potentially first spike pair to be recognized. The assertion of SR starts a timing operation.
  LU2: Causes its state machine 2610 to transition from state #1 to state #2, while asserting the "EPD" or "Event Pair Detect" signal. For purposes of example, assume temporal separation of spikes a1 and a2>TOD_c. Therefore, an independent cross-stream pair has been recognized by LU2 (indicated by notation box 2430).

b1 (see also notation box 2412):
  LU1: Causes its state machine 2610 to transition from state #1 to state #2, while asserting the "EPD" or "Event Pair Detect" signal. For purposes of example, assume temporal separation of spikes a2 and b1>TOD_c. Therefore, an independent cross-stream pair has been recognized by LU1 (indicated by notation box 2431).
  LU2: Applied to Other input, causes its state machine 2610 to transition from state #2 to state #1, while asserting the "SR" or "Start or Restart" signal. Therefore, LU2 has recognized a first spike of a potentially second spike pair to be recognized. The assertion of SR starts a timing operation.

c1 (see also notation box 2413):
  LU1: Causes its state machine 2610 to perform a NOP, where it reflexively transitions from state #2 back to state #2, and asserting no output signal.
  LU2: Causes a complete repeat of the operations described above, when spike b1 was applied to Other input. The only difference is that the timing operation starts from the time of spike c1, rather than b1.

b2 (see also notation box 2414):
  LU1: Applied to Other input, causes its state machine 2610 to transition from state #2 to state #1, while asserting the "SR" or "Start or Restart" signal. Therefore, LU1 has recognized a first spike of a potentially second spike pair to be recognized. The assertion of SR starts a timing operation.
  LU2: Causes its state machine 2610 to transition from state #1 to state #2, while asserting the "EPD" or "Event Pair Detect" signal. For purposes of example, assume temporal separation of spikes c1 and b2>TOD_c. Therefore, another independent cross-stream pair has been recognized by LU2 (indicated by notation box 2432).

d1 (see also notation box 2415):
  LU1: Causes its state machine 2610 to transition from state #1 to state #2, while asserting the "EPD" or "Event Pair Detect" signal. For purposes of example, assume temporal separation of spikes b2 and d1>TOD_c. Therefore, an independent cross-stream pair has been recognized by LU1 (indicated by notation box 2433).
  LU2: Applied to Other input, causes its state machine 2610 to transition from state #2 to state #1, while asserting the "SR" or "Start or Restart" signal. Therefore, LU2 has recognized a first spike of a potentially third spike pair to be recognized. The assertion of SR starts a timing operation.

c2 (see also notation box 2416):
  LU1: Applied to Other input, causes its state machine 2610 to transition from state #2 to state #1, while asserting the "SR" or "Start or Restart" signal.

Therefore, LU1 has recognized a first spike of a potentially third spike pair to be recognized. The assertion of SR starts a timing operation.

LU2: Causes its state machine 2610 to transition from state #1 to state #2, while asserting the "EPD" or "Event Pair Detect" signal. For purposes of example, assume temporal separation of spikes d1 and c2>TOD_c. Therefore, another independent cross-stream pair has been recognized by LU2 (indicated by notation box 2434).

e1 (see also notation box 2417):

LU1: Causes its state machine 2610 to transition from state #1 to state #2, while asserting the "EPD" or "Event Pair Detect" signal. For purposes of example, assume temporal separation of spikes c2 and e1≤TOD_c. Therefore, a first shared cross-stream pair has been recognized by LU1 (indicated by notation box 2435). Shortly after the assertion of EPD, the "Shared Event" output of LU1 is asynchronously asserted, and applied to the "Other Shared" (OS) input of LU2.

LU2: Rather than transition from state #2 to state #1, and recognize the first spike of a potentially fourth spike pair to be recognized, the OS input to LU2 is asserted. Assertion of OS causes LU2's state machine to transition from state #2 to state #0. This prevents spike e1 from being part of another CS spike pair, because e1 is already part of a shared CS spike pair. Therefore, spike e1 is skipped from consideration by LU2.

f1, g1, and h1 (see also notation box 2418):

LU1: Applied to its Me input, f1, f1, and h1 cause LU1 to execute a NOP, with its state machine 2610 simply circling back to state #2. (Similar to operation of LU1 on spike a1.)

LU2: Applied to Other input, f1 causes its state machine 2610 to transition from state #0 to state #1, while asserting the "SR" or "Start or Restart" signal. Upon each of g1 and h1, simply circles back to state #1, while re-asserting the SR signal each time. Therefore, LU2 recognizes three times, a first spike of a potentially fourth spike pair to be recognized. Each assertion of SR starts or re-starts a timing operation, with the last timing operation started as of h1.

d2 (see also notation box 2419): Operations performed by LU1 and LU2 are essentially identical to what is described above, upon receipt of spikes a2, b2, or c2.

i1 (see also notation box 2420): Operations performed by LU1 and LU2 are essentially identical to what is described above, upon receipt of spikes b1, c1, or d1.

3.3 Electrical Circuit Implementation

Figure 29:
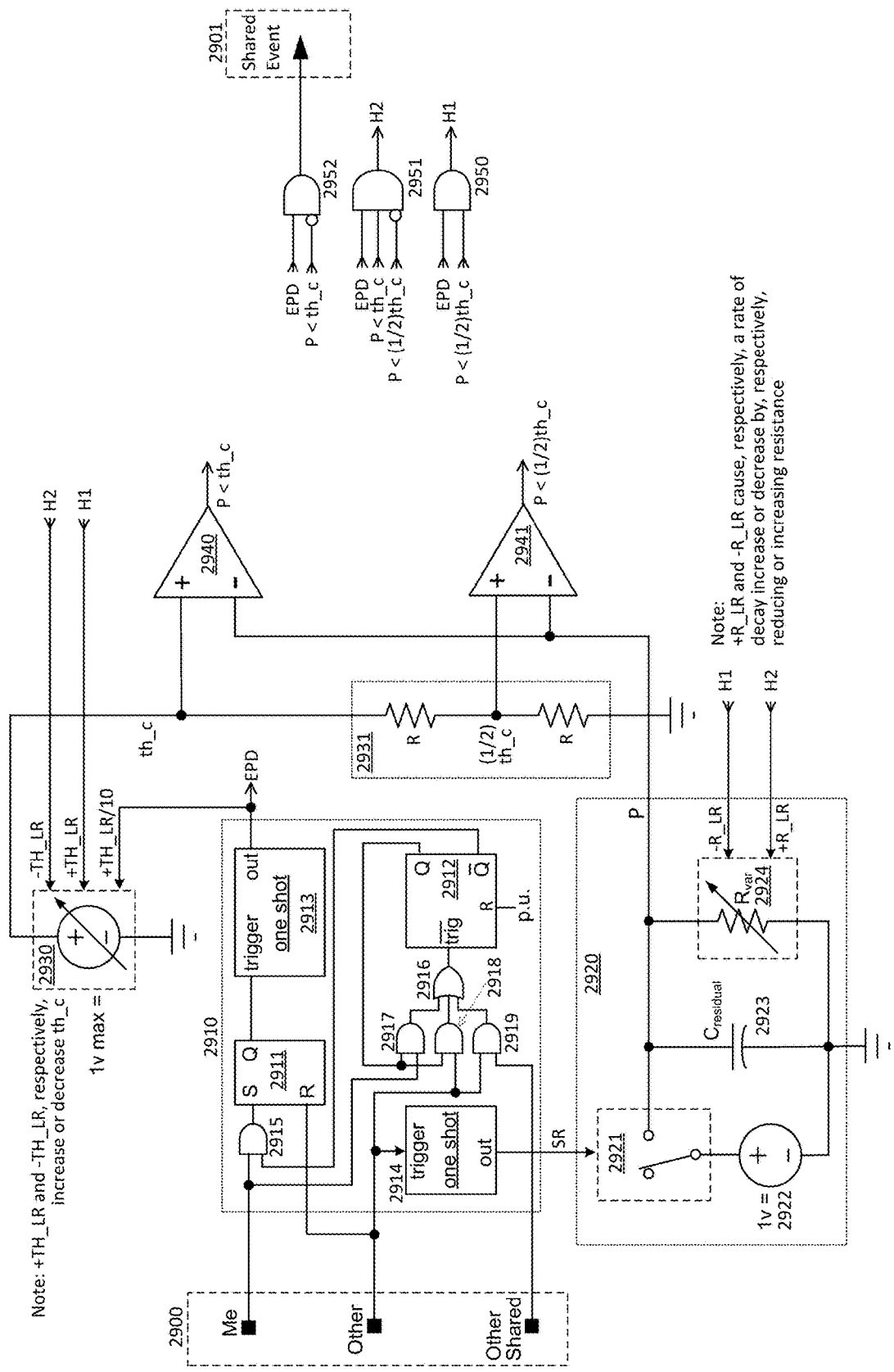
FIG. 29 depicts an example electrical circuit-level implementation, in accordance with the hardware partitioning of FIG. 26.

FIG. 29 depicts an example electrical circuit-level implementation, in accordance with the hardware partitioning of FIG. 26. The correspondences between FIGS. 26 and 29 are as follows:

External input interface 2600 (external to a Learn TOD Unit) of FIG. 26 corresponds to 2900 of FIG. 29.

External output interface 2601 of FIG. 26 corresponds to 2901 of FIG. 29.

State machine 2610 of FIG. 26 corresponds to outline 2910 of FIG. 29. Just like state machine 2610, 2910 has three inputs (Me, Other, and Other Shared), and two outputs (SR, and EPD). A detailed explanation of state machine 2910 is provided below.

Unit 2920 corresponds to exponential decay unit 2620. As can be seen, exponential decay in 2920 is accomplished by the RC combination of variable resistor 2924 and capacitor 2923. The inputs to increase or decrease the rate of decay for 2620 (respectively +R_LR and −R_LR) are implemented in 2920 by, respectively, reducing or increasing the resistance of 2924. The assertion of 2920's SR input causes switch 2921 to recharge capacitor 2923 with unit voltage source 2922.

Reference standard 2630 corresponds to variable voltage source 2930, that has a max output of 1 volt. The inputs to increase or decrease the threshold produced by 2630 (respectively+TH_LR and −TH_LR) are implemented in 2930 by, respectively, increasing or reducing the voltage of 2924. To ensure a convergence of TOD_c towards TOD_a, when TOD_c happens to be >TOD_a (meaning equilibrium could be reached, just on the basis of an appropriate value of r_ind_c), the EPD output of 2910 provides a Region-independent signal to 2930. As discussed above, with respect to the genericized hardware implementation, the adjustment of th_c by each EPD pulse can be made much smaller (e.g., an order of magnitude or less) than the Region-dependent adjustments.

The division of th_c by two by 2631 is implemented very simply, in FIG. 29, by voltage divider 2931. 2931 is simply two equal-resistance resistors, connected between th_c and ground.

Comparators 2640 and 2641 of FIG. 26 correspond to, respectively, op-amp comparators 2940 and 2941 of FIG. 29.

AND gates 2650-2652 of FIG. 26 correspond to, respectively, AND gates 2950-2952 of FIG. 29.

A detailed explanation, of the operation of state machine 2910, is as follows:

State is kept by two flip-flops: set-reset flip-flop 2911 and negative-edge triggered flip-flop 2912. Both flip-flops are reset (i.e., Q is low) on power-up.

One shots 2913 and 2914 each generates a brief pulse at its output, EPD and SR, respectively, upon a positive edge at its trigger input.

Mostly, a Learn TOD Unit can be expected to be receiving independent CS spike pairs. In this case, state machine 2910 spends most of its time cycling back and forth between the states represented as #1 and #2 in FIG. 26. These states are kept by SR flip-flop 2911.

With flip-flop 2912 in a state of reset, $\overline{Q}$ enables AND 2915, so that it is just a pass-through, to the set input of set-reset flip-flop 2911, of spikes at the Me input of external interface 2900. Similarly, the low state of 2912's Q output disables AND's 2917 and 2918, as potential pass-throughs of signals at, respectively, the Me and Other external inputs. As will be explained shortly below, flip-flop 2912 is used only when a shared CS spike pair occurs.

When processing a mixture of just independent CS spike pairs, possibly intermixed with intra-stream (IS) spike pairs, flip-flop 2911 can operate as follows:

Each spike at the Other input simply re-triggers one-shot 2914, causing a restart of the exponential decay by asserting 2910's SR output.

When a Me spike occurs, s-r flip-flop 2911 is set, causing one-shot 2913 to assert 2910's EPD output, and thus a measure of the temporal delay between the two spikes of a CS spike pair. Further Me spike's, after a Me spike has set s-r flip-flop 2911 are NOP's: since s-r flip-flop 2911 remains set, no additional EPD pulses are generated by one-shot 2913.

For a first Learn TOD Unit, its state machine 2910 is affected when a shared CS spike pair is detected by its companion (or second) Learn TOD Unit. In following explanation, we will focus on the perspective of the state machine of the first Learn TOD Unit:

The first Learn TOD Unit's Other Shared (OS) input is asserted while a spike is present that is a Me spike for the second Learn TOD Unit and an Other for the first Learn TOD Unit. The simultaneous assertion of the Other and OS inputs, for the first Learn TOD Unit, cause AND gate 2919 to produce a high level (through OR 2916) at flip-flop 2912's trigger input.

Once the Other and OS inputs, for the first Learn TOD Unit, become de-asserted, the negative-edge triggered flip-flop 2912 changes state, causing Q to produce a logical 1 (or high signal) and $\overline{Q}$ to produce a logical 0 (or a low signal). At this point, we will say that flip-flop 2912 is in a logical 1 state.

The logical 1 state of flip-flop 2912 means that, if the next spike for the first Learn TOD Unit is at the Me input, it will not be paired with the just-prior Other spike—the logical 0 state of $\overline{Q}$ disables AND gate 2915. Thus, the logical 1 state, of flip-flop 2912, prevents the first Learn TOD Unit from trying to pair a spike that has already been identified as part of a shared CS spike pair.

The logical 1 output of flip-flop 2912 causes the Q output to enable AND gates 2917 and 2918. These ensure that regardless of whether the next spike is at the Me or Other input, when that next spike is de-asserted, flip-flop 2912 will transition back to a logical 0 state.

4 PSEUDO-CODE IMPLEMENTATION

As an alternative to the hardware-centric approach of Section 3, a Learn TOD Unit can also be implemented in software (or by any appropriate combination of software and hardware, as determined by the constraints of the particular application environment).

Figure 28:
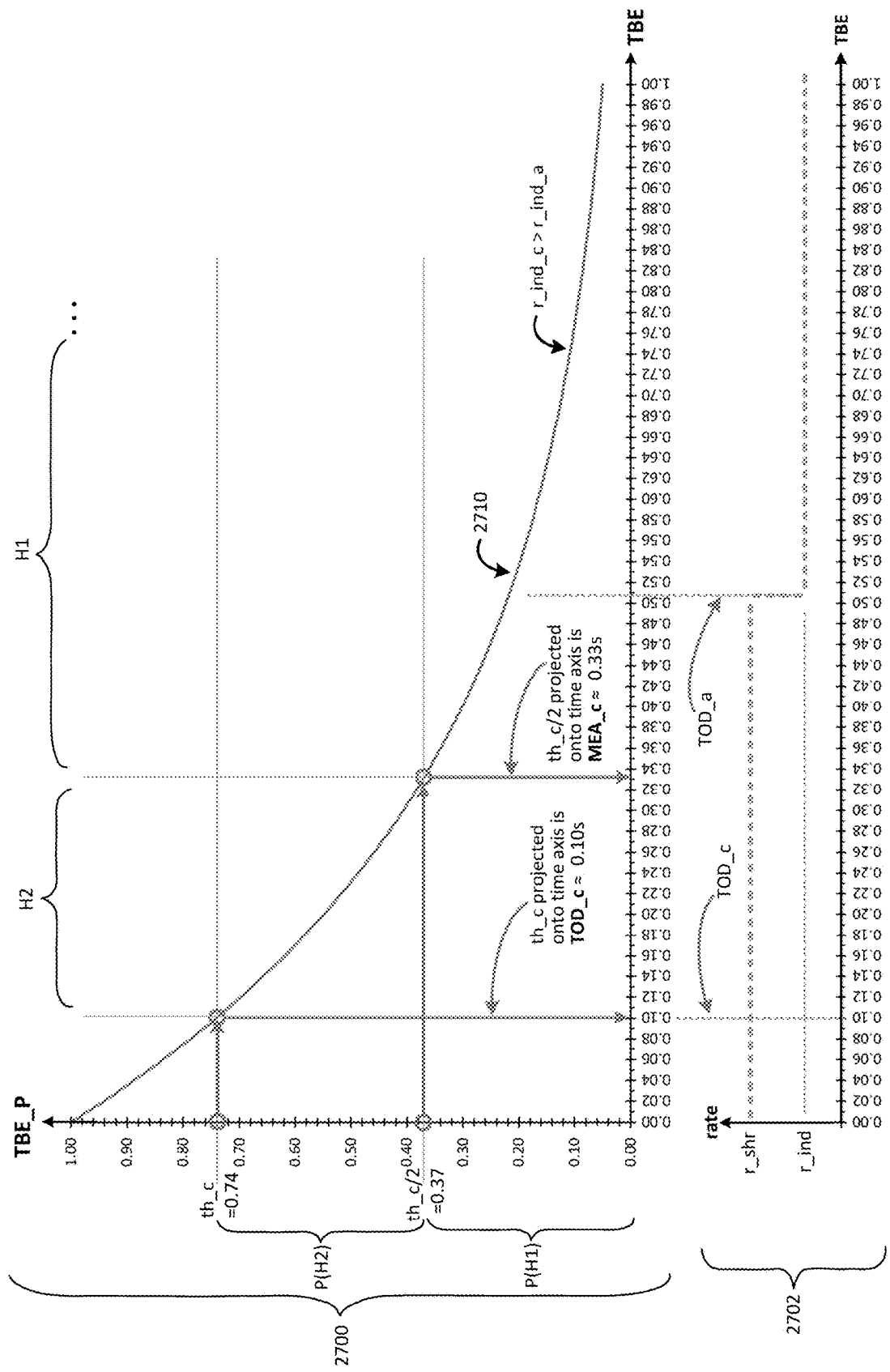
FIGS. 28A-B present an example pseudo-code implementation, for each of the Learn TOD Units of FIG. 20.

FIGS. 28A-B present a pseudo-coded procedure, called Learn_TOD_H2H1, for an example software-centric approach. The pseudo-code is based on the Python programming language.

Each executing instance, of the pseudo-code of FIGS. 28A-B, corresponds to either Learn TOD Unit 2021 or 2022 of FIG. 20.

Lines 5-13 of FIG. 28A introduce certain global variables, while lines 15-26 introduce internal variables, local to each instance of Learn_TOD_H2H1.

Lines 28-34 of FIG. 28A address the case of a spike applied to a Learn TOD Unit's Other input.

If the "elif" of line 36 (of FIG. 28A) tests positive, it is known that a new CS spike pair has just been identified, where the current spike is applied to the Me input, and the just-prior spike was applied to the Learn TOD Unit's Other input. All the remaining pseudo-code addresses the case where line 36 tests positive.

Line 38 determines the temporal spacing between the spikes of the current CS spike pair.

Line 39 converts this into a probability, by application of exponential decay to a unit value (and assuming r_ind_c is an accurate estimate of r_ind_a).

Line 43 sets the indicator, for a next invocation of this instance of Learn_TOD_H2H1, that the prior event was applied to its Me input.

While a CS spike pair has been found, as a result of the current spike's application to the Me input, we still need to ensure that the earlier spike, of the current CS spike, was not found to be part of a shared CS spike pair. This is because, under our model of a shared event, it manifests itself, at most, as a single spike per stream. This is ensured be testing, at line 1 of FIG. 28B, the "lastEventWasShared" variable. If this variable is tested TRUE, processing jumps directly to line 50 of FIG. 28B. Since only the previous spike was found to be part of a previously-identified shared CS spike pair, line 50 sets the value of lastEventWasShared such that the current spike, on a subsequent invocation, can possibly be paired. If lastEventWasShared tested FALSE, however, (the more likely outcome of the test) lines 4-46 become the potential subject of execution. Lines 4-46 are the subject of the remaining explanation of Learn_TOD_H2H1.

Line 4 introduces a Region-independent tendency towards reducing TOD_c, for the situation where TOD_c happens to be >TOD_a, and Region-based adjustment can stabilize by just adjusting r_ind_c sufficiently close to r_ind_a.

Line 8 tests for the possibility that this latest CS spike pair may, in fact, be reflective of a shared underlying event. In that case, lines 10 and 14 are executed:

Line 10 represents, in relation to FIG. 26, the assertion of the "Shared Event" output of external interface 2601.

Since the current spike has been found part of a shared CS spike pair, line 14 ensures the current spike cannot be found part of a subsequent spike pair.

If line 8 evaluates in the negative, it is then known that an independent CS spike pair has been found. The task then becomes (for lines 17-44 of FIG. 28B) one of appropriately adjusting th_c and r_ind_c, on the basis of the current TBE, with the current TBE being used as a negative proxy for TOD_a. Specifically, the current TBE is used as a negative proxy, for a value that TOD_a is not.

Since the current spike has not been found part of a shared CS spike pair, line 20 permits the current spike to possibly part of a subsequent spike pair.

Line 23 performs the function of 2631 of FIG. 26: dividing, at the MEA time, the time range of TOD_c to infinity. Specifically, the TOD_c to infinity time range is divided into halves, with H2 being the earlier half (i.e., before the MEA time), and H1 being the later.

The testing, of whether H2 or H1 is applicable, is performed by line 30, where:

Lines 33-36 are executed if the TBE of the current CS spike pair is found to be in H2. As a negative proxy for TOD_a, adjustments to th_c and r_ind_c are performed, such that future CS spike pairs are more likely to be within the temporal range of H1.

Lines 41-44 are executed if the TBE of the current CS spike pair is found to be in H1. As a negative proxy for TOD_a, adjustments to th_c and r_ind_c are performed, such that future CS spike pairs are more likely to be within the temporal range of H2.

Regardless of whether the just-processed CS spike pair is shared or independent, line 46 ensures th_c always stays within a range appropriate for a probability.

5 MULTI-SCALE, MULTI-SAMPLE

5.1 Overview

The search space formed by TOD_c and r_ind_c is convex, without local minima, so the procedures presented herein will converge towards the solution (i.e., TOD_c=TOD_a, and r_ind_c=r_ind_a). However, as mentioned above with respect to mode two, there can occur temporary situations where the optimization of one variable works against the optimization of another. For example, as discussed above with respect to mode two, the main goal is to increase TOD_c to approach TOD_a (i.e., to make TOD_c=TOD_a, where current state is TOD_a>TOD_c). However, precisely because TOD_a>TOD_c, Region H2 will have a higher rate of spikes than H1, causing r_ind_c to be increased. For a given value of th_c, increasing r_ind_c will tend to make TOD_c smaller (i.e., increase the difference between TOD_c and TOD_a).

Also, poorly chosen initial values, for r_ind_c, TOD_c, or both can increase the time for convergence.

Thus, as a matter of practical efficiency (depending upon the real world application, and its constraints), the Multi-Scale and Multi-Sample techniques of this section can be useful.

5.2 Example Embodiment

Other time scales, other than dividing the TOD_c to infinity time range by two, are possible. For example, FIGS. 30A-B depict the example of dividing the post-TOD_c time range into quarters.

FIG. 30A corresponds to FIG. 27A, in the sense that FIG. 30A also depicts what is called mode one (or a first mode), where TOD_c>TOD_a. Similarly, FIG. 30B corresponds to FIG. 27B, in the sense that FIG. 30B also depicts what is called mode two (or a second mode), where TOD_a>TOD_c.

Along the Probability axis (TBE_P), two additional division points (additional to FIGS. 27A-B) are identified (in each of FIGS. 30A-B:
- mid-point of the th_c/2 to th_c range: (¾)th_c, when projected onto the time axis, locates the MEA of this upper half. We can distinguish this value of MEA as MEA_H2 since it divides the time range of H2. In the example of FIG. 30A-B, (¾)th_c=0.555 and MEA_H2=0.20 s.
- mid-point of 0 to th_c/2 range: (¼)th_c, when projected onto the time axis, locates the MEA of this lower half. We can distinguish this value of MEA as MEA_H1 since it divides the time range of H1. In the example of FIG. 30A-B, (¼)th_c=0.185 and MEA_H2=0.565 s.

Essentially the same logic described above, for utilizing H2 and H1 to adjust th_c towards th_a and r_ind_c towards r_ind_a, can be used for either, or both, of the following two pairs of quarters: Q4 and Q3 (also called Q4/Q3), or Q2 and Q1 (also called Q2/Q1). As indicated within the brackets for H1 and H2, at the top of each of FIGS. 30A-B, the basic logic is that an independent CS spike pair being within H2 causes an increase (hence the "+" sign). The increase is to rate and TOD_c. Conversely, an independent CS spike pair being within H1 causes a decrease (hence the "−" sign). The decrease is to rate and TOD_c.

As indicated within the brackets for Q4 and Q3, at the top of each of FIGS. 30A-B, an independent CS spike pair being within Q4 causes an increase (hence the "+" sign), while an independent CS spike pair being within Q3 causes a decrease (hence the "−" sign). The same notation is applied for the brackets for Q2 and Q1, at the top of each of FIGS. 30A-B: an independent CS spike pair within Q2 causes an increase, while an independent CS spike pair being within Q1 causes a decrease.

If both Q4/Q3 and Q2/Q1 are utilized at the same time, this can be referred to as an example of a multi-sample approach. This is because the post-TOD_c time range is being, in effect, sampled at two different locations.

If both Q4/Q3 and Q2/Q1 are utilized at the same time, and, additionally, H2/H1 are also utilized at the same time, this can be referred to as an example of a multi-scale approach (and it is still multi-sample for the reasons explained just above). This is because the post-TOD_c time range is being, in effect, utilized at two different time-scales: a time-scale based on quarters, and a second time-scale based on halves. It is interesting to note that this particular multi-scale and multi-sample approach simplifies to just utilizing Q4 and Q1. This can be readily appreciated by examining the plus and minus signs, with the brackets at the top of each of FIGS. 30A-B:
- Where H2 overlaps Q3, H2 and Q3 cancel each other, leaving only Q4 in effect.
- Where H1 overlaps Q2, H1 and Q2 cancel each other, leaving only Q1 in effect.

5.3 Example Electrical Implementation

FIG. 31 presents an example electrical circuit-level implementation, of the above-discussed multi-scale (quarters and halves) and multi-sample (Q4/Q3 and Q2/Q1) approach. The circuit of FIG. 31 follows similar hardware partitioning, to that which has already been discussed with respect to FIGS. 26 and 29. The correspondences between FIGS. 29 and 31 are as follows:
- External input interfaces 2900 and 2901 of FIG. 29 remain the same in FIG. 31.
- State machine 2910 of FIG. 29 remains the same in FIG. 31 (although it is only shown in outline form in FIG. 31).
- Exponential decay unit 2920 of FIG. 29 remains the same in FIG. 31.
- Variable voltage source 2930 of FIG. 29 remains the same in FIG. 31.
- Op-amp comparators 2940 and 2941 of FIG. 29 remain the same in FIG. 31. To test for (¾)th_c and (¼)th_c, respectively, op-amp comparators 3120 and 3121 are new to FIG. 31.
- AND gates 2950-2952 of FIG. 29 remain the same in FIG. 31. AND gates 3130-3133, to decode for, respectively, Q1-Q4, are new to FIG. 31.
- OR gates 3140 and 3141, implement the multi-scale and multi-sample approach discussed above. 3140 decodes for increase (of r_ind_c, TOD_c, or both), while 3141 decodes for decrease (of r_ind_c, TOD_c, or both). Also depicted is the fact that this multi-scale and multi-sample approach simplifies to just Q4 meaning increase and Q1 meaning decrease.

5.4 Pseudo-Code Implementation

FIGS. 32A-C depict an alternative to the hardware-centric approach of Section 5.3, for a Multi-Scale, Multi-Sample approach to a Learn TOD Unit.

FIGS. 32A-C present a pseudo-coded procedure, called Learn_TOD_MSMS. The pseudo-code is based on the Python programming language.

Each executing instance, of the pseudo-code of FIGS. 32A-C, corresponds to either Learn TOD Unit 2021 or 2022 of FIG. 20.

The Learn TOD Unit can also be implemented by any appropriate combination of software and hardware, as determined by the constraints of the particular application environment. The tradeoffs are similar to what has been discussed above in Section 4 ("Pseudo-Code Implementation") in relation to the pseudo-coded procedure Learn_TOD_H2H1.

Learn_TOD_H2H1 was presented in FIGS. 28A-B. All the pseudo-code of Learn_TOD_H2H1 is included in Learn_TOD_MSMS. The only functional difference, between Learn_TOD_H2H1 and Learn_TOD_MSMS is the following: the code of FIG. 28B, lines 30-43 has been expanded. The same functionality of FIG. 28B, lines 30-43 has been kept, but additional functionality has been added. Therefore, lines 30-43 of FIG. 28B correspond to the following portion of FIG. 32: FIG. 32B, line 26 to FIG. 32C, line 20. A more detailed comparison of FIGS. 28A-B and FIGS. 32A-C now follows.

FIG. 28B, lines 30-35 address the case where a TBE is within H2. The logic, when the second spike of a CS spike pair is within this Region, is to increase both the lower bound of H2 (i.e., see line 32) and rate r_ind_c (i.e., see line 34). FIG. 32B, lines 26-32 implement the same logic as FIG. 28B, lines 30-35.

Similarly, FIG. 28B, lines 37-43 address the case where a TBE is within H1. The logic, when the second spike of a CS spike pair is within this Region, is to decrease both the lower bound of H2 (i.e., see line 39) and rate r_ind_c (i.e., see line 42). FIG. 32C, lines 1-8 implement the same logic as FIG. 28B, lines 37-43.

In order to implement the additional scale of quarters, however, lines 34-44 of FIG. 32B add the ability to handle quarters Q4/Q3, when a TBE has been tested to be within H2. Line 36 tests for whether the second spike, of a CS spike pair, is within Q4, or Q3. If the spike is within Q4, then the same increase logic is performed (lines 38-39 of FIG. 32B) as was described above for H2 (FIG. 32B, lines 28-30). Similarly, if the spike is within Q3, then the same decrease logic is performed (lines 42-43 of FIG. 32B) as was described above for H1 (FIG. 32C, lines 3-6).

In order to handle quarters Q2/Q1, when a TBE has been tested to be within H1, lines 10-20 of FIG. 32C were added. Line 12 tests for whether the second spike, of a CS spike pair, is within Q2, or Q1. If the spike is within Q2, then the same increase logic is performed (lines 14-15 of FIG. 32C) as was described above for H2 (FIG. 32B, lines 28-30). Similarly, if the spike is within Q1, then the same decrease logic is performed (lines 18-19 of FIG. 32C) as was described above for H1 (FIG. 32C, lines 3-6).

As discussed above in Section 5.3 (Example Electrical Implementation), it is interesting to note that combination of all the multi-scale, multi-sample logic (FIG. 32B, line 23 to 32C, line 20) leads to a simplification where only the following logic is needed:

If a TBE is within Q4 (tested by lines 26 and 36 of FIG. 32B), perform the above-described increase logic for Q4 (FIG. 32B, lines 38-39).

If a TBE is within Q1 (tested by lines 1 and 16 of FIG. 32C), perform the above-described decrease logic for Q1 (FIG. 32C, lines 18-19).

6 FURTHER VARIATIONS

Above Section 5.2 ("Example Embodiment") discusses the utilization of Q4/Q3 and Q2/Q1 as an example multi-sample approach (at a quarters-of-range scale). While Section 5.2 discusses the utilization of Q4/Q3 and Q2/Q1 at the same time, it is worth noting that this is not necessary on an individual spike (or a "spike-by-spike") basis. For example, for an individual spike n, it can be the case that only Q4/Q3 are active. For a spike that occurs i spikes after spike n (i.e., for a later spike n+i), it can be the case that only Q2/Q1 are active.

Further, it is not necessary that Q4/Q3 and Q2/Q1 each be active for a same number of spikes. For example, as part of a sampling process, it can be the case that Q4/Q3 is active for a set x of spikes, and Q2/Q1 is active for a set y of spikes, where the number of members of set x does not equal the number of members of set y (symbolically, |x|≠|y|).

For FIGS. 30A-B, each scale (either halves-of-range or quarters-of-range) is shown as having the following two properties:

1. The regions occupy the entire range of the TBE_P axis, from 0 to th_c.
2. The regions are placed at regular intervals, such that an integer number of regions can occupy the entire range of the TBE_P axis, from 0 to th_c.

Neither of these two properties is necessary.

For the first above-listed property, for example, it can be the case that only Q4/Q3 are used (or "covered") at the quarters-of-range scale. In terms of the discussion just above, where Q4/Q3 is described as active for a set x of spikes and Q2/Q1 is described as active for a set y of spikes, this can be viewed as equivalent to the situation where y={ } and x≠{ } (i.e., only Q4/Q3 is active, and it is active for its set x of spikes).

A disadvantage, of covering only part of the TBE_P axis at a particular scale (which we shall also call a "partial cover"), is that there can be values (of TOD_a, r_ind_a, or both) to which convergence cannot be achieved (at least not without additional gradient detection at other scales). Also, each range added causes some additional complexity, at least with respect to the design of a Learn TOD Unit (such as 2021 and 2022 of FIG. 20), and it can also add implementation (or physical realization) complexity.

Advantages of a partial cover include the following: within its range of operation, it can serve to increase the speed of convergence, increase the stability with which a convergence is approached, or both. Outside its range of operation, a partial cover is unlikely to significantly slow convergence, and it will not reduce the stability of the convergence.

As an example of the second above-listed property, each of Q1-Q4 is depicted (in FIGS. 30A-B) as covering a quarter of the TBE_P axis, from 0 to th_c. For a partial cover, this need not be the case. If Q4/Q3 are to be used as a partial cover, each can be placed as follows (for example) with respect to the TBE_P axis:

Q4: rather than locate it over the range (0.75)th_c to (1.00)th_c, locate it over the range (0.59)th_c to (0.84) th_c Q3: rather than locate it over the range (0.50)th_c to (0.75)th_c, locate it over the range (0.34)th_c to (0.59) th_c Please note the use of the quarters-of-range scale for the example is arbitrary. Without loss of generality, the same techniques can be applied to any other fractional amounts. Further, the use of 0.59, as the division point between Q4 and Q3, is also arbitrary. Without loss of generality, the same techniques can be applied to locate other division points, between quarter-of-range or other fractional amounts.

It is also not necessary that the regions utilized, as part of a search for TOD_a and r_ind_a, be contiguous. For example, with reference to FIGS. 30A-B, it is worth noting that a completely functional embodiment can be realized with the utilization of just Q4 and Q1. (Section 5.2 notes that a utilization of just Q4 and Q1 is the simplified net result, when the following multi-scale and multi-sample approach is used: H2/H1, along with Q4/Q3 and Q2/Q1.) A potential disadvantage to not utilizing Q3 or Q2 is that spikes within their temporal domain will not act to converge towards TOD_a and r_ind_a. A potential advantage, to not utilizing Q3 or Q2, is greater stability in the process by which such convergence proceeds.

In addition, it is not necessary that an even number of regions be utilized, as part of a search for TOD_a and r_ind_a. For example, with reference to FIGS. 30A-B, a completely functional embodiment can be realized with the utilization of the following three regions: Q4, Q3 and H1. The key requirement is probabilistic symmetry. For this example, let us denote the portion of the TBE_P axis, for each of Q4, Q3 and H1, as (respectively) the following: P(4), P(3), and P(H1). The key requirement is that the net probability of the incrementing (or "+") regions equal the net probability of the decrementing (or "−") regions. (As discussed above in Section 5.2, "Example Embodiment," an incrementing region increases r_ind_c and TOD_c upon each spike within its range, while a decrementing region decreases r_ind_c and TOD_c upon each spike within its range.) In this example, we know that P(Q4)+P(Q3)=P(H1). Thus, the only necessary change among these three regions, from what is depicted in FIGS. 30A-B, is the change of Q3 to be an incrementing region like Q4.

A Learn TOD Unit can produce other useful outputs, than whether a shared event is detected. For example, the conjectured discernment threshold (i.e., th_c) can be a useful signal. For the example hardware implementations of FIGS. 29 and 31, this is reflected in the setting (in either analog or digital form) of a variable voltage source (2930). Similarly, the average rate of occurrence of independent Cross-Stream Spike Pairs (independent CSSP's) can also be a useful output. For the example hardware implementations of FIGS. 29 and 31, this is reflected in the setting of a variable resistor (2924).

7 GLOSSARY OF SELECTED TERMS

Additive amplifier: At any instant in time, outputs a voltage that is a sum of the voltages present at its inputs.
Event: Any kind of discrete discontinuity, when considering the time domain behavior of a signal.
One shot: Has an input trigger and one output. Upon receipt of a trigger signal, produces a pulse at its output.
Region: A range of values, along either the probability (i.e., TBE_P) or time (i.e., TBE) axes. For example, the probability range, from 0 to th_c, or (respectively) the time range, from infinity to TOD_c, may be divided such that each Region is a half, or a quarter, of its total extent.
Spike: As used herein, a spike can refer to any event in a signal, when considered in the time domain, that can be regarded as at least one discrete, and discontinuous, transition between two distinct levels. As an example, a spike as used herein can refer to spikes as they are understood to occur in the area of spiking neural networks. As another example, in the area of digital logic, a spike can refer to a sharp transition of a signal (also referred to as an "edge") from a first level to a second level.
Subtractive amplifier: At any instant in time, outputs the voltage resulting from subtracting the voltage present at a second input from the voltage present at a first input.
TBE: Sometimes used herein to refer to the second spike, of a CS spike pair (since TBE is the temporal distance between the spikes of a pair).
Two shot: Has an input trigger and two outputs. Upon receipt of a trigger signal, sequentially produces a pulse at each of its two outputs.

8 COMPUTING EQUIPMENT

In accordance with what is ordinarily known by those in the art, the inventive methods, procedures, or techniques, described herein, can be implemented through the use of any suitable computing hardware, electronic hardware, or a combination of both. Suitable computing hardware can include the use of one or more general purpose computers or processors. Hardware implementation techniques can include the use of various types of integrated circuits, including digital, analog, or a combination of both (e.g., mixed signal). Digital hardware can include programmable memories (volatile or non-volatile).

Such hardware, whether in integrated circuit form or otherwise, is typically based upon the use of transistors (field effect, bipolar, or both), although other types of components (including capacitors, resistors, or inductors) may be included. A variety of component technologies can be used, including optical, microelectromechanical, magnetic, or any combination of the foregoing.

Any computational hardware has the property that it will consume energy, require some amount of time to change state, and occupy some amount of physical space.

Programmable memories are often implemented in integrated circuit form, and are subject to the same physical limitations described above for computational hardware. A programmable memory is intended to include devices that use any kind of physics-based effects or properties, in order to store information in at least a non-transitory way, and for an amount of time commensurate with the application. The types of physical effects used to implement such storage, include, but are not limited to: maintenance of a particular state through a feedback signal, charge storage, changes to optical properties of a material, magnetic changes, or chemical changes (reversible or irreversible).

Unless specifically indicated otherwise, the terms computational hardware, programmable memory, computer-readable media, system, and sub-system, do not include persons, or the mental steps a person may undertake.

For any method, procedure or technique described above, to the extent it is implemented as the programming of a computer or other data processing system, it can also be described as a computer program product. A computer program product can be embodied on any suitable computer-readable medium or programmable memory. The kind of information described herein (such as data and/or instructions), that is on computer-readable media and/or programmable memories, can be stored on computer-readable code devices embodied therein. A computer-readable code device can represent that portion of a memory in which a defined unit of information (such as a bit) can be stored, from which a defined unit of information can be retrieved, or both.

9 APPENDIX

This Appendix is essentially the entirety of the following U.S. Patent Application, herein incorporated by reference in its entirety:

"Method and Apparatus for Cross Correlation," filed 2019 Mar. 17 (y/m/d), having inventor David Carl Barton and App. No. 62/819,590.

App. No. 62/819,590 is also essentially identical to the following PCT International Application, also herein incorporated by reference in its entirety:

"Method and Apparatus for Cross Correlation," filed 2020 Mar. 15 (y/m/d), having inventor David Carl Barton and App. No. PCT/US2020/022869.

9.1 Introduction

Cross correlation is known to have many important applications. Among these, cross correlation is expected to continue to gain importance in the area of spiking neural networks, where relative spike timing can be crucial to proper operation.

FIG. 1 depicts an example application scenario, in the area of spiking neural networks. The inputs on the left are three streams of spikes: S1, S2, and S3. Each spike stream is expected to contain significant random (or stochastic) content.

With regard to the stochastic content, the temporal size of inter-spike gaps (or ISG's) assume a random distribution (often Poisson), and each ISG i is within the following range:

$$0 \text{ sec} < i < \infty \text{ sec}$$

For the full temporal range of i, we shall refer to the average spike rate for a spike stream as $r_{ALL}$ (since it is the rate including all spikes that can occur).

Such content is stochastic both in relation to the stream in which it occurs, as well as relative to the other streams. However, there are also expected to occur non-random events, that manifest themselves across two or more of the input streams. (In the following explanation, we will often refer to a non-random event as simply an "event.")

Each of streams S1, S2, and S3 is coupled to, respectively, an F.O.R. input of a Cross Correlation Unit (or CCU): 0110, 0112, and 0114. Each CCU has an output labeled "FOR$_d$." As can be seen, each FOR$_d$ output connects to an input of a "Soma" 0121. At its most basic functional level, the Soma can be designed to act as a kind of coincidence detector, producing an output spike whenever a spike simultaneously appears at each of its inputs.

In the following discussion, three input streams were chosen for purposes of explanatory convenience. It will be readily appreciated that a system, such as that of FIG. 1, can apply, with no change in principles of operation, to an arbitrarily large number of inputs. A minimum of two input streams is required. As a whole, a system such as FIG. 1 can be viewed as a biologically-inspired model of a neuron. While biologically-inspired, from an engineering (and non-biological) perspective, FIG. 1 can be understood to represent a Multi-stream Cross Correlator or "MCC."

When an event occurs, in two or more input streams of an MCC, its manifestation, in each input stream, is expected to have a fixed temporal relationship, with respect to its manifestation in the other spike streams. While multi-stream manifestations of an event are expected to have a fixed temporal relationship with respect to each other, it is also expected that such manifestations will not occur at a same time.

Any other spike (i.e., any non-event spike), when considered both within the input stream in which it occurs as well as in relation to the other input streams, is expected to have a random relationship with respect to all other non-event spikes. We shall also refer any such non-event spike as a "random spike."

The job of each of CCU's 0110, 0112, and 0114 is to determine a delay, or temporal offset, such that as many event manifestations as possible, across the multiple streams, occur simultaneously at the CCU's outputs (and therefore simultaneously at the inputs to Soma 0121).

More specifically, each CCU of FIG. 01 can be observed as having two inputs:
FOR, and
Other.

"FOR" (that may alternatively be written as "F.O.R.") means "Frame Of Reference." (Unless context indicates otherwise, any use herein of the term "FOR" or "F.O.R." is a reference to a "Frame Of Reference," and not to the preposition "for.") The spike stream presented to a CCU's FOR input appears, after some modification, at the CCU's FOR$_d$ output. A CCU has the possibility of modifying its FOR$_d$ output stream, relative to the spikes appearing at its FOR input, by inserting a delay. The "Other" input, for each CCU, is intended to be a union of the spikes appearing at the FOR$_d$ outputs of the other CCU's (i.e., the other CCU's connected to a same Soma).

As can be seen, the Other input of each CCU is determined as follows. First, the output spikes of all CCU's are unioned together, by OR gate 0120, to form a single combined spike stream. The output of this OR gate is labeled "ANY," because a spike is expected to occur at its output so long as it occurs at the FOR$_d$ output of any CCU.

Each of CCU's 0110, 0112, and 0114 is provided with, respectively, an AND gate 0111, 0113, and 0115. As can be seen, each AND gate filters (i.e., removes) the spike stream its CCU's Other input receives. Specifically, any spikes contributed by that AND gate's CCU are removed.

9.2 Cross Correlation Unit

9.2.1 General Considerations

In contrast to conventional correlation and cross-correlation techniques, the MCC of the present invention relies upon the presence of large numbers (e.g., hundreds or thousands) of random spikes.

The MCC operates by having each CCU operate essentially independently of the other CCU's. The exception to independent operation is the fact that each CCU receives (at its Other input) the union of the FOR$_d$ outputs of the other CCU's (rather than, for example, a union of the spike streams as presented to the FOR inputs of the other CCU's).

Figure 2:
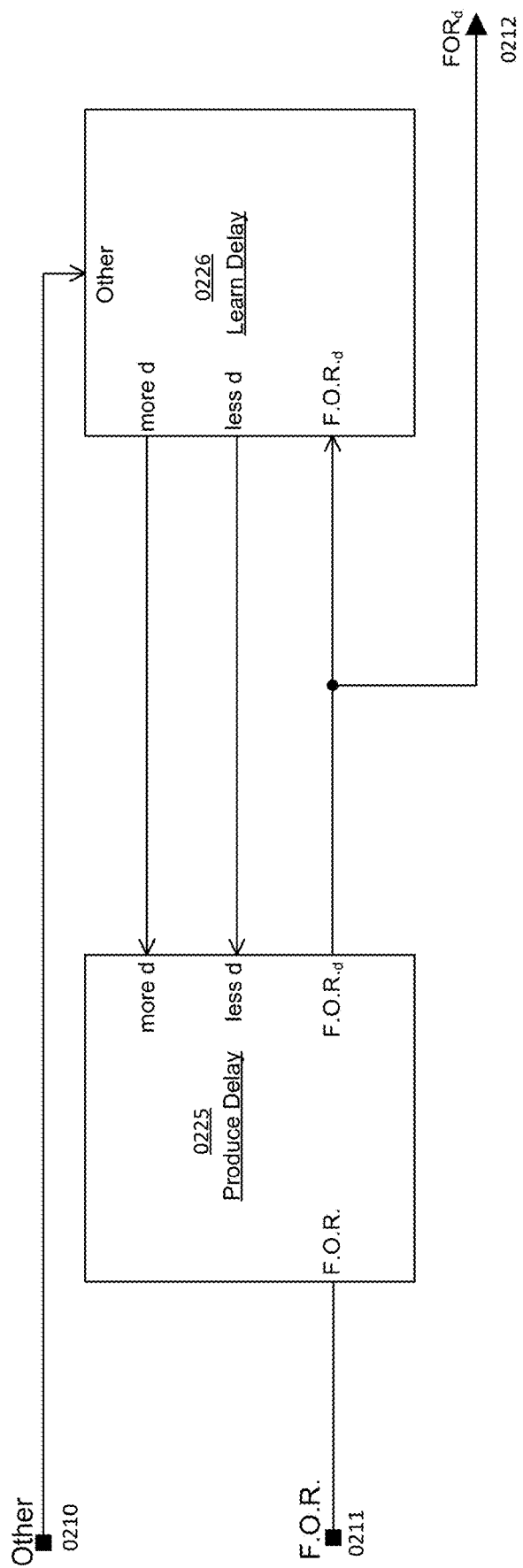
FIG. 2 is a functional block diagram of an example internal structure, for each CCU of FIG. 1.

FIG. 2 is a functional block diagram of an example internal structure, for each CCU of FIG. 1.

As can be seen, a CCU is comprised of two main units:
Produce Delay (block 0225), and
Learn Delay (block 0226).

Produce Delay accepts an input spike stream (at its F.O.R. input), and produces a delayed version of this input stream at its output (called F.O.R.$_d$). The F.O.R. input of Produce Delay is coupled to the F.O.R. input of the CCU (labeled 0211), and the F.O.R.$_d$ output of Produce Delay is coupled to the F.O.R.$_d$ output of the CCU (labeled 0212).

Learn Delay accepts the CCU's Other spike stream (from the CCU's Other input 0210), as well as accepting (at Learn Delay's F.O.R.$_d$ input) the F.O.R.$_d$ output of Produce Delay. Learn Delay uses each pair of spikes, present at its F.O.R.$_d$ input, as a frame of reference for analyzing any spikes occurring at Learn Delay's Other input.

If Produce Delay incorporates sufficient memory, it can reproduce (at its F.O.R.$_d$ output) a spike stream that, except for the possibility of delay, is identical to the spike stream at its F.O.R. input. We can refer to this as a lossless version of Produce Delay.

Depending upon the application, the memory of Produce Delay can be implemented with analog or digital equipment. For a digital implementation, Produce Delay can comprise, for example, a FIFO (First In First Out) queue, or buffer, implemented with semiconductor random access memory (RAM). For an analog implementation, Produce Delay can comprise any suitable signal or wave guide, such as an electrical cable or a free-space wave propagation cavity.

In general, however, a lossless version of Produce Delay can require an unbounded (or unlimited) amount of memory.

Another important aspect of the present invention is utilizing the stochastic nature of the spike stream, presented to a CCU's F.O.R. input, to produce a lossy version of F.O.R.$_d$ at Produce Delay's output. In fact, a memory of only one spike (at a time), by Produce Delay, can be sufficient to produce a useful correlated spike stream at a CCU's F.O.R.$_d$ output. When using storage of only one spike, Produce Delay can be viewed as a kind of "timer." When a spike appears at its F.O.R. input, the timer can be started. At the conclusion of the delay period, the timer produces a spike for Produce Delay's F.O.R.$_d$ output. Use of a single spike memory is discussed below, in Section 9.2.3 ("Produce Delay").

9.2.2 Learn Delay 9.2.2.1 Functional Description

As introduced above, Learn Delay uses each pair of spikes, present at its F.O.R.$_d$ input, as a frame of reference for analyzing any spikes occurring at Learn Delay's Other input. FIG. 3 depicts an example situation of this kind.

As can be seen, FIG. 3 contains two axes:

A horizontal time axis, where: 0.00 sec.≤t≤0.60 sec.

A vertical axis used to assign weights to each Other spike (explained further below), where: 0.00≤weight≤1.00.

Let us call a successive pair of spikes at Learn Delay's F.O.R.$_d$ input, that serve as a framework for evaluation of Other spikes, n and n+1. The vertical line at time t=0.00 (in addition to representing the weight axis) depicts spike n (this spike is also labeled 0310). Conversely, spike n+1 is pictured at t=0.60 (this spike is also labeled 0311). The magnitude of the n and n+1 spikes, along the vertical axis, is not relevant, and has simply been chosen for graphical presentation purposes.

The weight axis is relevant to curves 0320 and 0321. As can be seen, 0320 is an exponential decay curve, of the form $e^{-rt}$, where r is rate, t is time, and r (for purposes of example) equals 3. Conversely, 0321 is an exponential increase curve, of the form $e^{-r(m-t)}$, where r and t are the same as for 0320, and m (for "max" time) equals 0.60 sec. For reasons to be explained just below, curves 0320 and 0321 are also referred to as, respectively, "Post" and "Pre."

Each Other spike, that occurs between F.O.R.$_d$ spikes n and n+1, is assigned both a Post and Pre value. An Other spike, where its Post value is greater than its Pre value, is characterized as being more strongly "post" (or after) spike n than "pre" (or before) spike n+1. Conversely, a spike where its Pre value is greater than its Post value is characterized as being more strongly "pre" (or before) spike n+1 than "post" (or after) spike n.

FIG. 3 depicts two example Other spikes with the following values:

Other spike 1:
  t=0.065 sec.
  Post value=0.723
  Pre value=0.05

Other spike 2:
  t=0.44 sec.
  Post value=0.112
  Pre value=0.446

As can be seen, each Other spike is given two weights, depending upon where it intersects the Post and Pre weighting curves.

Across the multiple Other spikes that can occur, between a pair of F.O.R.$_d$ spikes n and n+1, net tendency, towards being "post" or "pre," can be determined and corrected as follows:

accumulate a sum of all the Post values (that we shall also call "postAcc"), and
  accumulate a sum of all the Pre's values (that we shall also call "preAcc").

If postAcc>preAcc:
  Other spike streams are regarded as, on balance, occurring after the spikes of F.O.R.$_d$. This also means the F.O.R.$_d$ stream is, on balance, early.
  Learn Delay (e.g., Learn Delay block 0226 of FIG. 2) can seek to correct the earliness by issuing a command (such as a pulse) at its "more d" output.
  In response to the "more d" command, Produce Delay (e.g., see Produce Delay block 0225) can increase, by a certain incremental amount, the delay between its F.O.R. input and F.O.R.$_d$ output.

If preAcc>postAcc:
  Other spike streams are regarded as, on balance, occurring before the spikes of F.O.R.$_d$. This also means the F.O.R.$_d$ stream is, on balance, late.
  Learn Delay can seek to correct the lateness by issuing a command (such as a pulse) at its "less d" output.
  In response, Produce Delay can decrease, by a certain incremental amount, the delay between its F.O.R. input and F.O.R.$_d$ output.

The incremental amount by which the delay of Learn Delay changes (in response to a "more d" or "less d" command), can be selected based upon the particular application, and its requirement of speed versus accuracy. In general, a smaller increment (also called a slower learning rate) increases the time for a CCU to discover a value of delay that achieves best synchronization of its events with its Other streams. However, a smaller increment has the advantage of resulting in a more accurate determination of the necessary delay value.

While exponential curves, both decreasing and increasing, have been shown, for purposes of Post and Pre weighting, a wide variety of functions can be suitable. Major criteria for a suitable function include:

A Pre function that is the symmetric opposite of the Post function.
  Post and Pre functions that are at a maximum value at, respectively, the time of spike n and n+1.
  Post and Pre functions that monotonically decrease from their maximum value.

9.2.2.2 Sequential Operation and Pseudo-Coded Implementation

The discussion of the previous sub-section explained operation of Learn Delay in a way consistent with the following spikes being available at one time:

Spikes n and n+1, of the $F.O.R._d$ input, and

Any spikes present at Learn Delay's Other input, during the time interval between the n and n+1 $F.O.R._d$ spikes.

During actual operation, a CCU (and the MCC of which it is a part) is expected to operate on a spike-by-spike basis. For example, upon each spike present at Learn Delay's $F.O.R._d$ input, that we can refer to as a spike n, Learn Delay can be expected to perform two main operations:

If there was an n−1 spike, seek to complete the cross correlation analysis that began with spike n−1. In other words, complete the cross correlation analysis with spikes n−1 and n as the frame of reference.

Begin a new cross correlation analysis, that will complete in the future, upon the arrival of spike n+1. In other words, begin a new cross correlation analysis, where spikes n and n+1 will serve as the frame of reference.

Depending upon the particular application, it may be desirable to implement Learn Delay as a computer program, as electrical hardware, or as a hybrid combination of the two approaches.

FIG. 4 depicts an example pseudo-coded implementation of Learn Delay, based on the Python programming language. Bold-faced text corresponds closely to Python syntax and semantics. Comments are inserted according to Python syntax.

Line numbers have been added on the left, to aid explanation. A main departure from Python syntax and semantics is the right hand side of the assignment operators, on lines 5-17. Also, the passing of parameters or other data, into and out of the procedure, is handled informally.

The procedure of FIG. 4 is called "Learn_Delay_PC," where the "PC" suffix indicates pseudo-code. Line 1.

Learn_Delay_PC is invoked each time a spike occurs, at either the $F.O.R._d$ or Other inputs.

A number of important values and variables are assigned over lines 5-17, but these will be addressed as part of discussing the pseudo-code that utilizes these variables, over lines 22-44.

Line 22, updates the Pre accumulator "preAcc," by causing its contents to undergo exponential decay, relative to the amount of time (i.e., T−TLO) since a last Other spike caused an invocation of Learn_Delay_PC (where T and TLO are defined at lines 8-9 of FIG. 4). As will be explained further below, this exponential decay of preAcc is coupled with adding a unit value to preAcc, at each time an Other spike occurs.

Adding a unit value to preAcc at the time of each Other spike, and causing the preAcc to undergo exponential decay (until the time of the next $F.O.R._d$ spike), is mathematically equivalent to the preAcc accumulation method discussed above with respect to FIG. 3: adding the value of $e^{-r(m-t)}$ to the preAcc upon the occurrence of each Other spike (where m is the maximum value for t), and having a preAcc that does not decay.

Causing the preAcc to undergo exponential decay may seem an unnecessarily indirect method to accumulate Pre values. As will be discussed in the next sub-section, however, $e^{-r(m-t)}$ is a relatively complex function to implement with electronic hardware, compared with $e^{-rt}$.

Following the update to preAcc, a test is performed for whether the current spike is of type $F.O.R._d$ or Other. Line 25. An $F.O.R._d$ spike is regarded as "belonging" to the Learn Delay unit currently executing because its origination is from the Produce Delay unit that belongs to the same CCU. Hence the IS_MINE variable being false indicates receipt of an Other spike, causing the execution of lines 26-33. Otherwise, the current spike is of type $F.O.R._d$, and lines 35-45 are performed.

Assuming IS_MINE is false, the following steps are executed:

To account for the current spike being of type Other, a unit value is added to the preAcc. Line 26.

The value added to postAcc is simply the exponential decay, of a unit value, since the last $F.O.R._d$ spike. Line 30.

The time of the last Other spike is updated, in preparation for a next invocation of Learn_Delay_PC. Line 32.

Assuming IS_MINE is true, the following steps are executed:

As part of completing the currently executing cross correlation analysis, that began with the previous $F.O.R._d$ spike, a test is first performed to determine whether any Other spikes have occurred. Line 35.

Assuming at least one Other spike has occurred, the values of preAcc and postAcc are compared. Line 38.

If preAcc>postAcc, then, on balance, the $F.O.R._d$ spikes are regarded as late with respect to the Other spikes. The delay from Produce Delay, represented by the variable D, is reduced. The amount of reduction, which controls the learning rate, is represented by the "−D_LR" of line 38.

If postAcc>preAcc, then, on balance, the $F.O.R._d$ spikes are regarded as early with respect to the Other spikes. The delay from Produce Delay, represented by the variable D, is increased. The amount of increase, which controls the learning rate, is represented by the "D_LR" of line 38.

A check can be performed, to ensure that D is kept within permissible limits. Line 40.

As part of beginning a new cross correlation analysis, the following steps are performed:

preAcc and postAcc are reset to zero. Line 42.

The time of the last $F.O.R._d$ spike is updated to the current time. Line 44.

9.2.2.3 Electrical Implementation

Figure 5:
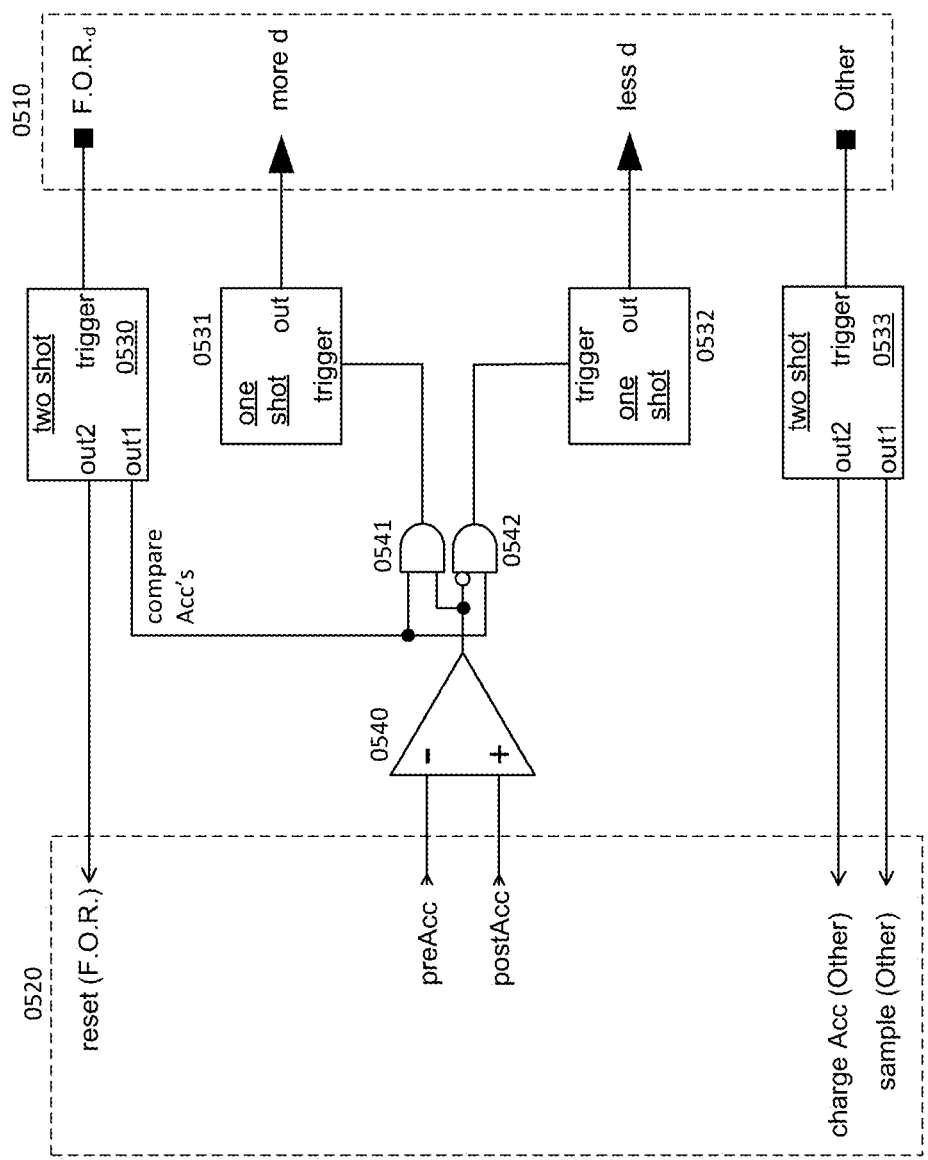
FIGS. 5-7 depict an example electrical implementation for Learn Delay.
Figure 6:
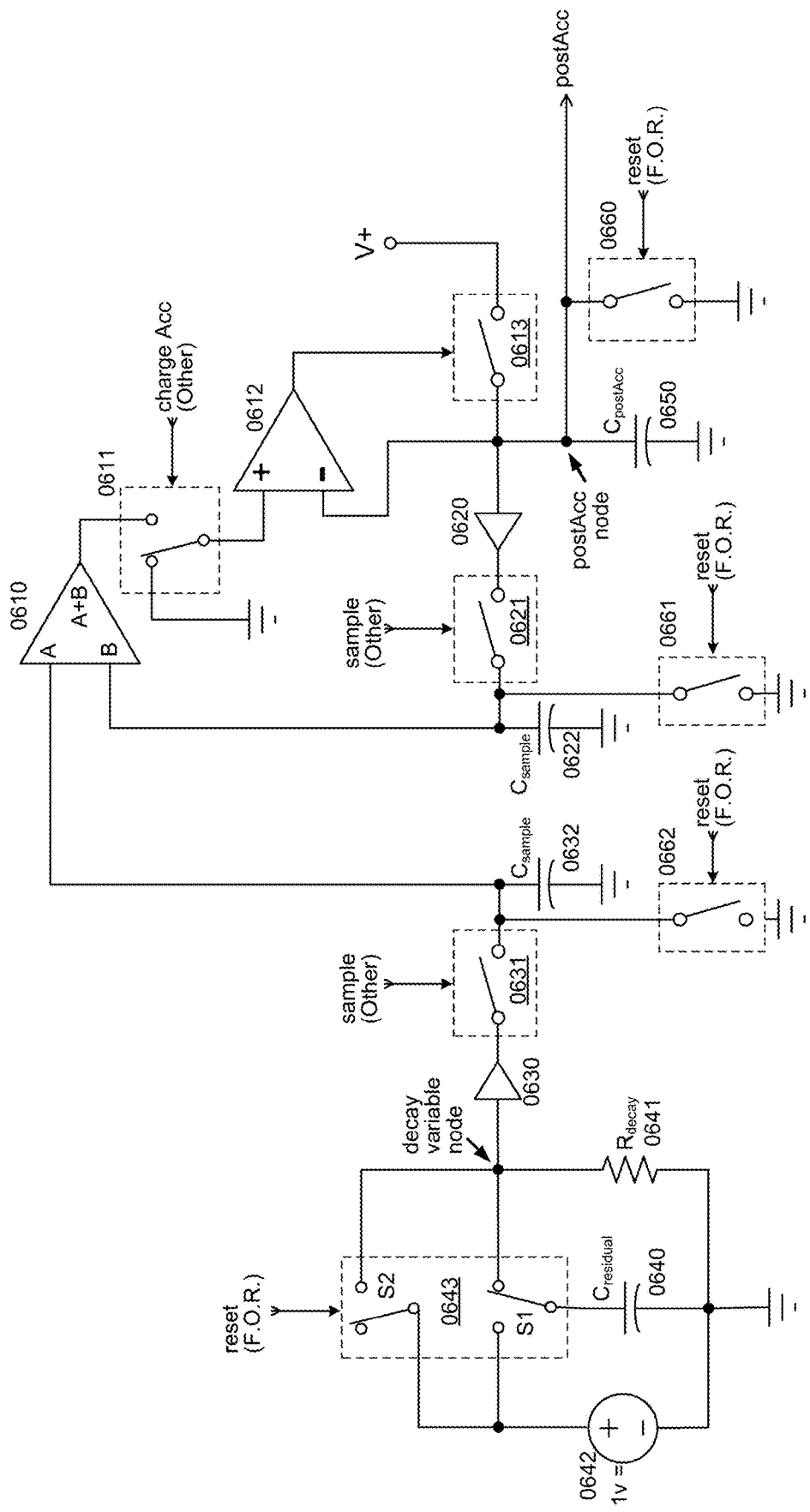
Figure 7:
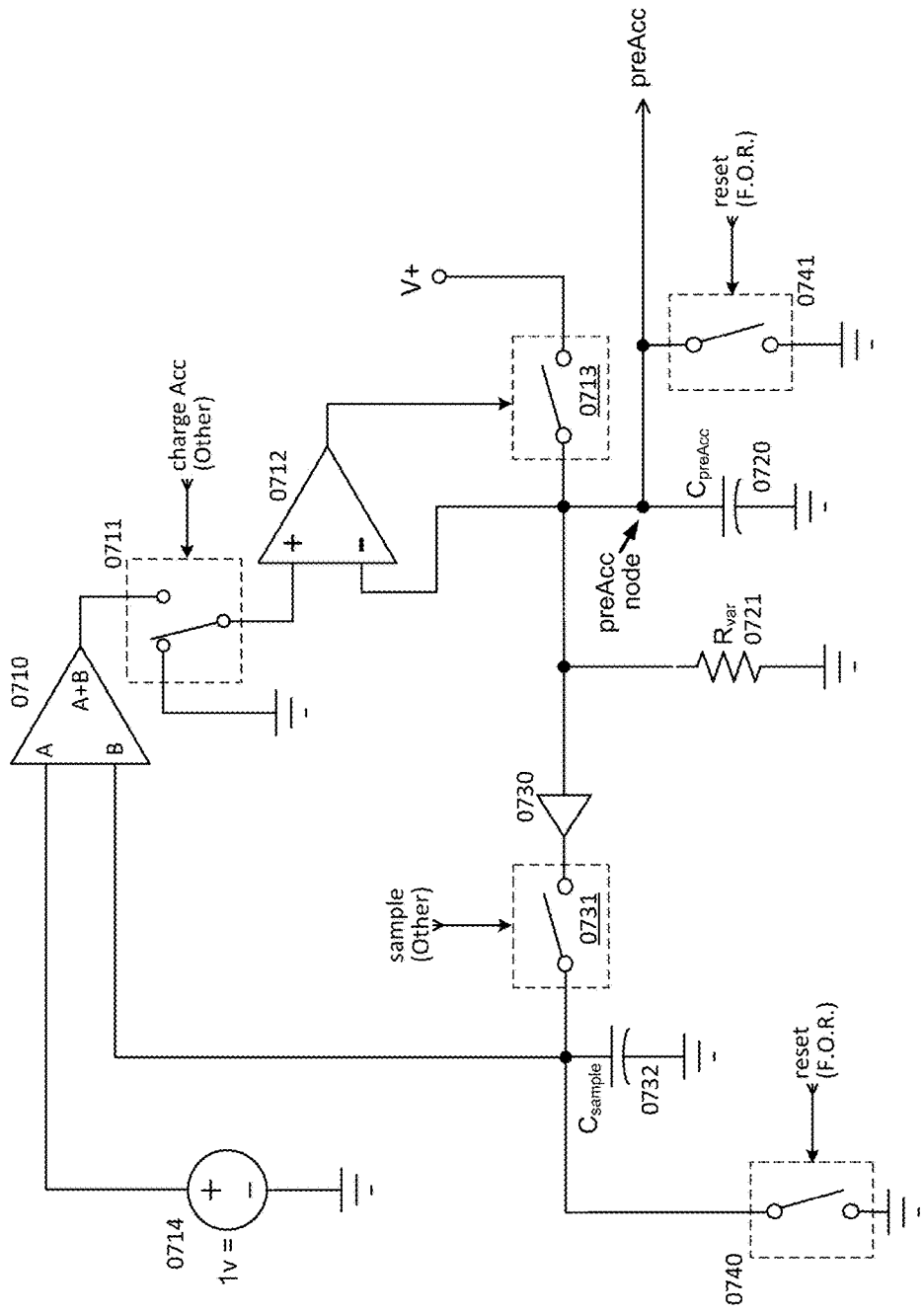

FIGS. 5-7 depict an example electrical implementation for Learn Delay.

FIG. 5 depicts the top-level control and interface of a Learn Delay module. FIG. 6 focuses on circuitry related to accumulating the postAcc value, while FIG. 7 is focused on circuitry related to accumulating the preAcc.

Outline 0510 of FIG. 5 indicates the external interface for Learn Delay, where each connection corresponds to an input or output of Learn Delay functional block 0221, as discussed previously in connection with FIG. 2.

Outline 0520 indicates an internal interface, for Learn Delay, to the postAcc circuitry of FIG. 6 and the preAcc circuitry of FIG. 7.

A discussion of external interface 0510 follows.

Each spike presented to the $F.O.R._d$ input triggers "two shot" 0530. First, out1 of the two shot completes the current frame of reference, by causing a reading of comparator amplifier 0540. Second, out2 resets the postAcc and preAcc circuitry, such that accumulation across a next frame of reference can begin.

Out1 causes a reading of comparator 0540 by enabling AND gates 0541 and 0542. If the output of comparator 0540 is a logical 0, when the AND gates are enabled, then AND gate 0542 will present a trigger signal to one shot 0532. One shot 0532, when triggered, produces a pulse at the "less d" output (of interface 0510). Conversely, if the output of comparator 0540 is a logical 1, then AND gate 0541 will present a trigger signal to one shot 0531. One shot 0531, when triggered, produces a pulse at the "more d" output (of interface 0510).

Comparator 0540 compares two signals: a signal representative of the preAcc (called "preAcc"), and a signal representative of the postAcc (called "postAcc"). The postAcc signal is produced by the circuitry of FIG. 6, while the preAcc signal is accumulated by the circuitry of FIG. 7. Each of the preAcc and postAcc signals is analog, with a voltage level representing its accumulated value. If the preAcc signal has a higher voltage than postAcc, comparator 0540 outputs a signal representing a logical 0. As discussed above, a logical 0 (when read by out1 of two shot 0530) causes a pulse from the "less d" output. Conversely, if postAcc>preAcc, comparator 0540 outputs a logical 1. As discussed above, a logical 1 (when read by out1 of two shot 0530) causes a pulse from the "more d" output.

The last connection to be discussed, for external interface 0510, is the Other input. Like the F.O.R.$_d$ input, a spike at Other also triggers a two shot. In this case, it is two shot 0533. As will be discussed further below, out1 of two shot 0533 causes (among other actions) a sampling of the current voltage level of each of the postAcc accumulator and preAcc accumulator. Secondly, out2 causes the postAcc and preAcc accumulators to each be charged to a new voltage level.

With regard to FIG. 6, capacitor 0650 maintains a voltage of the postAcc signal (or node). With regard to Post n function 0320, as discussed above with respect to FIG. 3, it is determined by the combination of capacitor 0640 with resistor 0641. The Post n function is available, in FIG. 6, at the decay variable node.

As discussed above, two shot 0530 (at its out2 output) asserts the "reset (F.O.R.)" signal, as part of starting a new frame of reference. With regard to FIG. 6, it can be seen that the reset (F.O.R.) signal causes a reset of the following capacitors:

The accumulation of a postAcc value is reset to zero, by switch 0660 coupling the postAcc node to ground.

Post n function 0320 is reset to a new period of exponential decay by switches S1 and S2 of switching unit 0643. Specifically, for the duration of the reset (F.O.R.) pulse:
S1 couples capacitor 0640 to unit value voltage source 0642, and
S2 ensures, while capacitor 0640 is recharged, that the decay variable node maintains a correct initial value for re-starting an exponential decay.

At the appropriate time, capacitor 0632 is used to hold a sample of the voltage at the decay variable node. It is reset by switch 0662 coupling capacitor 0632 to ground.

At the appropriate time, capacitor 0622 is used to hold a sample of the voltage at the postAcc node. It is reset by switch 0661 coupling capacitor 0622 to ground.

Once the reset (F.O.R.) signal ends, the combination of capacitor 0640 and resistor 0641 begins its exponential decay, with the Post n function being available at the decay variable node.

If an Other spike occurs, subsequent to the reset of the postAcc node (by an F.O.R.$_d$ spike), two shot 0533 is triggered. With regard to FIG. 6, it can be seen that the assertion of the "sample (Other)" signal causes the following:
A sampling of the current voltage, at the decay variable node, by the closing of switch 0631.
A sampling of the current voltage, at the postAcc node, by the closing of switch 0621.

Subsequent to the assertion of the "sample (Other)" signal, the following 15 occurs:
Switch 0631 opens, and the sampled voltage of the decay variable node is held by capacitor 0632.
Switch 0621 opens, and the sampled voltage of the postAcc node is held by capacitor 0622.
The voltages held by capacitors 0632 and 0622 are summed, by additive amplifier 0610.

Next, two shot 0533 asserts the "charge Acc (Other)" signal, which closes switch 0611 of FIG. 6. This causes comparator 0612 to compare the voltage at the postAcc node to the output of additive amplifier 0611. The voltage from the additive amplifier will be greater than the postAcc node's voltage by the amount sampled at the decay variable node. Therefore, comparator 0612 will cause switch 0613 to close, and remain closed, until the postAcc node has been charged to a voltage that is essentially equal to the additive amplifier's output.

As can be appreciated, the net effect, of the sequential assertion of the "sample (Other)" and "charge Acc (Other)" signals, is the following. At the time of each Other spike, the voltage of the postAcc node is increased by an amount equal to the then current voltage of the decay variable node.

With regard to FIG. 7, capacitor 0720 maintains a voltage of the preAcc signal (or node). However, as discussed above with respect to the Learn_Delay_PC pseudo-code of FIG. 4, the preAcc node is designed to decay, due to its combination with resistor 0721. As discussed above, the combination, of a decaying preAcc node with an addition of a unit voltage for each Other spike, is mathematically equivalent to determining Pre n+1 function 0321 (of FIG. 3) and adding its value to a non-decaying Pre accumulator. The relative simplicity from a circuit implementation perspective, of the decaying preAcc node approach, can be appreciated in FIG. 7.

As discussed above, two shot 0530 (at its out2 output) asserts the "reset (F.O.R.)" signal, as part of starting a new frame of reference. With regard to FIG. 7, it can be seen that the reset (F.O.R.) signal causes a reset of the following capacitors:

The accumulation of a preAcc value is reset to zero, by switch 0741 coupling the preAcc node to ground.
At the appropriate time, capacitor 0732 is used to hold a sample of the voltage at the postAcc node. It is reset by switch 0740 coupling capacitor 0732 to ground.

If an Other spike occurs, subsequent to the reset of the preAcc node (by an F.O.R.$_d$ spike), two shot 0533 is triggered. With regard to FIG. 7, it can be seen that the assertion of the "sample (Other)" signal causes the sampling of the current voltage, at the preAcc node, by the closing of switch 0731.

Subsequent to the assertion of the "sample (Other)" signal, the following occurs:
Switch 0731 opens, and the sampled voltage of the preAcc node is held by capacitor 0732.
The voltage held by capacitor 0732 is summed, by additive amplifier 0710, with the unit voltage from voltage source 0714.

Next, two shot 0533 asserts the "charge Acc (Other)" signal, which closes switch 0711 of FIG. 7. This causes comparator 0712 to compare the voltage at the preAcc node to the output of additive amplifier 0710. The voltage from the additive amplifier will be greater than the preAcc node's voltage by the amount provided by unit voltage source 0714. Therefore, comparator 0712 will cause switch 0713 to close, and remain closed, until the preAcc node has been charged to a voltage that is essentially equal to the additive amplifier's output.

As can be appreciated, the net effect, of the sequential assertion of the "sample (Other)" and "charge Acc (Other)" signals, is the following. At the time of each Other spike, the voltage of the preAcc node is increased by an amount equal to unit voltage of voltage source 0714. Subsequent to the increase, the preAcc node will resume its exponential decay until either of the following occurs:

The current frame of reference ends, with the occurrence of an $F.O.R._d$ spike.

Another Other spike occurs.

9.2.3 Produce Delay—Lossy Version 9.2.3.1 Conflict Resolution

As discussed above, in Section 9.2.1 ("General Considerations"), another important aspect of the present invention is the option to utilize the stochastic nature, of the spike stream presented to each CCU's F.O.R. input, to produce a lossy version of $F.O.R._d$ at Produce Delay's output.

A memory of only one spike (at a time), by Produce Delay (e.g., by functional block 0225 of FIG. 2), can be sufficient to produce a useful correlated spike stream at a CCU's $F.O.R._d$ output. In this case, Produce Delay can be viewed as a kind of "timer." When a spike appears at Produce Delay's F.O.R. input, the timer can be started. At the conclusion of the delay period, the timer produces a spike for Produce Delay's $F.O.R._d$ output. Use of a single spike memory is discussed below.

Because a lossy version of Produce Delay requires so much less memory (only one spike) than a lossless version (whose memory needs to be potentially infinite), we will refer to the lossy version as "memoryless."

The key problem, when implementing a memoryless approach, is what we shall call the "conflict resolution" issue. The conflict resolution issue can arise whenever the delay of Produce Delay is greater than 0 sec. Because of the stochastic nature of the spike stream input to each CCU, whenever Produce Delay is in the midst of timing a delay period d, because of an F.O.R. spike x, it is always possible for a next F.O.R. spike x+1 to arrive. There are then two choices:

Ignore spike x+1, and proceed with the timing for spike x until its delay period d is completed. We shall refer to this as the "keep oldest" choice.

Restart the timer, such that a delay period d begins with spike x+1. We shall refer to this as the "keep newest" choice.

Either of these two policies, if applied consistently, has the possibility of being sequentially applied an unbounded number times. For example:

Keep oldest: while a delay d is being timed for a spike x, it is possible for an unbounded number of subsequent $F.O.R._d$ spikes to arrive. All of which will be ignored.

Keep newest: if a delay d for a spike x is restarted because of a spike x+1, it is possible for a spike x+2 to restart the time period for spike x+1, and it is further possible for a spike x+3 to restart the time period for spike x+2. The restarting of the delay period can continue to occur, a potentially unbounded number of times.

Either of these two choices, if applied exclusively as a policy for conflict resolution, has the problem of introducing a time bias into Learn Delay's comparison of the $F.O.R._d$ and Other spike streams. Specifically:

Keep oldest: Has the effect of making the $F.O.R._d$ spike stream appear earlier, with respect to the Other spike stream, than it actually is. The result is that the delay produced by Produce Delay is too large. This effect can be appreciated from the fact that a keep-oldest policy causes later spikes (i.e., spikes after spike x) to be dropped.

Keep newest: Has the effect of making the $F.O.R._d$ spike stream appear later, with respect to the Other spike stream, than it actually is. The result is that the delay produced by Produce Delay is too small. This effect can be appreciated from the fact that a keep-newest policy causes earlier spikes (e.g., a spike x that is earlier than spike x+1) to be ignored.

The time bias issue can be resolved by any technique that causes, on average, an equal number of choices of each of the keep oldest and keep newest policies. The main difference of FIG. 8 from FIG. 2 is the introduction of a Resolve Conflicts block 0224, within which can be seen a proposed implementation. Functional block 0220 (Produce Delay) of FIG. 8 includes an additional "Delay Done" output that is not present in functional block 225 of FIG. 2. Delay Done is a logical 0 whenever Produce Delay is timing a delay period, and is logical 1 otherwise. Whenever Delay Done is logical 1, AND gate 0230 will permit a spike, at F.O.R. input 0211, to start a delay operation. This makes sense, since there is no conflict, with a pre-existing delay period, under such conditions.

Conversely, we know a conflict situation is present when an F.O.R. spike arrives at input 0211 and Delay Done is logical 0. This situation is decoded for by AND 0233 of the Resolve Conflicts block 0224. AND gate 0233 producing a logical 1 causes one of two operations, depending upon the pre-existing state of flip-flop 0234:

If flip-flop 0234 happens to already produce a logical 1 at its Q output, then that Q output, along with a logical 1 from AND 0233, will cause AND 0232 to produce a signal that (through OR gate 0231) causes a timing restart by Produce Delay. As can be appreciated, this is an execution of the "keep newest" policy.

Conversely, if flip-flop 0234 happens to be producing a logical 0 at its Q output, that logical 0 prevents AND 0232 from producing a signal that causes a timing restart by Produce Delay. This is an execution of the "keep oldest" policy.

Regardless of whether flip-flop 0234 happens to already produce a logical 1, each production of logical 1 by AND 0233 triggers flip-flop 0234 to change state. The net result is that upon each detection of a conflict situation, Resolve Conflicts block 0224 implements a policy based on the current state of flip-flop 0234, and then changes the state of flip-flop 0234, such that the opposite policy is executed next time.

9.2.3.2 Electrical Implementation

Figure 9:
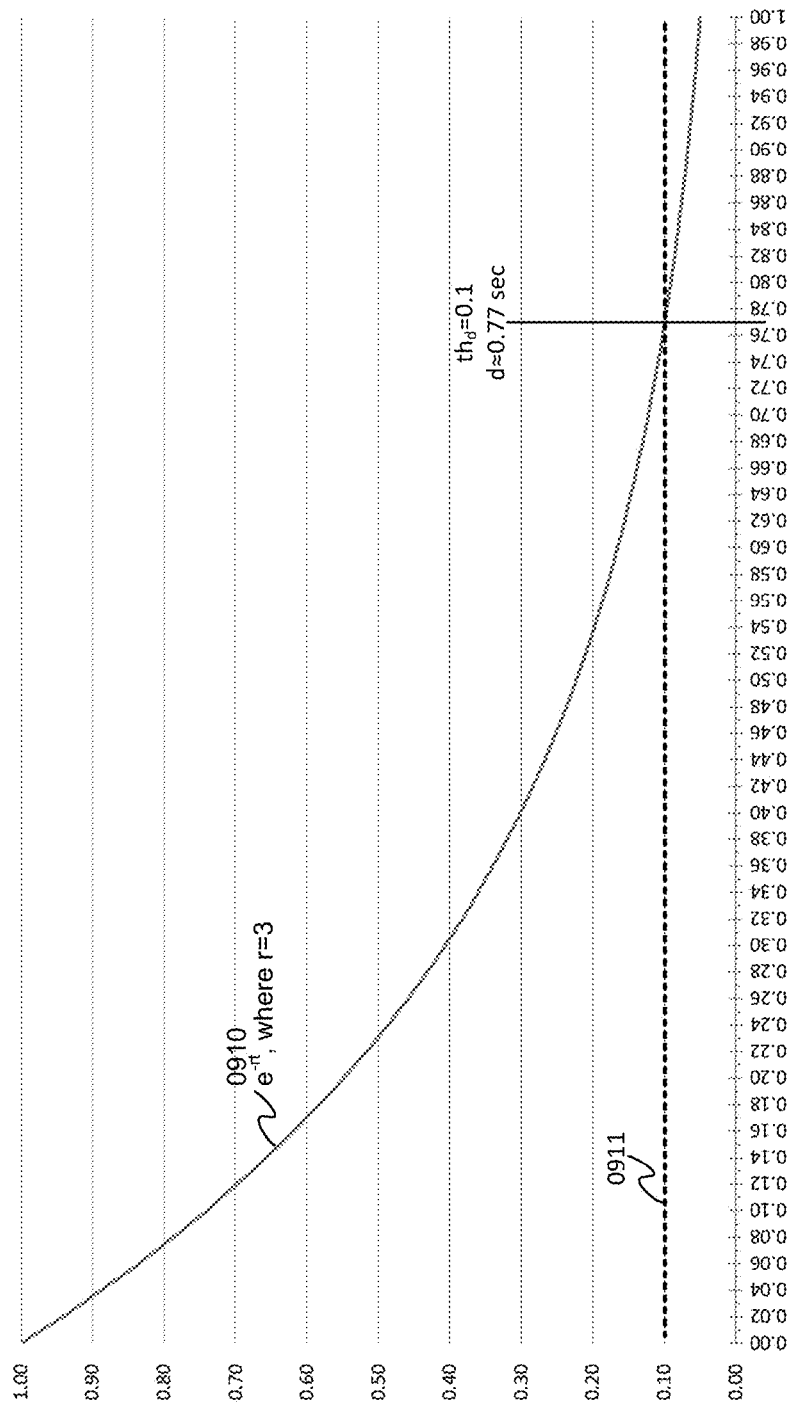
FIG. 9 depicts an example of implementing Produce Delay, by coupling an exponential decay curve with threshold detection.
Figure 10:
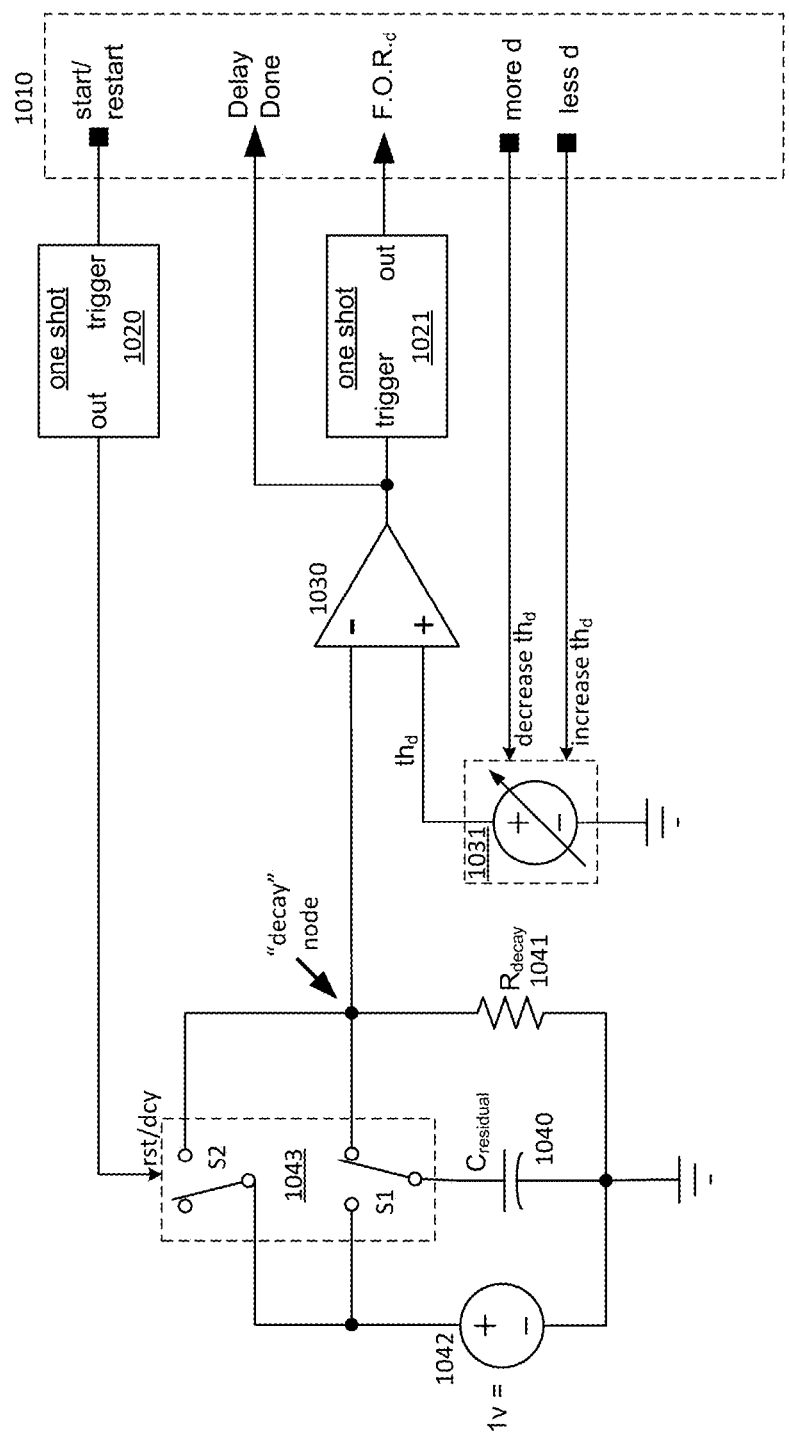
FIG. 10 presents circuitry for implementing the Produce Delay functionality discussed in connection with FIG. 8 for functional block 0220.

FIGS. 9-10 address an example electrical implementation for Produce Delay.

FIG. 9 depicts an example of implementing Produce Delay, by coupling an exponential decay curve (i.e., 0910 is $e^{-rt}$) with threshold detection (horizontal line 0911). In the example of FIG. 9, rate of decay r equals 3, and the threshold to be detected (referred to as $th_d$) equals 0.1. As can be seen, under these conditions, the delay period produced (called "d") is 0.77 sec. As can be appreciated, delay can be increased or decreased by, respectively, lowering or increasing the threshold.

Figure 8:
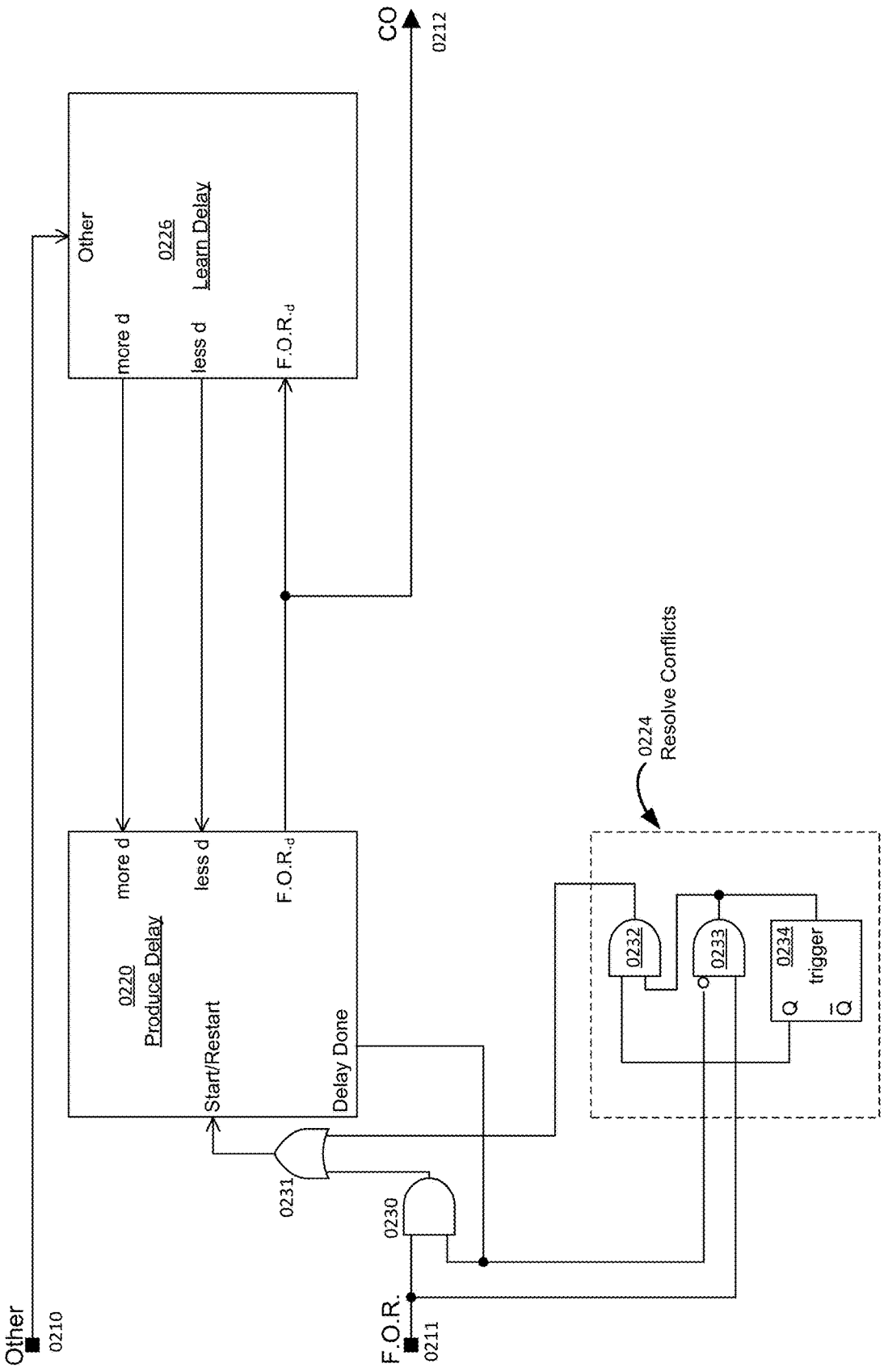
FIG. 8 is a functional block diagram of the CCU of FIG. 2, except a Resolve Conflicts block is added to a memoryless version of Produce Delay.

FIG. 10 presents circuitry for implementing the Produce Delay functionality shown in FIG. 8 for functional block 0220.

Outline 1010 of FIG. 10 indicates the external interface for Produce Delay, where each connection corresponds to an input or output of Produce Delay functional block 0220.

The exponential decay, that forms the basis of Produce Delay's timing ability, is created by the combination of capacitor 1040 with resistor 1041. The decay occurs at the "decay" node, which is applied to the negative input of a comparator amplifier 1030. The threshold (called $th_d$) is set by adjustable voltage source 1031, which is applied to the comparator's positive input. The voltage output by 1031 can be incrementally adjusted lower or higher by, respectively, pulses applied to the "more d" or "less d" inputs to interface 1010. At any one time, the state of voltage source 1031 (i.e., the voltage it is currently set to output) can be kept by a capacitor (not shown).

Each spike at the start/restart input triggers one shot 1020. One shot 1020 generates a pulse that, while asserted, prepares capacitor 1040 to produce a new period of exponential decay by switches S1 and S2 of switching unit 1043.

Specifically, for the duration of the one shot's pulse:

S1 couples capacitor 1040 to unit value voltage source 1042, and

S2 ensures, while capacitor 1040 is recharged, that the decay node maintains a correct initial value for restarting an exponential decay.

Once one shot 1020's signal ends, the combination of capacitor 1040 and resistor 1041 begins its exponential decay. When the voltage of the decay node falls below the voltage output by voltage source 1031, the output of comparator 1030 produces a logical 1. The logical 1 causes both of the following:

The "Delay Done" output, at interface 1010, is asserted.

One shot 1021 is triggered, its pulse constituting the spike output at the $F.O.R._d$ output of interface 1010.

9.2.4 Learn Rate all

As presented above, both the Produce Delay and Learn Delay functional blocks (e.g., blocks 0220 and 0226 of FIG. 8) work through the use exponential decay curves. The rate of decay r, for these functions, can be selected based upon the expected spike frequencies of the particular application.

However, it can be useful to include, in a CCU, a functional block that can discover the average spike rate (which we shall call $r_{ALL}$) at its F.O.R. input. In general, $r_{ALL}$ is a good value to use as r, for the decay functions of Produce Delay and Learn Delay.

For example, with respect to Learn Delay as shown in FIG. 3, $r_{ALL}$ can be used for the Post and Pre functions. Using this value for r tends to ensure the Other spikes are located on regions where each function is changing relatively rapidly, and is therefore easier to measure. A similar advantage is achieved by using $r_{ALL}$ for the decay rate (e.g., see function 0910 of FIG. 9) by which Produce Delay measures delay.

Figure 11:
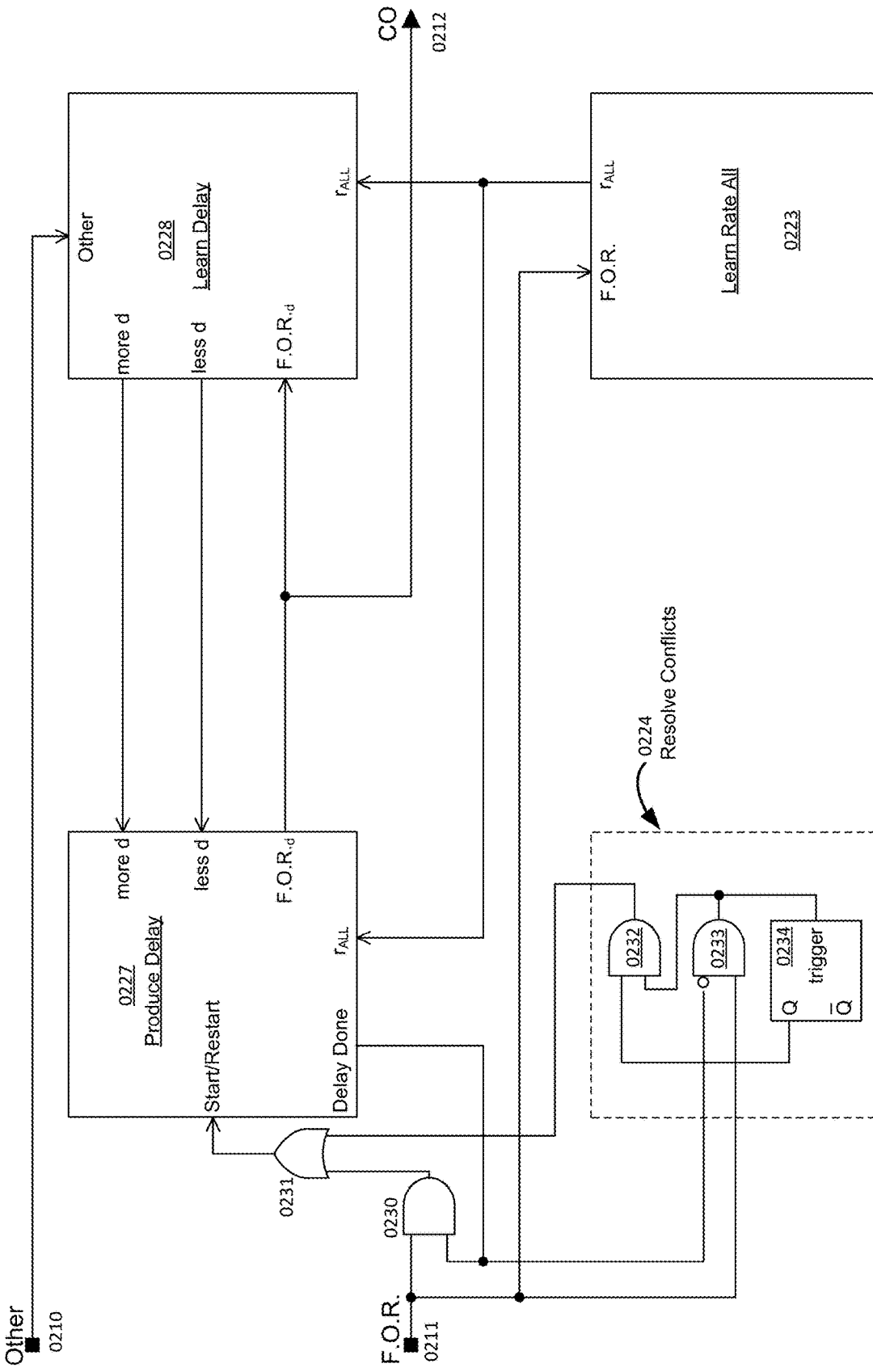
FIG. 11 depicts the same CCU as shown in FIG. 8, except a "Learn Rate All" (or LRA) functional block 0223 is added.

FIG. 11 depicts a CCU the same as FIG. 8, except for the following:

A "Learn Rate All" (or LRA) functional block 0223 is added. As can be seen, LRA 0223 accepts F.O.R. spikes as input, and outputs $r_{ALL}$.

An $r_{ALL}$ input is added to each of Produce Delay and Learn Delay (hence the changing of their label numbers, from 0220 and 0226 of FIG. 8 to 0227 and 0228 of FIG. 11). These $r_{ALL}$ inputs are driven by the LRA 0223's $r_{ALL}$ Output.

Learn Rate All is based on the following property of a stochastic spike stream s: if one has the correct value for $r_{ALL}$, then the following expression provides the probability, as of a time t or any time later, of a next spike occurring:

$$P = e^{-r_{ALL}t} \qquad \text{Equation 1}$$

This also means that, if one generates an exponential decay according to Equation 1, the time at which P=0.5 is the Median Expected Arrival (or MEA) time of a next spike of stream s. This median expected arrival time, that we shall also refer to as $MEA_{ALL}$, has the following special property:

Special Property 1: Over a large number of occurrences of spikes of s, we can expect the number of spikes occurring before $MEA_{ALL}$ will equal the number of spikes occurring after $MEA_{ALL}$.

Figure 12:
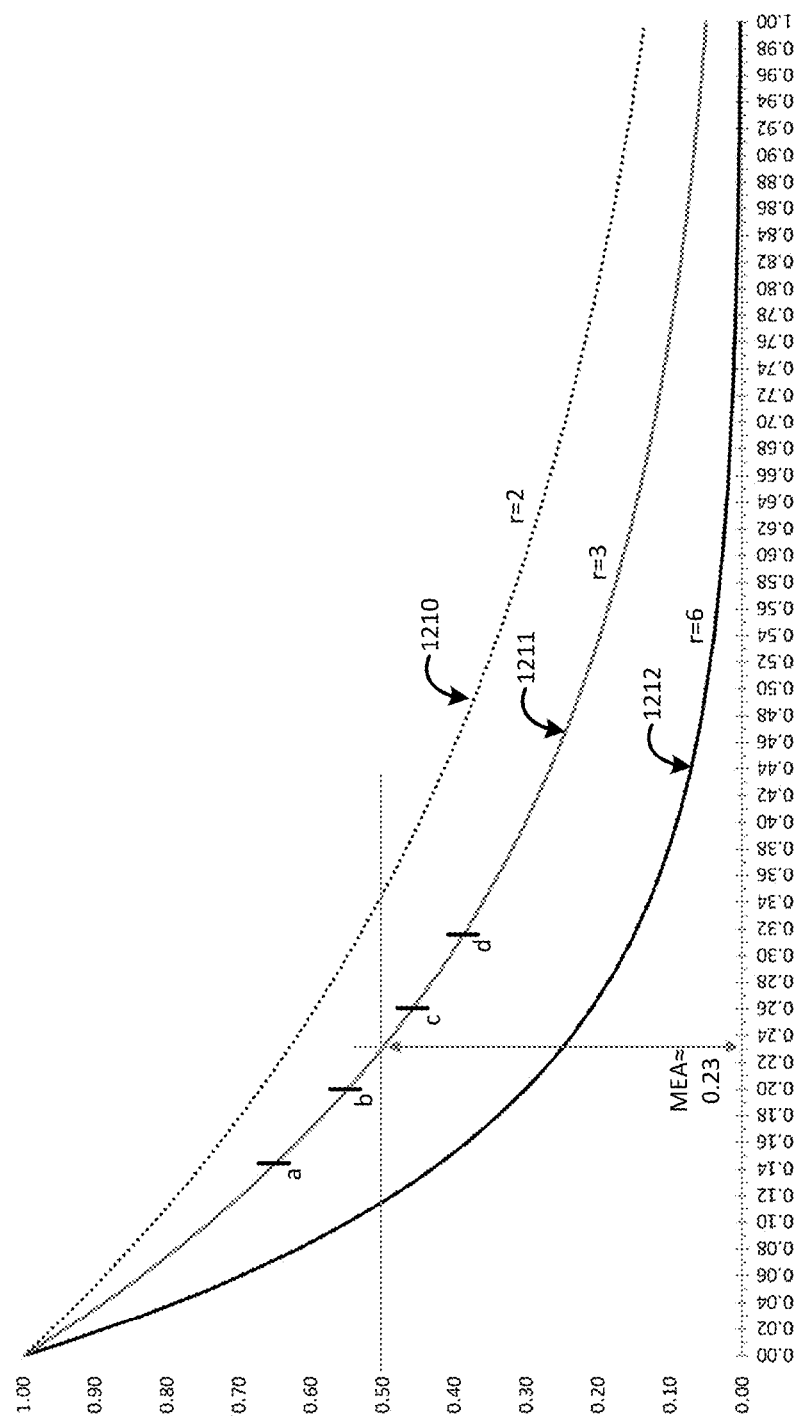
FIG. 12 depicts an example distribution of spikes if the actual MEA$_{ALL}$ is known.

For FIG. 12, the actual $MEA_{ALL}$ is assumed to be 0.23 sec for $r_{ALL}$=3. As can be seen (for purposes of clarity of explanation) spikes a-d have been chosen to be evenly distributed, on either side of $MEA_{ALL}$.

Figure 13:
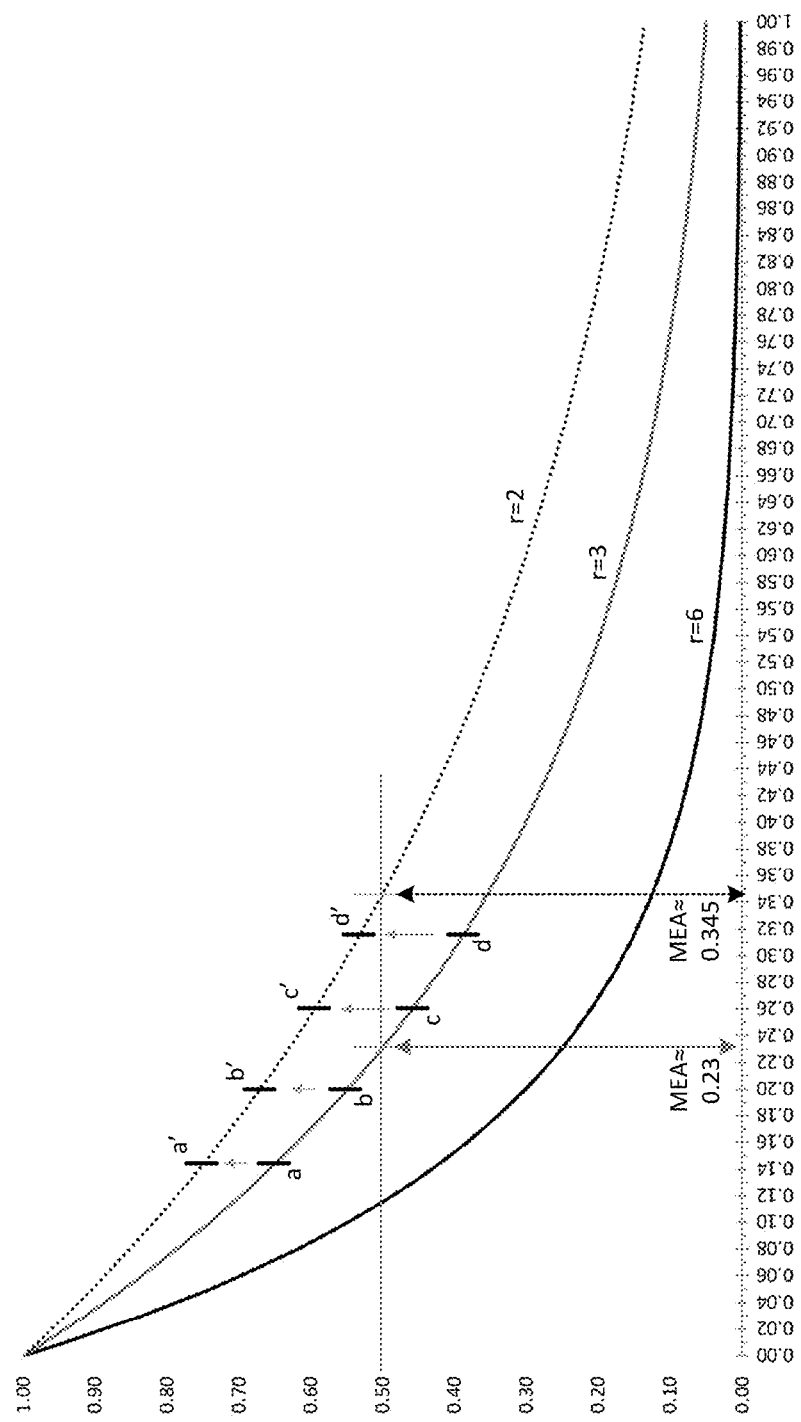
FIG. 13 depicts an example distribution of spikes if a guess for a value of MEA$_{ALL}$ (call it MEA$_{guess}$) is too high.

Special Property 1 has the following implications:

If a guess for a value of $MEA_{ALL}$ (call it $MEA_{guess}$) is too high (i.e., in actuality, $MEA_{guess} > MEA_{ALL}$), over a large number of occurrences of spikes of s, more spikes will occur before $MEA_{guess}$ than after $MEA_{guess}$. An extreme example of this is shown by FIG. 13, where $MEA_{guess}$ is 0.345 sec (for r=2), and spikes a-d (labeled a'-d' with respect to their locations for r=2) are all before $MEA_{guess}$.

Figure 14:
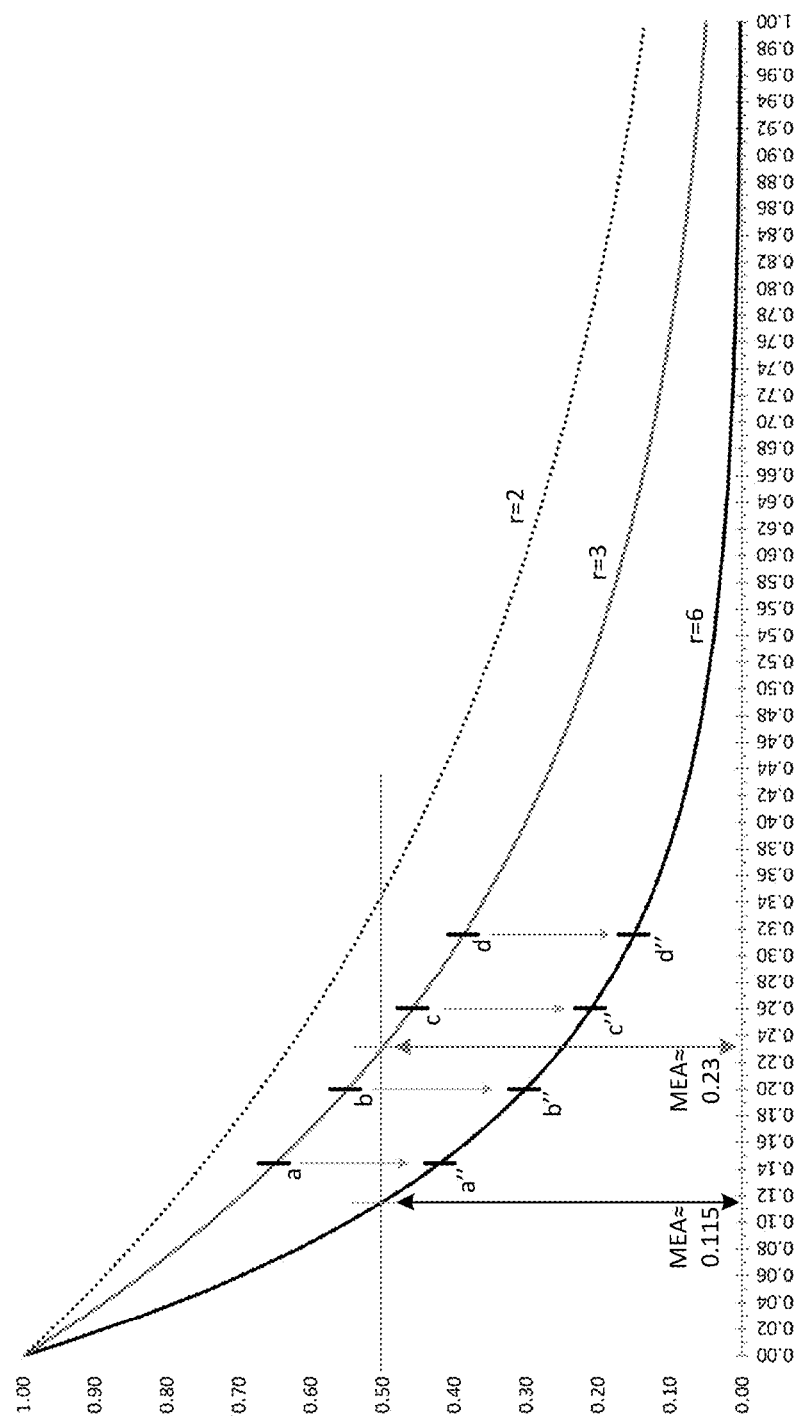
FIG. 14 depicts an example distribution of spikes if a guess for a value of MEA$_{ALL}$ (call it MEA$_{guess}$) is too low.

If a guess for a value of $MEA_{ALL}$ (call it $MEA_{guess}$) is too low (i.e., in actuality, $MEA_{guess} < MEA_{ALL}$), over a large number of occurrences of spikes of s, more spikes will occur after $MEA_{guess}$ than before $MEA_{guess}$. An extreme example of this is shown by FIG. 14, where $MEA_{guess}$ is 0.115 sec (for r=6), and the same spikes a-d (now labeled a"-d" with respect to r=6) are all after $MEA_{guess}$.

Special Property 1, along with its implications, provides the basis for a search procedure, by which $MEA_{ALL}$ can be found. That procedure can be described as containing the following two main steps:

1. Choose a reasonable initial value for $MEA_{guess}$:

The choice of an initial value for $MEA_{guess}$ can be limited, for example, to being within a range of possible values, based on the particular system design, and its intended applications. The value for $MEA_{guess}$ can also be determined by guessing an initial value for r, call it $r_{guess}$, from which $MEA_{guess}$ can be determined. A corresponding time for $MEA_{guess}$ can then be determined from Equation 1. In particular, with P=0.5, and r=$r_{guess}$, Equation 1 becomes:

$$MEA_{guess} = \frac{1}{r_{guess}} \ln 2 \qquad \text{Equation 2}$$

2. For each pair of spikes n and n+1 of stream s, compare the time between the spikes ($t_{n+1} - t_n$) to $MEA_{guess}$:

If ($t_{n+1} - t_n$) < $MEA_{guess}$, assume (based upon just this latest data point) the guessed value, for $MEA_{guess}$, is too high:

Reduce the value of $MEA_{guess}$, for purposes of subsequent comparisons between spike pairs.

Determine the reduced value for $MEA_{guess}$ by incrementing $r_{guess}$ by a standard amount, call it $\Delta r$, and then redetermining Equation 2.

If $(t_{n+1}-t_n)$>MEA$_{guess}$, assume (based upon just this latest data point) the guessed value, for MEA$_{guess}$, is too low:
  Increase the value of MEA$_{guess}$, when comparing subsequent pairs of spikes.
  Determine the increased value for MEA$_{guess}$ by decrementing r$_{guess}$ by a standard amount, call it Δr, and then redetermining Equation 2.

In the above-listed search procedure, for each of its above-described assumptions, for whether MEA$_{guess}$ is too high or too low, there are the following possibilities:
  If MEA$_{guess}$ is actually too high, over a large number of spikes, this fact is determined by the occurrence of more comparisons indicating MEA$_{guess}$ is too high than too low, and the value of MEA$_{guess}$ undergoes a net reduction (by means of a net increase of r$_{guess}$).
  If MEA$_{guess}$ is actually too low, over a large number of spikes, this fact is determined by the occurrence of more comparisons indicating MEA$_{guess}$ is too low than too high, and the value of MEA$_{guess}$ undergoes a net increase (by means of a net reduction of r$_{guess}$).
  MEA$_{guess}$ only achieves a net dynamic stability when it is factually correct (i.e., when MEA$_{guess}$=MEA$_{ALL}$ and r$_{guess}$=r$_{ALL}$).

Thus, over a sufficient number of spikes, r$_{ALL}$ will be determined, with Δr selected to provide a suitable tradeoff, between speed of convergence to r$_{ALL}$ (also called the "learning rate") and accuracy of the r$_{ALL}$ value determined:
  Larger values of Δr increase the learning rate, but reduce accuracy of the result.
  Smaller values of Δr decrease the learning rate, but increase accuracy of the result.

Figure 15:
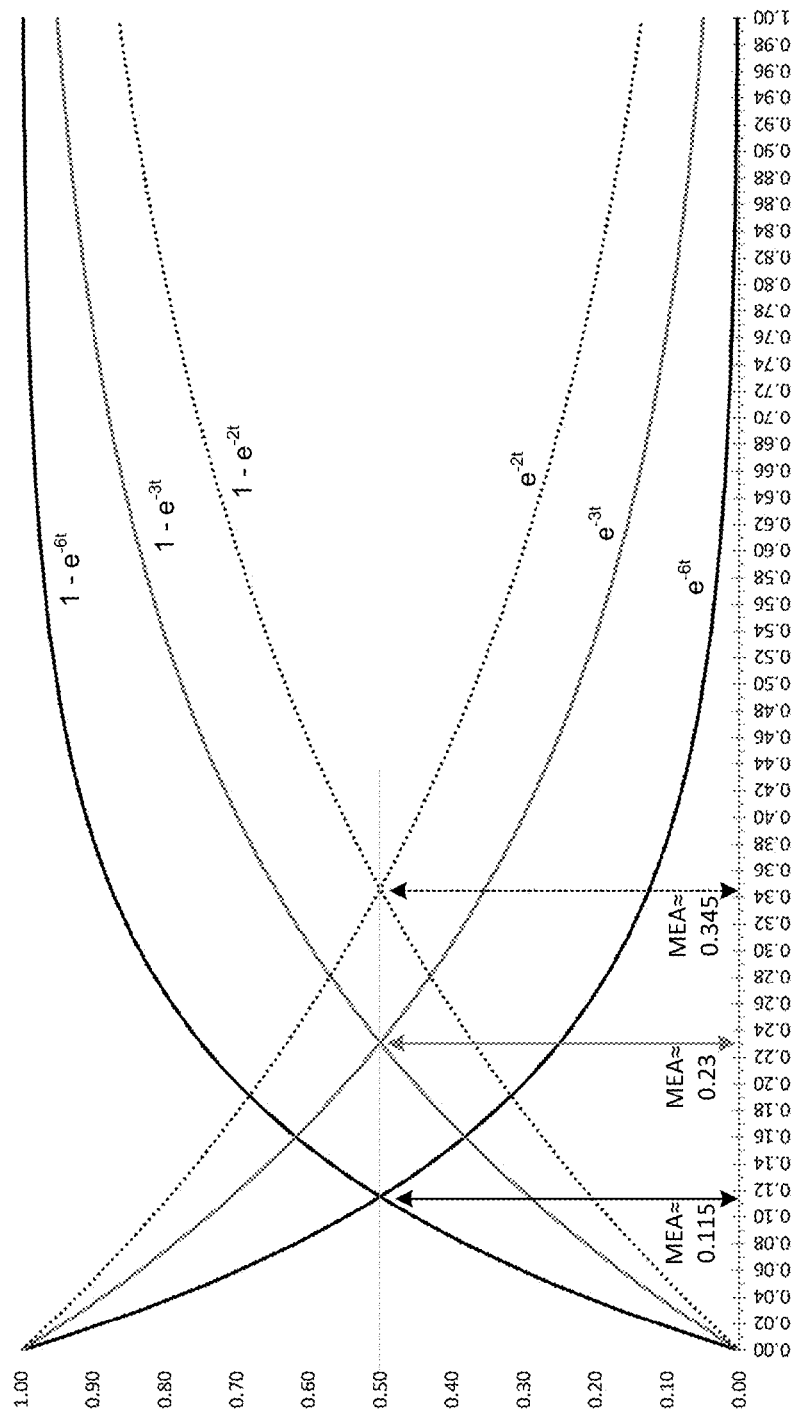
FIG. 15 depicts an equality-testing approach to finding an MEA, rather than solving for the point where an Equation 1 yields half its total range (e.g., P=0.5).

FIG. 15 depicts an alternate way to find an MEA, other than solving for the point where Equation 1 yields half its total range (e.g., P=0.5). The alternate approach is to solve for the time when Equation 1 and the following Equation 3 are equal (where Equation 3 defines a cumulative probability distribution):

$$P_c = 1 - e^{-r_{ALL}t} \quad \text{Equation 3}$$

As can be seen in FIG. 15, each of the previously discussed MEA's, with respect to FIGS. 12-14, is found by seeking the equality point.

This equality-testing approach is a basis for the hardware implementation of FIG. 16, that can be described as follows.

Figure 16:
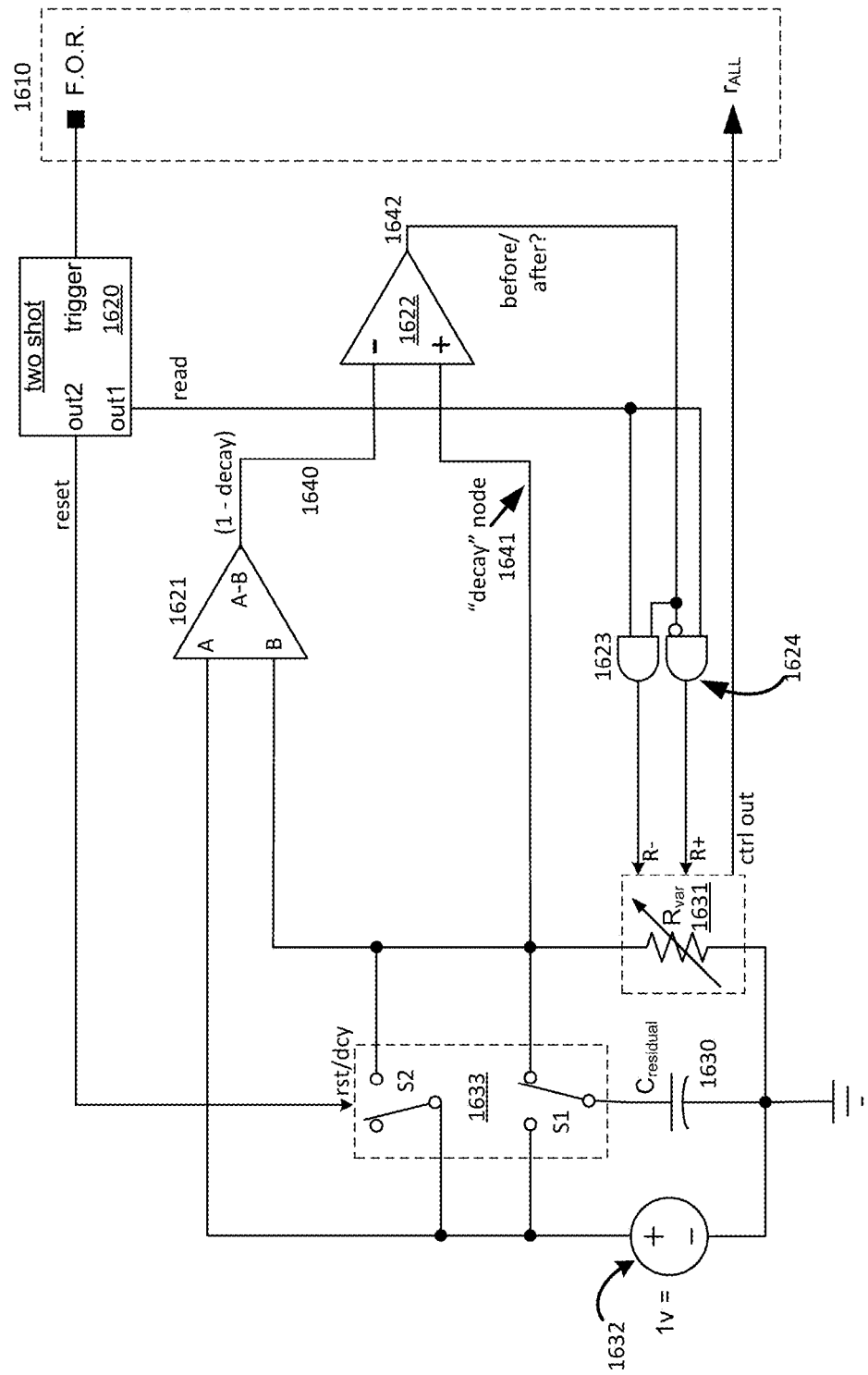
FIG. 16 presents a circuit implementation for Learn Rate All, based on the equality-testing approach.

Outline 1610 of FIG. 16 indicates the external interface for LRA, where each connection corresponds to an input or output of LRA functional block 0223 of FIG. 11.

The exponential decay of Equation 1 is performed, in FIG. 16, by the combination of capacitor 1630 and variable resistor 1631. The decay value is available at "decay" node 1641. Equation 3 (exponential increase) is performed by subtractive amplifier 1621 as follows:
  The unit voltage is applied to the amplifier's "A" input.
  Decay node 1641 (i.e., Equation 1) is applied to the "B" input.
  The output of subtractive amplifier 1621, available at node 1640, is therefore a voltage-level representation of Equation 3.

Equality testing, between Equation 1 and Equation 3, is performed by comparator amplifier 1622, with the result (corresponding to the MEA$_{guess}$ of the above explanation) available at node 1642.

Each time a spike n is present, at the F.O.R. input of interface 1610, two-shot 1620 is triggered. The first step, activated by out1 of the two-shot, is to complete the MEA measurement begun with the last F.O.R. spike n−1. Out1 does this by enabling AND gates 1623 and 1624 to read the output of comparator 1622.

The output of comparator 1622 can be interpreted as follows:
  Comparator 1622 outputs a logical 1 if the comparison indicates a time period, between spikes n−1 and n, less than the current MEA$_{guess}$. This is because exponential decay node 1641 drives the + input of the comparator.
  Comparator 1622 outputs a logical 0 if the comparison indicates a time duration, between spikes n−1 and n, greater than the current MEA$_{guess}$. This is because exponential increase node 1640 drives the—input of the comparator.

If the current measurement by comparator 1622 indicates MEA$_{guess}$ is too high, the logical 1 on node 1642 causes AND gate 1623 to be enabled, and the out1 pulse is applied to the R− input of variable resistor 1631. As can be appreciated, decreasing resistance causes a faster rate of decay at "decay" node 1641, and a downward adjustment to MEA$_{guess}$.

Conversely, if the current measurement by comparator 1622 indicates MEA$_{guess}$ is too low, the logical 0 on node 1642 causes AND gate 1624 to be enabled, and the out1 pulse is applied to the R+ input of variable resistor 1631. As can be appreciated, increasing resistance causes a slower rate of decay at "decay" node 1641, and an upward adjustment to MEA$_{guess}$.

Such factors as the duration of the out1 pulse, and the particular construction of variable resistor 1631, determine the increment of change to r$_{guess}$, where the magnitude of each such increment of change is referred to as the Δr "learning rate" in the above discussion.

The state of variable resistor 1631 (i.e., its current resistance level) can be kept by an internal state capacitor (not shown). The voltage of this capacitor can, for example, be increased with each pulse to the R− input, and decreased with each pulse to R+. Further, the voltage of the internal state capacitor can be made available through a voltage-following amplifier (also not shown), that drives the r$_{ALL}$ output of LRA's external interface 1610.

As discussed above with respect to FIG. 11, LRA 0223 can provide its r$_{ALL}$ output to the r$_{ALL}$ input of each of Produce Delay 0227 and Learn Delay 0228.

Figure 17:
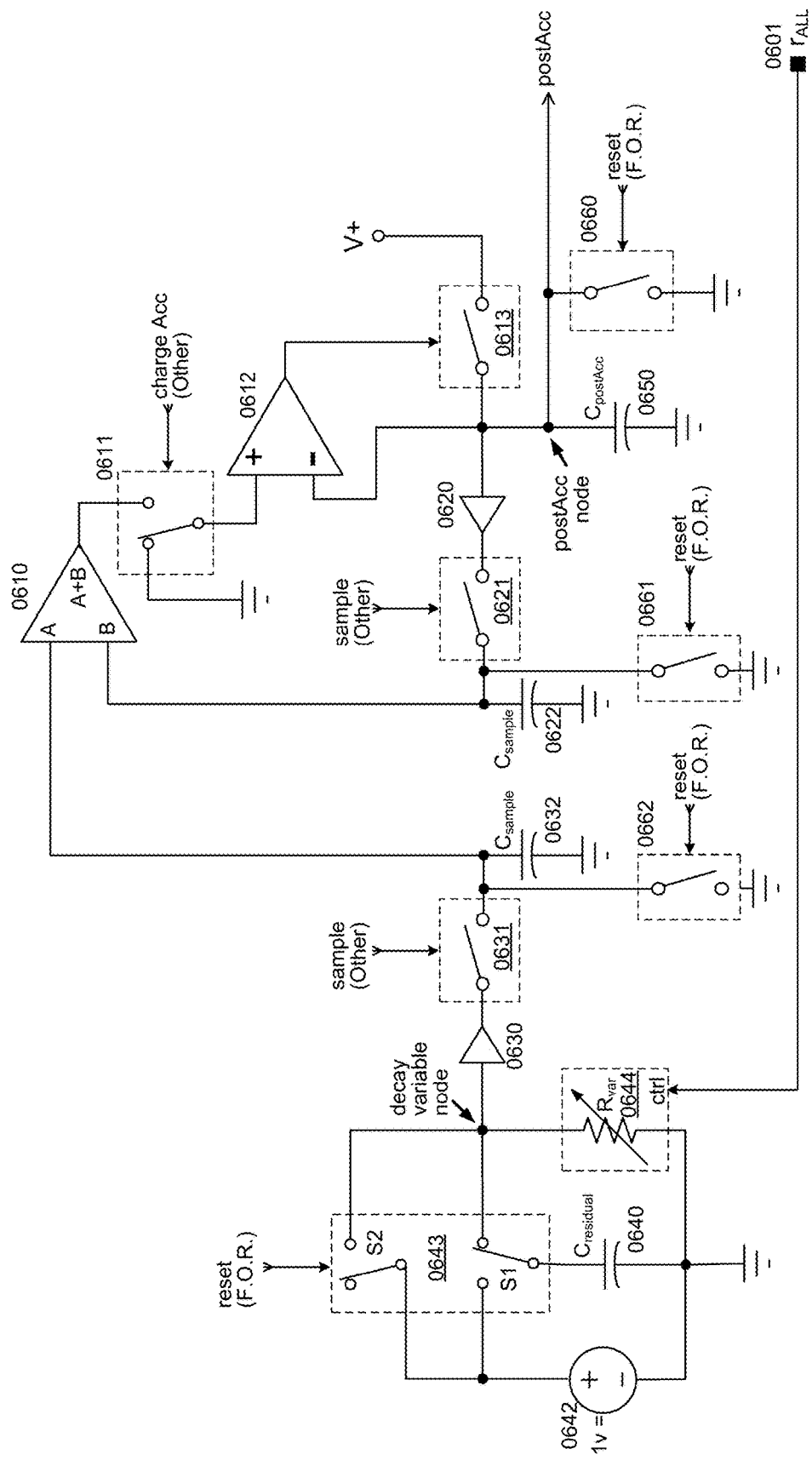
FIGS. 17 and 18 present the same circuit implementation of Learn Delay shown in, respectively, FIGS. 6 and 7, except hardware for an $r_{ALL}$ input is added.
Figure 18:
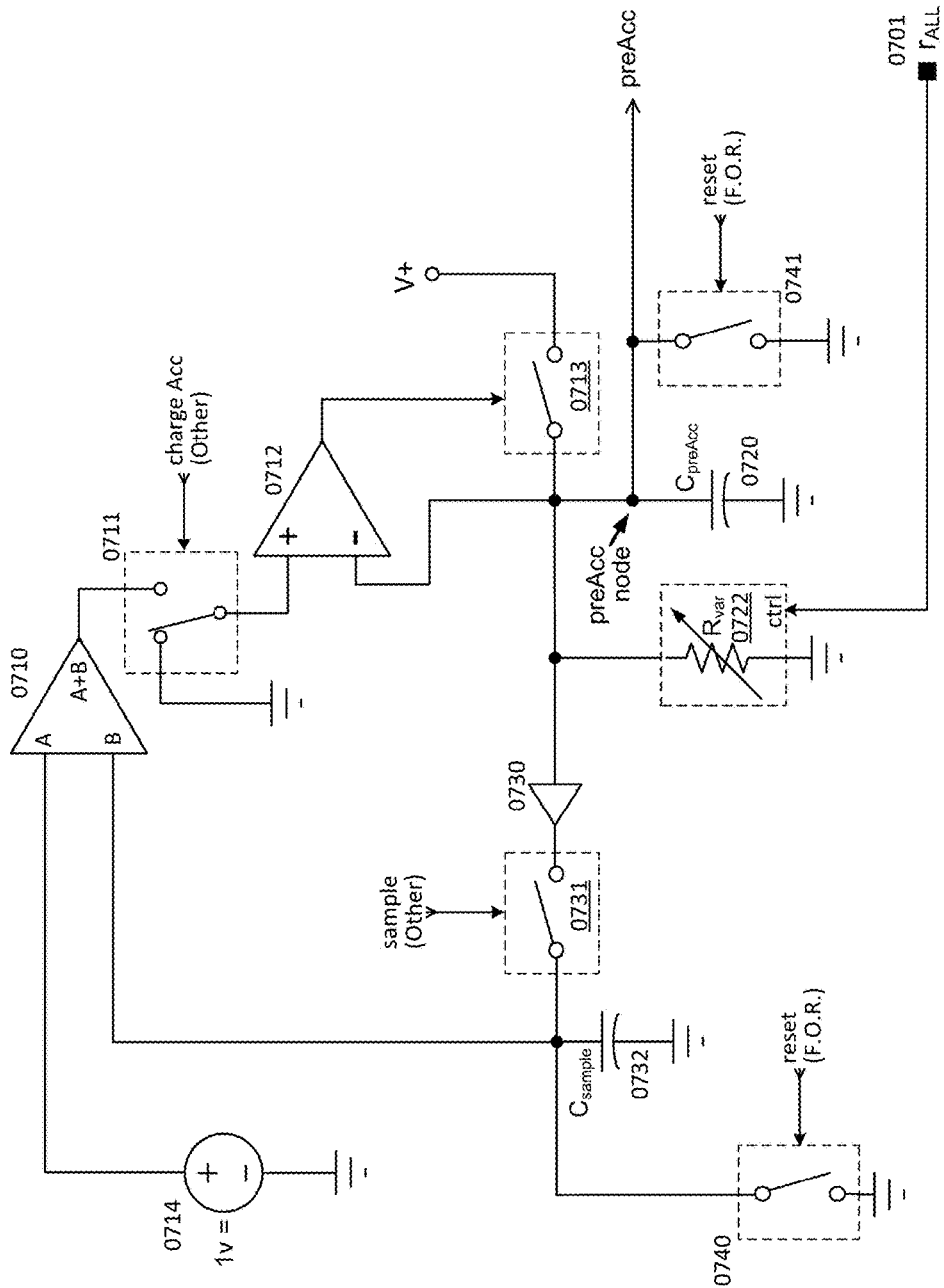

The portion of Learn Delay 0226's circuit implementation, changed by adding an r$_{ALL}$ input, is FIGS. 6 and 7. For a circuit implementation of Learn Delay 0228, FIGS. 6 and 7 are replaced by, respectively, FIGS. 17 and 18. FIGS. 17 and 18 differ from FIGS. 6 and 7 as follows:
  Fixed resistor 0641 (FIG. 6) is replaced with variable resistor 0644 (FIG. 17) that accepts an r$_{ALL}$ input 0601.
  Fixed resistor 0721 (FIG. 7) is replaced with variable resistor 0722 (FIG. 18) that accepts an r$_{ALL}$ input 0701.

Figure 19:
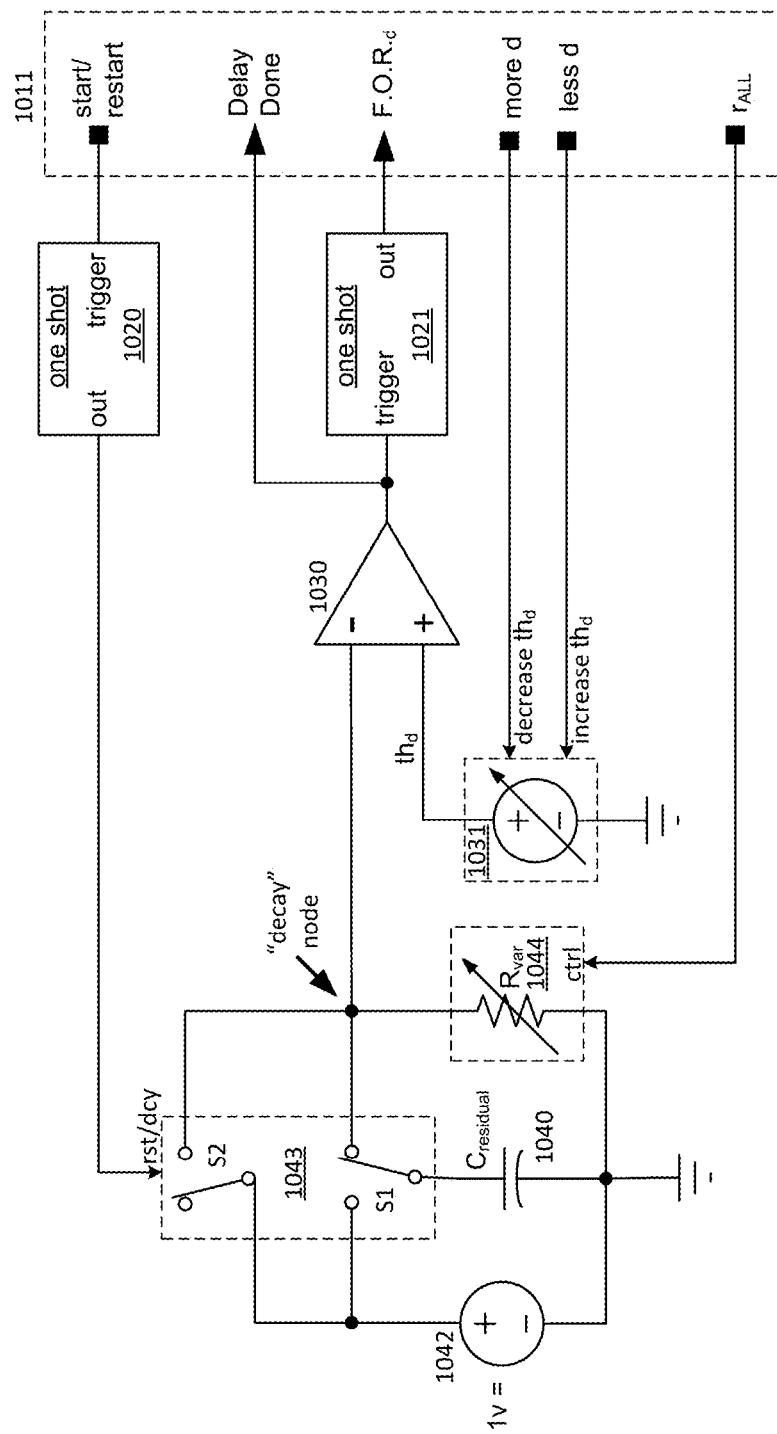
FIG. 19 presents the same circuit implementation of Produce Delay shown in FIG. 10, except hardware for an $r_{ALL}$ input is added.

For a circuit implementation of Produce Delay 0227, FIG. 10 is replaced by FIG. 19. FIG. 19 differs from FIG. 10 as follows: fixed resistor 1041 (FIG. 10) is replaced with variable resistor 1044 (FIG. 19) that accepts an r$_{ALL}$ input as part of its external interface 1011.

In order that the voltage at LRA's r$_{ALL}$ output produce exponential decay curves (for Produce Delay 0227 and Learn Delay 0228) with an r equal to the r$_{ALL}$ found by LRA 0223, the following can be done:
  Capacitors 0640 (see FIG. 17's implementation of post-Acc), 0720 (see FIG. 18's implementation of preAcc), and 1040 (see FIG. 19's implementation of Produce Delay) can be made to have the same capacitance as LRA's capacitor 1630 (see FIG. 16).

Variable resistors 0644 (see FIG. 17's implementation of postAcc), 0722 (see FIG. 18's implementation of preAcc), and 1044 (see FIG. 19's implementation of Produce Delay) can be made the same as LRA's variable resistor 1631 (see FIG. 16), except for the following: rather than keep an internal state, each of 0644, 0722, and 1044 uses a voltage follower, driven by its external interface $r_{ALL}$ input.

9.3 Summary

A multi-stream cross correlator for spiking neural networks, where each stream contains significant stochastic content. At least one event occurs, with a fixed temporal relationship across at least two streams. Each stream is treated as a Frame Of Reference (FOR), and subject to an adjustable delay based on comparison to the Other streams. For each spike of the FOR, a timing analysis, relative to the last and current FOR spikes, is completed by comparing Post and Pre accumulators. Also, a new timing analysis is begun, with the current FOR spike, by restarting the production of Post and Pre weighting functions, the values of which are accumulated, upon the occurrence of each Other spike, until a next FOR spike. A one-spike delay unit can be used, if time-neutral conflict resolution is used. The average spike rate of the FOR can be determined and used for the Post and Pre weighting functions.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for identifying a pair of spikes sharing an underlying event, comprising:
   receiving, performed at least in part with a configuration of electronic hardware, a first spike stream containing mostly stochastic content, except for a first subset of spikes, wherein each spike of the first subset shares an underlying event with a spike of a second subset of spikes of a second spike stream;
   receiving, performed at least in part with a configuration of electronic hardware, the second spike stream, containing mostly stochastic content, except for the second subset;
   identifying, performed at least in part with a configuration of electronic hardware, a first cross-stream spike pair, comprising a first spike from the first spike stream and a second spike from the second spike stream;
   starting, performed at least in part with a configuration of electronic hardware, a first exponential decay unit, with a first decaying output, upon receipt of the first spike;
   stopping, performed at least in part with a configuration of electronic hardware, the first exponential decay unit upon receipt of the second spike;
   outputting a first signal indicative of the first and second spikes as both caused by a shared underlying event, performed at least in part with a configuration of electronic hardware, if, as of the stopping of the first exponential decay unit, the first decaying output is not less than a first threshold;
   setting, performed at least in part with a configuration of electronic hardware, a second threshold as a first fraction of the first threshold;
   increasing a first rate of decay of the first exponential decay unit, and reducing the first threshold, performed at least in part with a configuration of electronic hardware, if, as of the stopping of the first exponential decay unit, the first decaying output is less than the first threshold and not less than the second threshold; and
   decreasing a first rate of decay of the first exponential decay unit, and increasing the first threshold, performed at least in part with a configuration of electronic hardware, if, as of the stopping of the first exponential decay unit, the first decaying output is less than the first threshold and less than the second threshold.

2. A method for identifying a pair of spikes sharing an underlying event, comprising:
   receiving, performed at least in part with a configuration of electronic hardware, a first spike stream containing mostly stochastic content, except for a first subset of spikes, wherein each spike of the first subset shares an underlying event with a spike of a second subset of spikes of a second spike stream;
   receiving, performed at least in part with a configuration of electronic hardware, the second spike stream, containing mostly stochastic content, except for the second subset;
   identifying, performed at least in part with a configuration of electronic hardware, a first cross-stream spike pair, comprising a first spike from the first spike stream and a second spike from the second spike stream;
   starting, performed at least in part with a configuration of electronic hardware, a first exponential decay unit, with a first decaying output, upon receipt of the first spike;
   comparing, performed at least in part with a configuration of electronic hardware, the first decaying output, upon receipt of the second spike, with a discernment threshold, a first threshold of a first region, and a second threshold of the first region, wherein the discernment threshold is at least equal to the first threshold of the first region, and the first threshold of the first region is greater than the second threshold of the first region;
   outputting a first signal indicative of the first and second spikes as both caused by a shared underlying event, performed at least in part with a configuration of electronic hardware, if, as of the comparing, the first decaying output is not less than the discernment threshold;
   increasing a first rate of decay of the first exponential decay unit, and decreasing the discernment threshold, performed at least in part with a configuration of electronic hardware, if, as of the comparing, the first decaying output is less than the first threshold of the first region and not less than the second threshold of the first region;
   identifying, performed at least in part with a configuration of electronic hardware, a second cross-stream spike pair, comprising a third spike from the first spike stream and a fourth spike from the second spike stream;
   starting, performed at least in part with a configuration of electronic hardware, the first exponential decay unit, with the first decaying output, upon receipt of the third spike;
   comparing, performed at least in part with a configuration of electronic hardware, the first decaying output, upon receipt of the fourth spike, with a discernment threshold, a first threshold of a second region, and a second threshold of the second region, wherein the second threshold of the first region is at least equal to the first threshold of the second region, and the first threshold of the second region is greater than the second threshold of the second region;

outputting a second signal, indicative of the third and fourth spikes as both caused by a shared underlying event, performed at least in part with a configuration of electronic hardware, if, as of the comparing, the first decaying output is not less than the discernment threshold; and decreasing a first rate of decay of the first exponential decay unit, and increasing the discernment threshold, performed at least in part with a configuration of electronic hardware, if, as of the comparing, the first decaying output is less than the first threshold of the second region and not less than the second threshold of the second region.

3. The method of claim 2, wherein the first spike of the first cross-stream spike pair is the same as the third spike of the second cross-stream spike pair, and the second spike of the first cross-stream spike pair is the same as the fourth spike of the second cross-stream spike pair.

4. The method of claim 2, wherein the first and second spikes, of the first cross-stream spike pair, are different from the third and fourth spikes, of the second cross-stream spike pair.

5. The method of claim 2, wherein the second threshold of the first region is the same as the first threshold of the second region.

6. The method of claim 2, wherein the discernment threshold is the same as the first threshold of the first region.

7. The method of claim 6, wherein the second threshold of the second region is zero.

8. The method of claim 7, wherein a first difference, between the first threshold of the first region and the second threshold of the first region, is approximately equal to a second difference, between the first threshold of the second region and the second threshold of the second region.

9. The method of claim 8, wherein the second threshold of the first region is equal to the first threshold of the second region.

10. The method of claim 2, wherein a first difference, between the first threshold of the first region and the second threshold of the first region, is approximately equal to a second difference, between the first threshold of the second region and the second threshold of the second region.

11. The method of claim 10, wherein the first and second differences are each an approximately same and approximately constant fraction, of a difference between the discernment threshold and zero.

12. The method of claim 2, further comprising the following step:

correlating the first and second spike streams.

13. The method of claim 12, further comprising the following steps:

receiving a first undelayed spike stream containing mostly stochastic content, except for a first subset of undelayed spikes, wherein each spike of the first subset of undelayed spikes shares an underlying event with a spike of a second subset of undelayed spikes of a second undelayed spike stream;

inputting the first undelayed spike stream into a first delay unit, and producing the first spike stream with a first delay, wherein the first delay has a lower bound of zero seconds;

inputting the second undelayed spike stream into a first delay unit, and producing the second spike stream with a second delay, wherein the second delay has a lower bound of zero seconds;

comparing, upon receipt of a first delayed spike from the first spike stream, a first accumulated value with a second accumulated value to produce a first comparison result;

increasing the first delay if the first comparison result indicates the first accumulated value is greater than the second accumulated value;

decreasing the first delay if the first comparison result indicates the first accumulated value is less than the second accumulated value;

resetting, after the first comparison result is produced, the first accumulated value and the second accumulated value;

restarting, after the first comparison result is produced, a first process for producing a first weighting function, and a second weighting function, wherein the first weighting function is monotonically decreasing and the second weighting function is both monotonically increasing and symmetrically opposite to the first weighting function;

accumulating a first weighting value into the first accumulator, in accordance with the first weighting function, upon receipt of a second delayed spike from the second spike stream; and accumulating a second weighting value into the second accumulator, in accordance with the second weighting function, upon receipt of the same second delayed spike from the second spike stream.

14. The method of claim 13, further comprising:

increasing the first delay by increasing the length of a first queue, comprising the first delay unit; and decreasing the first delay by decreasing the length of a first queue.

15. The method of claim 13, further comprising:

timing a duration equal to the first delay, upon an input to the first delay unit of a first undelayed spike from the first spike stream, if a timing by the first delay unit is not already started;

outputting a spike, upon a completion of any timing of the first delay;

deciding, based upon a first state for a first decision variable, and receipt of a second undelayed spike during a time duration for a prior undelayed spike, to continue with the time duration for the prior undelayed spike;

deciding, based upon a second state for the first decision variable, and receipt of the second undelayed spike during the time duration for the prior undelayed spike, to restart a timing of the first delay by the first delay unit;

ensuring over multiple instances, of receipt of the second undelayed spike during the time duration for the prior undelayed spike, approximately equal occurrences, for the first decision variable, of the first and second states.

16. The method of claim 15, further comprising:

increasing a first average spike rate, for generating both a first exponential decrease function and a first exponential increase function, if, at a time of receipt of a first undelayed spike from the first spike stream, the first exponential decrease function is greater than the first exponential increase function;

decreasing a first average spike rate, for generating both a first exponential decrease function and a first exponential increase function, if, at the time of receipt of the first undelayed spike from the first spike stream, the first exponential decrease function is less than the first exponential increase function; and using the first average spike rate for timing the first delay.

17. The method of claim 13, further comprising:

increasing a first average spike rate, for generating both a first exponential decrease function and a first exponential increase function, if, at a time of receipt of a first undelayed spike from the first spike stream, the first exponential decrease function is greater than the first exponential increase function;

decreasing a first average spike rate, for generating both a first exponential decrease function and a first exponential increase function, if, at the time of receipt of the first undelayed spike from the first spike stream, the first exponential decrease function is less than the first exponential increase function; and using the first average spike rate for producing the first and second weighting functions.

18. A method for identifying a pair of spikes sharing an underlying event, comprising:

receiving, performed at least in part with a configuration of electronic hardware, a first spike stream containing mostly stochastic content, except for a first subset of spikes, wherein each spike of the first subset shares an underlying event with a spike of a second subset of spikes of a second spike stream;

receiving, performed at least in part with a configuration of electronic hardware, the second spike stream, containing mostly stochastic content, except for the second subset;

identifying, performed at least in part with a configuration of electronic hardware, a first cross-stream spike pair, comprising a first spike from the first spike stream and a second spike from the second spike stream;

starting, performed at least in part with a configuration of electronic hardware, a first exponential decay unit, with a first decaying output, upon receipt of the first spike;

comparing, performed at least in part with a configuration of electronic hardware, the first decaying output, upon receipt of the second spike, with a discernment threshold, a first threshold of a first incrementing region, and a second threshold of the first incrementing region, wherein the discernment threshold is at least equal to the first threshold of the first incrementing region, and the first threshold of the first incrementing region is greater than the second threshold of the first incrementing region;

outputting a first signal indicative of the first and second spikes as both caused by a shared underlying event, performed at least in part with a configuration of electronic hardware, if, as of the comparing, the first decaying output is not less than the discernment threshold;

increasing a first rate of decay of the first exponential decay unit, and decreasing the discernment threshold, performed at least in part with a configuration of electronic hardware, if, as of the comparing, the first decaying output is less than the first threshold of the first incrementing region and not less than the second threshold of the first incrementing region;

identifying, performed at least in part with a configuration of electronic hardware, a second cross-stream spike pair, comprising a third spike from the first spike stream and a fourth spike from the second spike stream;

starting, performed at least in part with a configuration of electronic hardware, a second exponential decay unit, with a second decaying output, upon receipt of the third spike;

comparing, performed at least in part with a configuration of electronic hardware, the second decaying output, upon receipt of the fourth spike, with a discernment threshold, a first threshold of a first decrementing region, and a second threshold of the first decrementing region, wherein the first threshold of the first decrementing region is greater than the second threshold of the first decrementing region;

outputting a second signal, indicative of the third and fourth spikes as both caused by a shared underlying event, performed at least in part with a configuration of electronic hardware, if, as of the comparing, the second decaying output is not less than the discernment threshold; and decreasing a first rate of decay of the second exponential decay unit, and increasing the discernment threshold, performed at least in part with a configuration of electronic hardware, if, as of the comparing, the second decaying output is less than the first threshold of the first decrementing region and not less than the second threshold of the first decrementing region.

19. The method of claim 18, wherein the second threshold of the first incrementing region is at least equal to the first threshold of the first decrementing region.

20. The method of claim 18, wherein a same exponential decay unit serves as both the first and second exponential decay units.

21. The method of claim 18, wherein the first incrementing region and first decrementing region have probabilistic symmetry.

22. The method of claim 18, further comprising the following step:

operating the first incrementing and first decrementing regions at a same scale.

23. The method of claim 22, further comprising the following step:

operating the first incrementing and first decrementing regions on different samples.

24. The method of claim 18, further comprising the following step:

operating the first incrementing region at a first scale, and the first decrementing region at a second scale, where the first scale is different from the second scale.

25. The method of claim 24, further comprising the following step:

operating the first incrementing and first decrementing regions on different samples.

26. The method of claim 18, further comprising the following step:

operating a first set of one or more additional incrementing regions according to at least one threshold different from the first and second thresholds of the first incrementing region;

operating a second set of one or more additional decrementing regions according to at least one threshold different from the first and second thresholds of the first decrementing region;

operating the first set of additional incrementing regions according to the same procedures as the first incrementing region;

operating the second set of additional decrementing regions according to the same procedures as the first decrementing region; and operating the first incrementing region and the first set of additional incrementing regions at a probabilistic symmetry, with respect to the first decrementing region and the second set of additional decrementing regions.

27. The method of claim 18, wherein the first spike of the first cross-stream spike pair is the same as the third spike of the second cross-stream spike pair, and the second spike of the first cross-stream spike pair is the same as the fourth spike of the second cross-stream spike pair.

28. The method of claim 18, wherein the first and second spikes, of the first cross-stream spike pair, are different from the third and fourth spikes, of the second cross-stream spike pair.

\* \* \* \* \*